(12) United States Patent
Inoue

(10) Patent No.: US 6,404,720 B1
(45) Date of Patent: Jun. 11, 2002

(54) DISK DRIVE

(75) Inventor: Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/526,624

(22) Filed: Mar. 16, 2000

(30) Foreign Application Priority Data

Mar. 19, 1999 (JP) .......................................... 11-075664

(51) Int. Cl.$^7$ .............................................. G11B 33/02
(52) U.S. Cl. .................................................... 369/77.2
(58) Field of Search .............................. 369/75.1–75.2, 369/77.1, 77.2; 360/99.02, 99.06, 85

(56) References Cited

U.S. PATENT DOCUMENTS 5,532,996 A    7/1996 Okabe et al.
5,748,595 A    5/1998 Nakajima
5,787,063 A    7/1998 Kanno et al.

FOREIGN PATENT DOCUMENTS

EP    0 578 536 A2    1/1994
EP    0 779 615 A2    6/1997

*Primary Examiner*—Allen Cao
(74) *Attorney, Agent, or Firm*—Frommer Lawrence & Haug LLP; William S. Frommer; Matthew K. Ryan

(57) ABSTRACT

Disclosed herein is a disk drive which can automatically open and close a front door in loading and ejecting a disk cartridge without mechanically linking the front door to a loading mechanism. In raising and lowering the disk cartridge between a loading start position and a loading end position by driving the loading mechanism, the disk cartridge is brought into contact with and separation from the front door to thereby automatically open and close the front door.

5 Claims, 46 Drawing Sheets

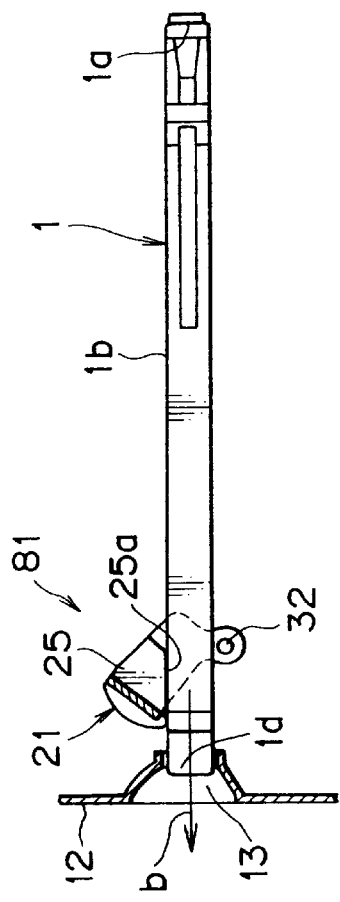
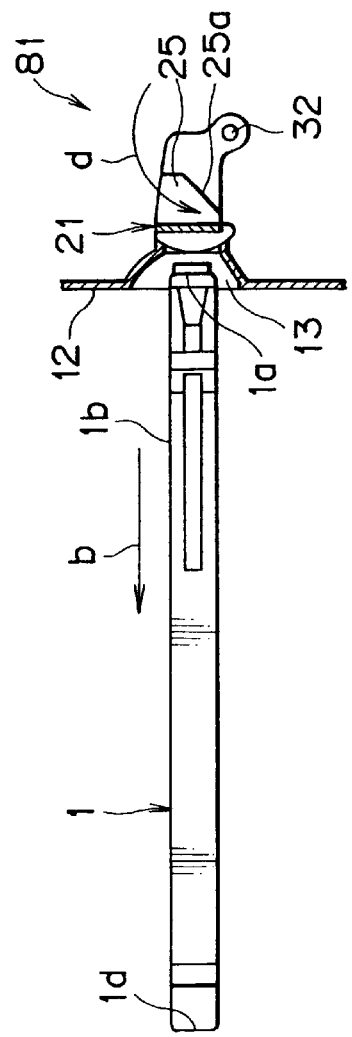

F I G. 28
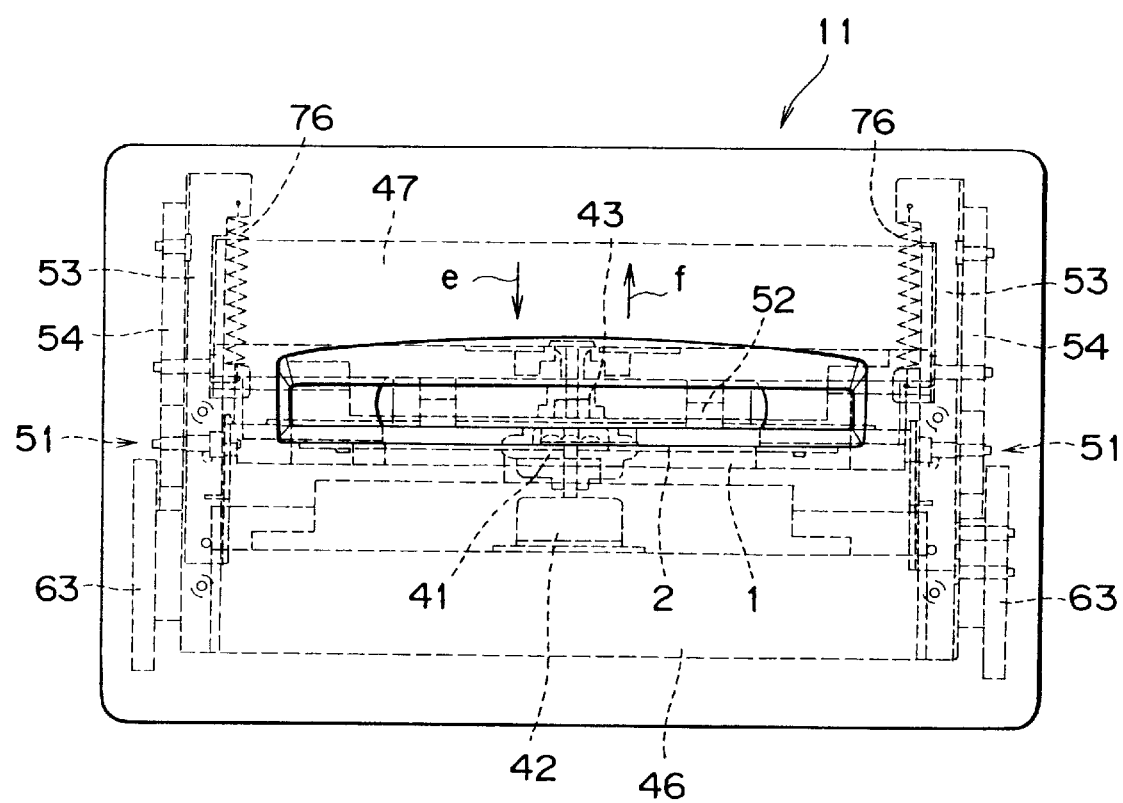

F I G. 42
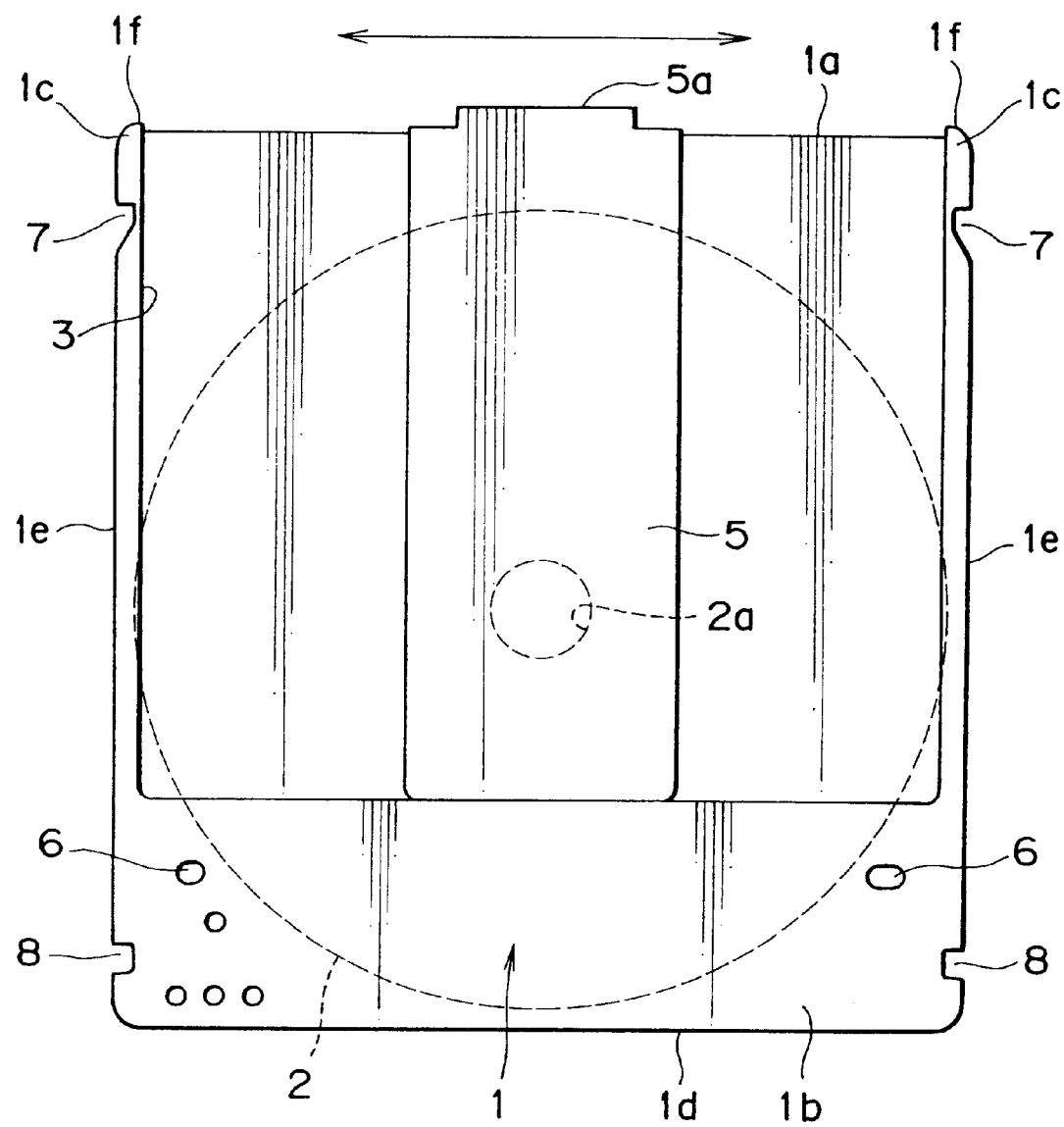

F I G. 44
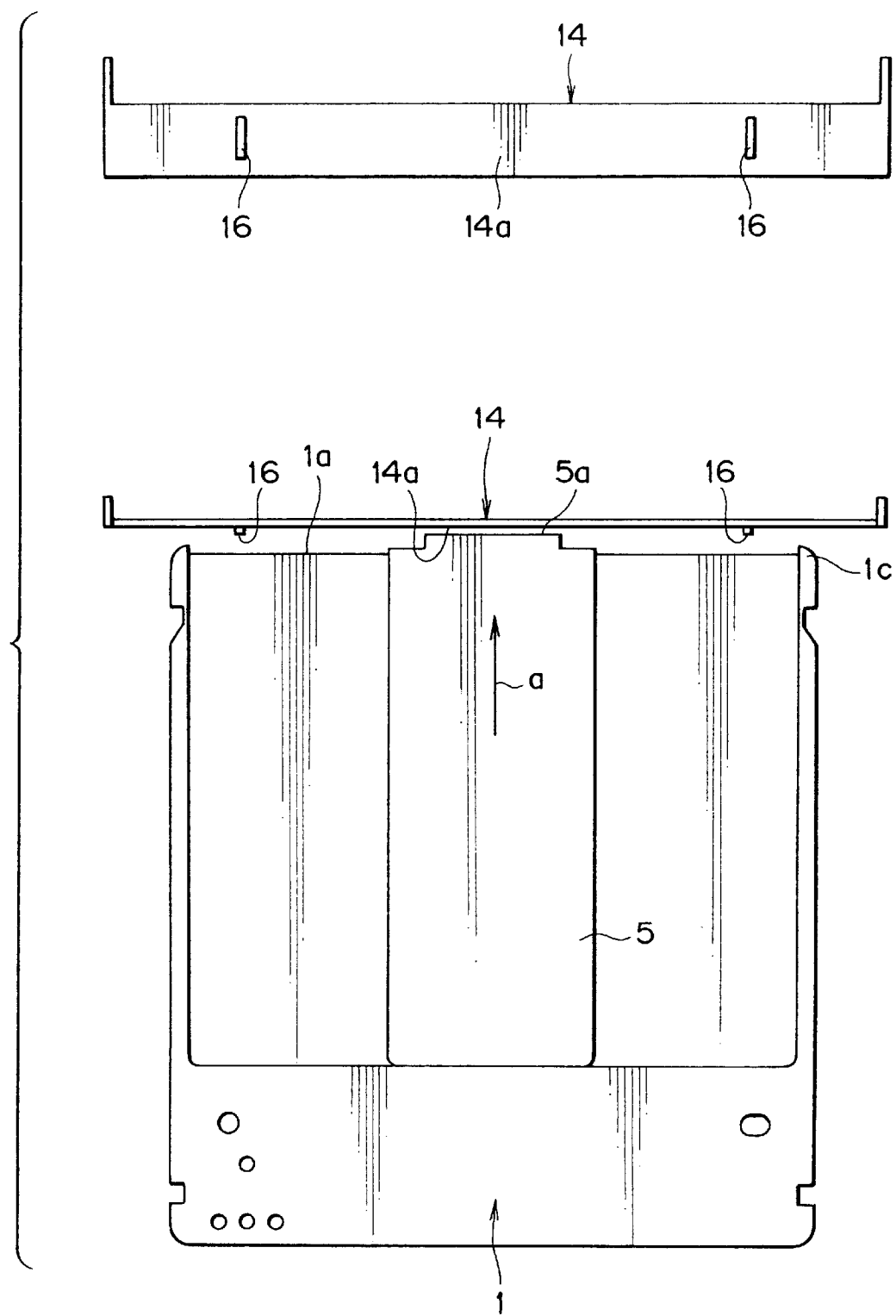

DISK DRIVE

BACKGROUND OF THE INVENTION

The present invention relates to a disk drive for loading a disk cartridge accommodating a recording medium such as an optical disk and a magneto-optical disk to record or reproduce data such as video data and audio data onto or from the recording medium.

A disk cartridge 1 as shown in FIGS. 1, 42, and 43 has conventionally been developed. The disk cartridge 1 is a substantially rectangular flat case in which a double-sided disk 2 is rotatably accommodated. The double-sided disk 2 is a recording medium such as an optical disk and a magneto-optical disk having opposite recording surfaces which data can be recorded on and reproduced from. The disk cartridge 1 has a front end surface 1a as an insertion end surface from which the disk cartridge 1 is inserted into a disk drive 11 to be hereinafter described. The disk cartridge 1 has upper and lower surfaces 1b symmetrical with each other. The upper and lower surfaces 1b are formed with a pair of upper and lower recesses 3 in a longitudinal region offset to the front end surface 1a over the substantially entire width. The upper and lower recesses 3 are formed with a pair of upper and lower elongated windows 4 each extending from a central position corresponding to a center hole 2a of the double-sided disk 2 to a front position near the center of the front end surface 1a. A dustproof shutter 5 formed from a plastic or metallic thin plate into a U-shaped structure as viewed in side elevation is mounted on the disk cartridge 1 so as to be inserted from the front end surface 1a in the upper and lower recesses 3. The shutter 5 is slidable along the front end surface 1a from its central position in one direction or opposite directions, thereby simultaneously opening the upper and lower windows 4. The shutter 5 is normally biased by a return spring (not shown) incorporated inside of the front end surface 1a of the disk cartridge 1 from a shutter open position shown in FIG. 43 to a shutter closed position shown in FIG. 42. The shutter 5 has a front end surface 5a projecting frontward by an amount slightly greater than the amount of projection of right and left corner portions 1c of the front end surface 1a of the disk cartridge 1. The central portion of the front end surface 1a of the disk cartridge 1 inclusive of the front end surface 5a of the shutter 5 is a portion weakest in strength. Each of the upper and lower surfaces 1b of the disk cartridge 1 is formed with a pair of right and left positioning holes 6 at a longitudinal position offset to a rear end surface 1d of the disk cartridge 1. Further, the disk cartridge 1 has right and left side surfaces 1e each formed with a notch 7 for a cartridge loading mechanism and a notch 8 for a disk changer respectively near the front and rear ends of each side surfaces 1e.

As shown in FIGS. 44 to 46B, the disk drive 11 for recording and reproducing data such as video data and audio data onto and from the double-sided disk 2 of the disk cartridge 1 has a front panel 12 formed with a laterally elongated cartridge insertion opening 13. The cartridge insertion opening 13 is normally closed by a dustproof front door 14. The front door 14 has a pair of right and left arms pivotably supported at their upper ends through horizontal shafts 15 to the inside of the front panel 12, so that the front door 14 is rotatable about the horizontal shafts 15 in the opposite directions of arrows c and d. The front door 14 is of an inward opening type such that it is opened inward of the front panel 12 in the direction of the arrow c about the horizontal shafts 15 against a biasing force of return springs (not shown). As shown in FIG. 45A, the disk cartridge 1 is inserted from its front end surface 1a into the cartridge insertion opening 13 in the direction of an arrow a. As shown in FIGS. 45B and 45C, the disk. cartridge 1 is further inserted horizontally through the cartridge insertion opening 13 into the disk drive 11 in such a manner that the front end surface 1a of the disk cartridge 1 pushes to open the front door 14 in the direction of the arrow c against the return springs. Thereafter, the disk cartridge 1 is drawn into the disk drive 11 by a cartridge loading mechanism (not shown) provided in the disk drive 11. During this operation, the shutter 5 of the disk cartridge 1 is slid laterally to the shutter open position to open the upper and lower windows 4. Subsequently, the disk cartridge 1 is loaded to a loading end position and the double-sided disk 2 is then rotated at a high speed by a spindle motor (not shown) provided in the disk drive 11. Further, a pair of upper and lower optical pickups (both not shown) each functioning as a data record/playback head are vertically inserted into the upper and lower windows 4, respectively, to record or reproduce data such as video data and audio data onto or from the opposite surfaces of the double-sided disk 2 simultaneously or selectively. After recording or reproducing the data, the disk cartridge 1 is ejected to be pulled out of the cartridge insertion opening 13 of the disk drive 11 in the direction of an arrow b as shown in FIG. 45A. As a result, the front door 14 is rotated in the direction of the arrow d by the return springs to close the cartridge insertion opening 13.

The conventional disk drive 11 has a door opening/closing mechanism intended to close the cartridge insertion opening 13 with the front door 14 also during recording or reproducing data onto or from the double-sided disk 2 of the disk cartridge 1 drawn into the disk drive 11, thereby preventing foreign matter, dust, etc. from entering the disk drive 11 from the cartridge insertion opening 13 during recording or reproducing data to ensure high dustproof performance. This kind of door opening/closing mechanism is so configured as to mechanically link the cartridge loading mechanism and the front door 14 by using a link, cam, etc. In ejecting the disk cartridge 1, the cartridge loading mechanism is driven to raise the disk cartridge 1 from the loading end position to the loading start position. In concert with the rising motion of the disk cartridge 1, the door opening/closing mechanism operates to open the front door 14 and allow the disk cartridge 1 to be pulled out of the cartridge insertion opening 13. After the disk cartridge 1 is ejected, the door opening/closing mechanism operates to close the front door 14 to thereby close the cartridge insertion opening 13. Further, in loading the disk cartridge 1, the cartridge loading mechanism is driven to lower the disk cartridge 1 from the loading start position to the loading end position. After the disk cartridge 1 reaches the loading end position, the door opening/closing mechanism operates to close the front door 14.

However, such a structure that the front door is opened and closed by the cartridge loading mechanism mechanically linked to the front door through a link, cam, etc. is remarkably complicated in mechanism to increase the number of parts and the number of man-hours for assembly, causing an increase in cost. Furthermore, since the front door is always linked to be opened and closed by the cartridge loading mechanism, the cartridge insertion opening is needlessly opened by operating the cartridge loading mechanism irrespective of whether the disk cartridge is present or absent in the disk drive, causing a reduction in dustproof effect. Furthermore, it is necessary to additionally provide an improper insertion prevention mechanism for preventing improper insertion (double insertion) such that although a disk cartridge has already been loaded to the loading end position by the cartridge loading mechanism, another disk cartridge may be inserted into the disk drive by mistake, thus making the structure more complicated.

SUMMARY OF THE INVENTION

It is accordingly an object of the present invention to provide a disk drive in which the cartridge insertion opening can be closed by the front door in concert with the loading operation of the disk cartridge without mechanically linking the front door to the cartridge loading mechanism.

According to the present invention, a disk cartridge is inserted into a cartridge insertion opening to inward open a front door. When the disk cartridge is inserted into a loading start position in the disk drive, the disk cartridge is lowered from the loading start position to a loading end position by a cartridge loading mechanism. At this time, the disk cartridge is separated from the front door, and the front door is biased to a door closed position by biasing means to thereby close the cartridge insertion opening.

As described above, when the disk cartridge inserted to the loading start position in the disk drive is lowered from the loading start position to the loading end position by the cartridge loading mechanism, the disk cartridge is separated from the front door, so that the front door is closed by the biasing means for normally biasing the front door toward the door closed position. Thus, it is not necessary to provide a mechanism for mechanically linking the front door to the cartridge loading mechanism.

Other objects and features of the invention will be more fully understood from the following detailed description and appended claims when taken with the accompanying drawings.

BRIEF DESCRIPTION OF THE DRAWINGS

FIGS. 18A and 18B are partially cutaway, side views for illustrating the operations subsequent to the operations shown in FIGS. 17A to 17C;

FIG. 28 is a transparent front elevation of the disk drive, showing a loading end condition of the disk cartridge;

FIG. 42 is a plan view of the disk cartridge containing a double-sided disk, showing a shutter closed condition;

FIG. 44 is a plan view of a conventional front door and a disk cartridge in combination with a front elevation of the conventional front door;

DETAILED DESCRIPTION OF THE PREFERRED EMBODIMENTS

A preferred embodiment of the disk drive according to the present invention will now be described in the following order with reference to the drawings.

Figure 1:
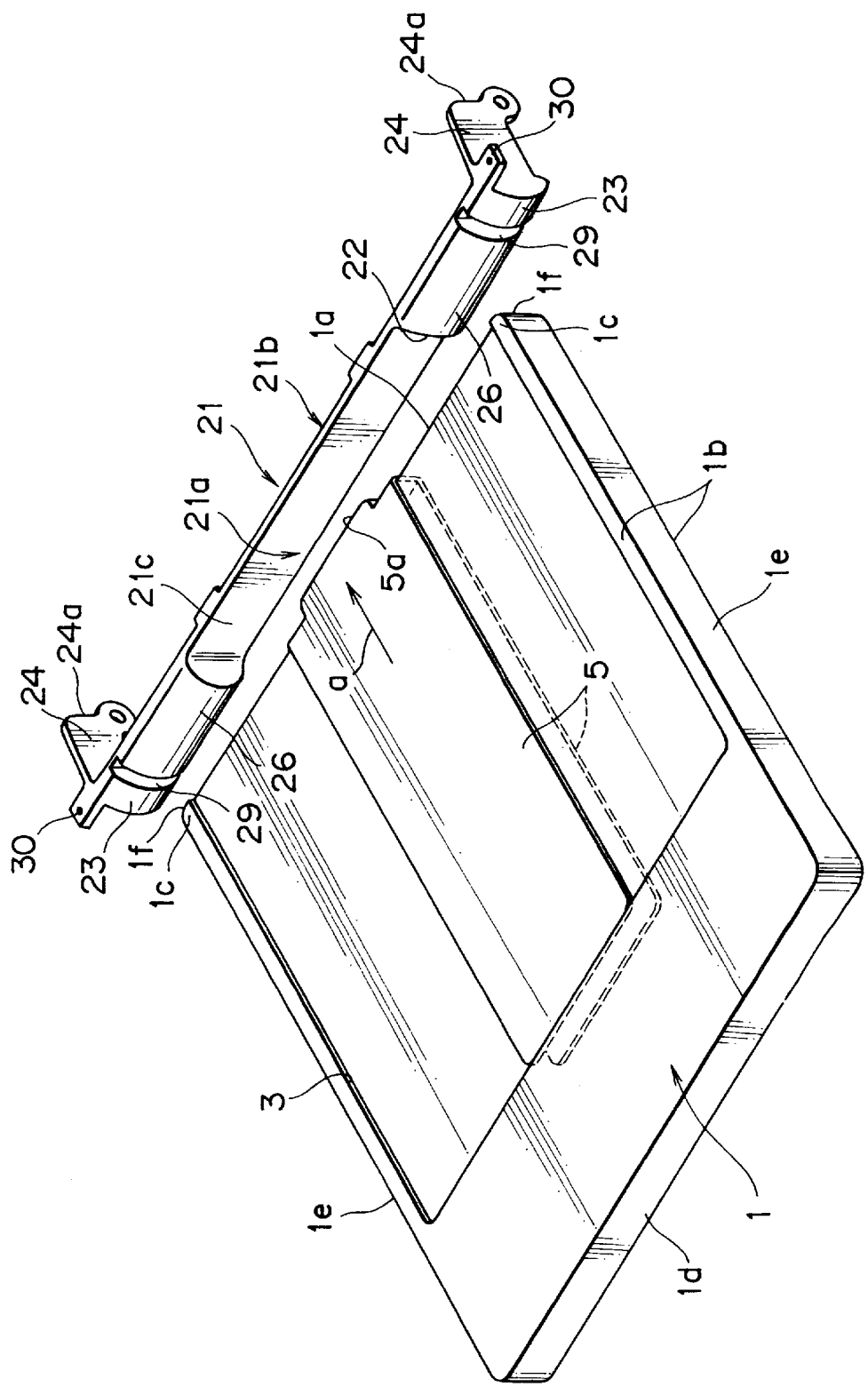
FIG. 1 is a perspective view of a disk cartridge and a front door in a preferred embodiment of the present invention.
Figure 2:
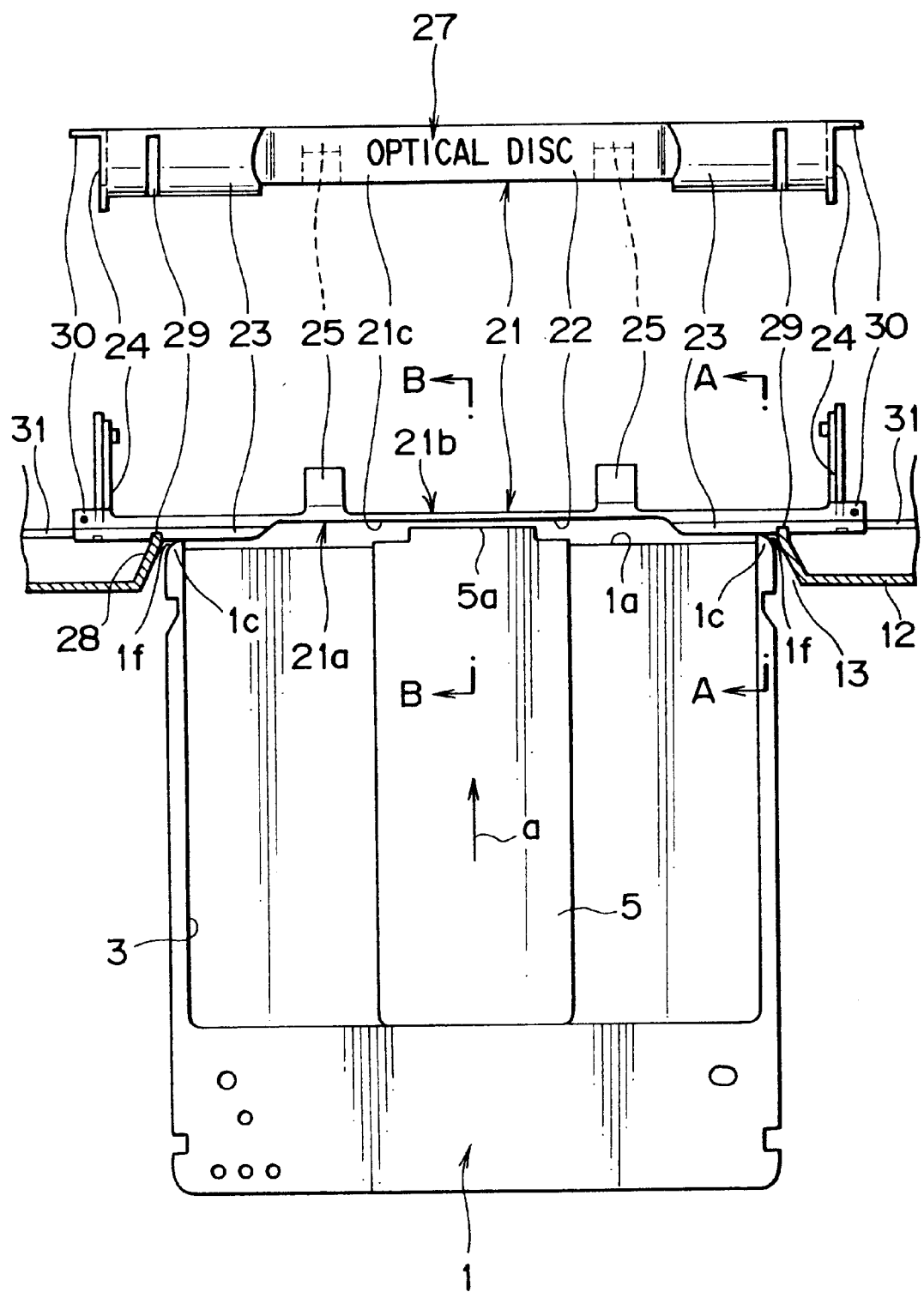
FIG. 2 is a plan view of the front door and the disk cartridge in combination with a front elevation of the front door.
Figure 43:
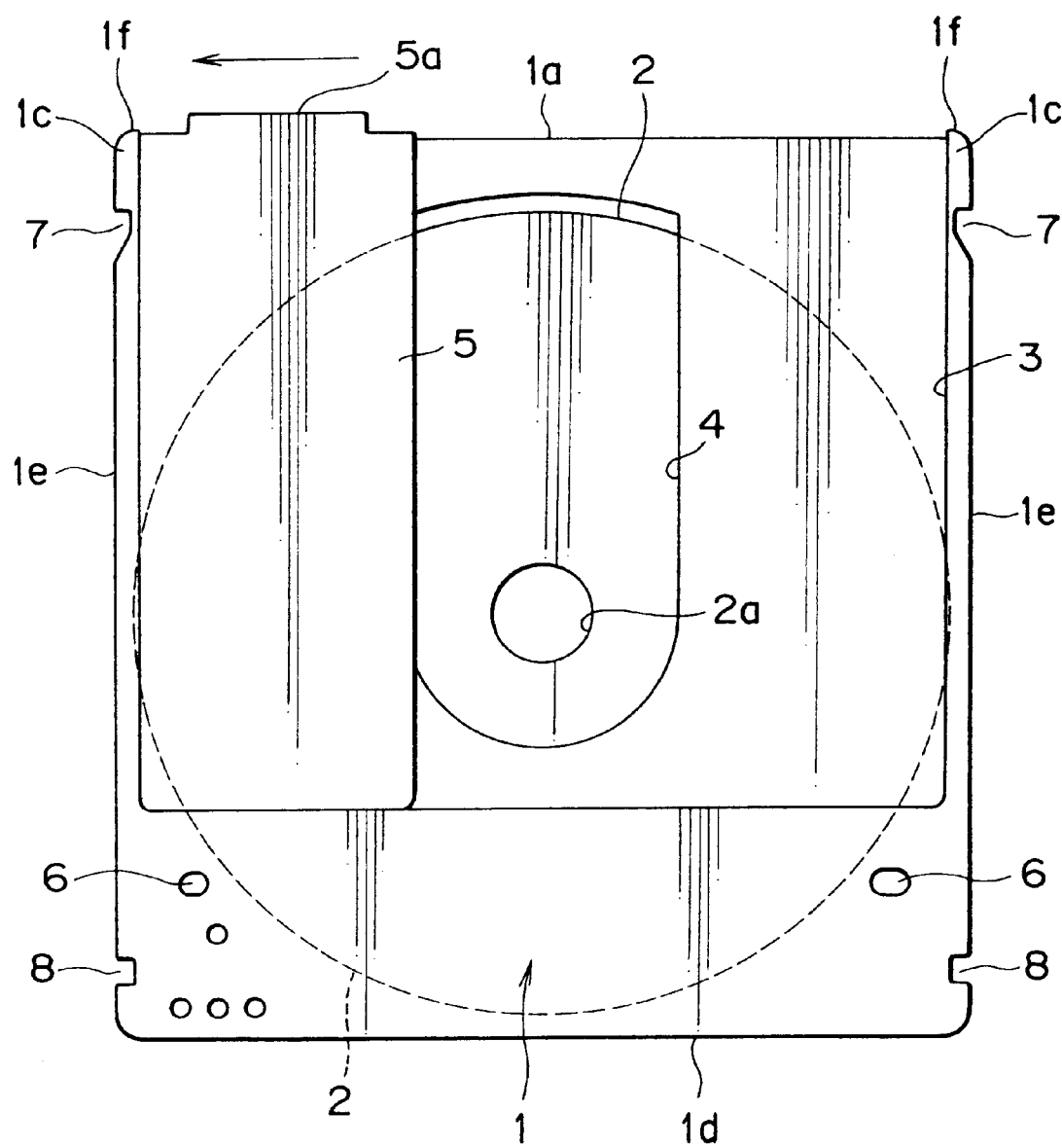
FIG. 43 is a view similar to FIG. 42, showing a shutter open condition.

(1) Description of Disk Cartridge (2) Brief Description of Disk Drive (3) Description of Cartridge Loading Mechanism (4) Description of Front Door (5) Description of Opening/Closing Mechanism for Front Door (6) Description of Dustproof Structure of Cartridge Insertion Opening (7) Description of Raising/Lowering Mechanism for optical Pickup (1) Description of Disk Cartridge A disk cartridge 1 accommodating a double-sided disk 2 will now be described with reference to FIGS. 1, 42, and 43. As described previously, the disk cartridge 1 is a substantially rectangular flat case in which the double-sided disk 2 is rotatably accommodated. The double-sided disk 2 is a recording medium such as an optical disk and a magneto-optical disk having opposite recording surfaces which data can be recorded on and reproduced from. The disk cartridge 1 has a front end surface 1a as an insertion end surface from which the disk cartridge 1 is inserted into a disk drive 11 to be hereinafter described. The disk cartridge 1 has upper and lower surfaces 1b symmetrical with each other. The upper and lower surfaces 1b are formed with a pair of upper and lower recesses 3 in a longitudinal region offset to the front end surface 1a over the substantially entire width. The upper and lower recesses 3 are formed with a pair of upper and lower elongated windows 4 each extending from a central position corresponding to a center hole 2a of the double-sided disk 2 to a front position near the center of the front end surface 1a. A dustproof shutter 5 formed from a plastic or metallic thin plate into a U-shaped structure as viewed in side elevation is mounted on the disk cartridge 1 so as to be inserted from the front end surface 1a in the upper and lower recesses 3. The shutter 5 is slidable along the front end surface 1a from its central position in one direction or opposite directions, thereby simultaneously opening the upper and lower windows 4. The shutter 5 is normally biased by a return spring (not shown) incorporated inside of the front end surface 1a of the disk cartridge 1 from a shutter open position shown in FIG. 43 to a shutter closed position shown in FIG. 42. The shutter 5 has a front end surface 5a projecting frontward by an amount slightly greater than the amount of projection of right and left corner portions 1c of the front end surface 1a of the disk cartridge 1. The central portion of the front end surface 1a of the disk cartridge 1 inclusive of the front end surface 5a of the shutter 5 is a portion weakest in strength, and the right and left corner portions 1c of the front end surface 1a of the disk cartridge 1 are portions strongest in strength. Each of the upper and lower surfaces 1b of the disk cartridge 1 is formed with a pair of right and left positioning holes 6 at a longitudinal position offset to a rear end surface 1d of the disk cartridge 1. Further, the disk cartridge 1 has right and left side surfaces 1e each formed with a notch 7 for a cartridge loading mechanism and a notch 8 for a disk changer respectively near the front and rear ends of each side surfaces 1e.

The right and left corner portions 1c of the front end surface 1a of the disk cartridge 1 are formed with laterally symmetrical round surfaces 1f adapted to come into point contact with the front surface of a front door 21 to be hereinafter described.

(2) Brief Description of Disk Drive

The disk drive 11 will now be briefly described with reference to FIGS. 26 to 35. The disk drive 11 is most suitably applied to a high-speed editing machine, in which data such as video data and audio data is simultaneously recorded on or reproduced from the opposite surfaces of the double-sided disk 2 accommodated in the disk cartridge 1, thereby realizing high recording data capacity and high data transfer rate.

The disk drive 11 has a front panel 12 formed as a molded part. The front panel 12 is formed with a laterally elongated cartridge insertion opening 13. An eject button 20 is mounted on the front panel 12 at a position below the cartridge insertion opening 13. A front door 21 for openably closing the cartridge insertion opening 13 from its inside is pivotably mounted inside the front panel 12. A turntable 41 and a spindle motor 42 for rotationally driving the turntable 41 are located at a lower portion in the disk drive 11 behind the front door 21 (on the rear side of the front door 21 in respect of the direction shown by an arrow a), and a chucking mechanism 43 is located above the turntable 41. A pair of lower and upper optical pickups 44 and 45 as heads for recording/reproducing data simultaneously on/from the lower and upper surfaces of the double-sided disk 2 are located behind the turntable 41 and the chucking mechanism 43, respectively. The spindle motor 42 and the lower optical pickup 44 are mounted together with a linear motor (seek mechanism), not shown, on the upper surface of a lower base plate 46 so as to be directed upward, whereas the chucking mechanism 43 and the upper optical pickup 45 are mounted together with a linear motor (seek mechanism), not shown, on the lower surface of an upper base plate 47 so as to be directed downward.

A cartridge loading mechanism 51 is located behind the front panel 12. A cartridge holder 52 is horizontally provided between the lower base plate 46 and the upper base plate 47. The cartridge loading mechanism 51 is so configured as to horizontally drive the cartridge holder 52, in the opposite directions shown by arrows a and b between a cartridge receiving position where the cartridge holder 52 is positioned close to the cartridge insertion opening 13 so as to be advanced in the direction of the arrow b and a loading start position where the cartridge holder 52 is positioned behind the cartridge receiving position so as to be horizontally retracted in the direction of the arrow a and also to vertically drive the cartridge holder 52 in the opposite directions shown by arrows e and f between the loading start position and a loading end position where the cartridge holder 52 is positioned below the loading start position. A raising/lowering mechanism 71 for raiding and lowering the upper base plate 47 in the directions of the arrows e and f is located on the right and left sides of the lower and upper base plates 46 and 47 so as to be driven by the cartridge loading mechanism 51.

In operation, when the disk cartridge 1 is horizontally inserted from its front end surface 1a through the cartridge insertion opening 13 in the direction of the arrow a, the front door 21 is pushed by the disk cartridge 1 to be pivotally moved in the direction shown by the arrow c, and the disk cartridge 1 is inserted into the cartridge holder 52 in the direction of the arrow a. At this time, the shutter 5 of the disk cartridge 1 shown in FIG. 42 is slid sideways from a shutter closed position shown in FIG. 42 to a shutter open position shown in FIG. 43 by a shutter opening/closing mechanism (not shown) mounted on the cartridge holder 52, thereby simultaneously opening the upper and lower windows 4 of the disk cartridge 1. Simultaneously with ending of insertion of the disk cartridge 1 into the cartridge holder 52, a pair of right and left latch means (not shown) mounted on the cartridge holder 52 come into engagement with the right and left notches 7 of the disk cartridge 1 shown in FIG. 43 to thereby mechanically hold the disk cartridge 1 in the cartridge holder 52.

Figure 31:
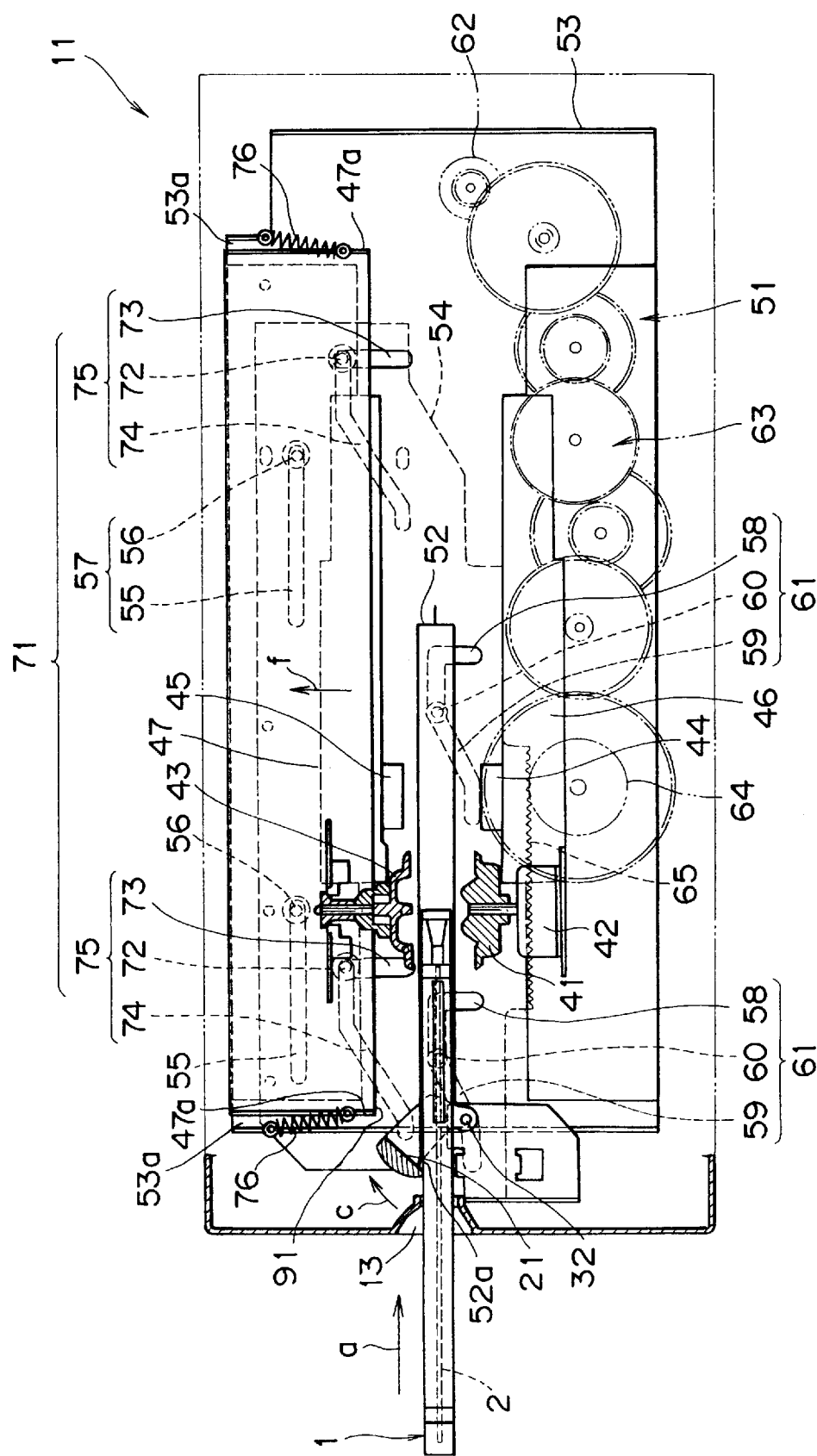
FIG. 31 is a transparent side view showing a cartridge receiving condition of a cartridge loading mechanism and a raising/lowering mechanism in the disk drive.
Figure 32:
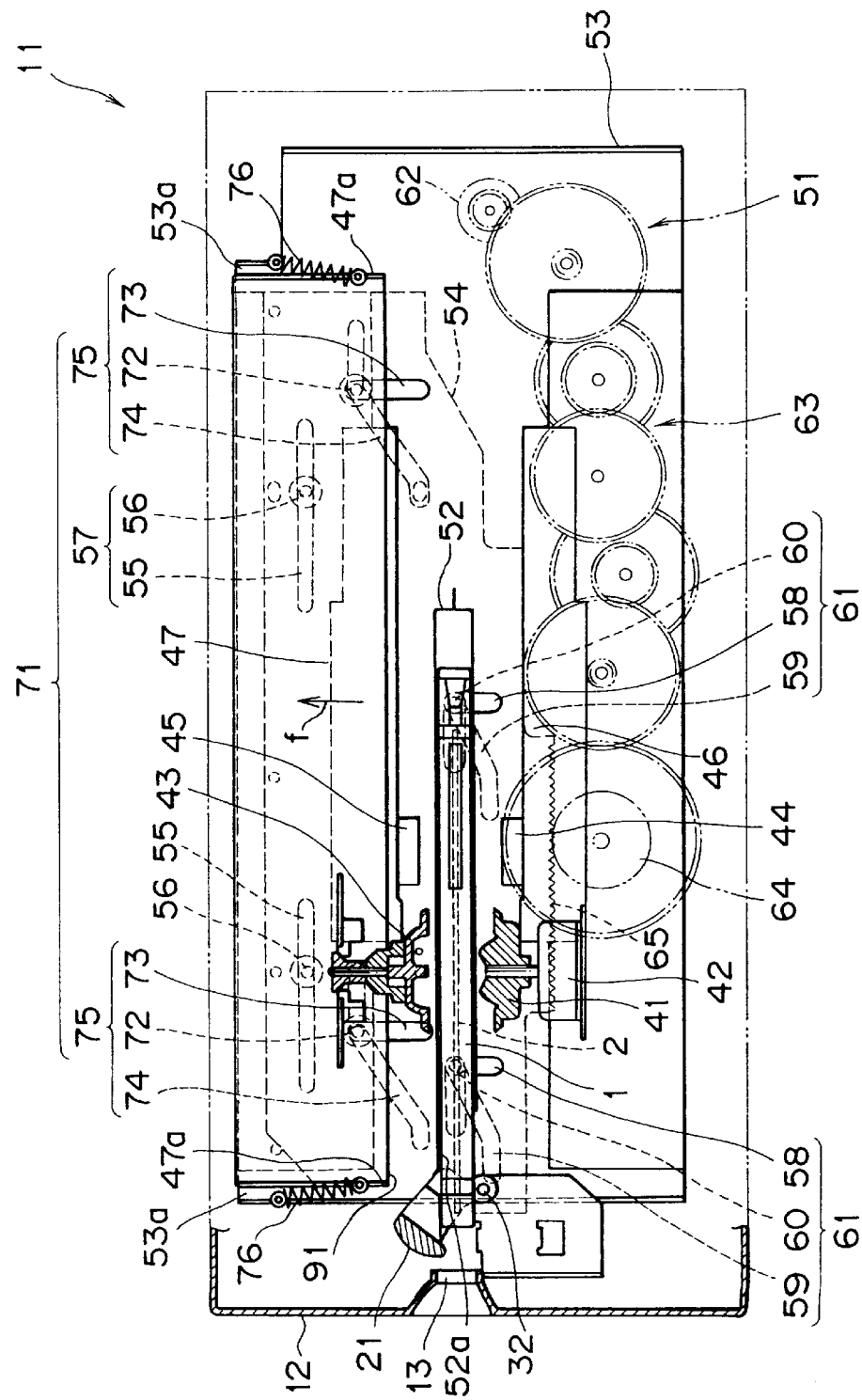
FIG. 32 is a view similar to FIG. 31, showing a cartridge loading start condition.

When the ending of insertion of the disk cartridge 1 into the cartridge holder 52 is detected by a sensor, the cartridge loading mechanism 51 is operated to horizontally retract the cartridge holder 52 holding the disk cartridge 1 in the direction of the arrow a from the cartridge receiving position shown in FIG. 31 to the loading start position shown in FIG. 32. In the loading start position, the center hole 2a of the double-sided disk 2 in the disk cartridge 1 is positioned just over the turntable 41, and the lower and upper windows 4 of the disk cartridge 1 are positioned between the lower and upper optical pickups 44 and 45. Then, the cartridge holder 52 is vertically lowered in the direction of the arrow e from the loading start position to the loading end position shown in FIG. 33 until the disk cartridge 1 is loaded on the lower base plate 46 and positioned by means of positioning means (not shown). In this loading end position, the turntable 41 and the lower optical pickup 44 on the lower base plate 46 are relatively inserted in the lower window 4 of the disk cartridge 1, so that the double-sided disk 2 is horizontally mounted at its center hole 2a on the turntable 41, and the lower surface of the double-sided disk 2 is positioned close to the lower optical pickup 44.

Figure 33:
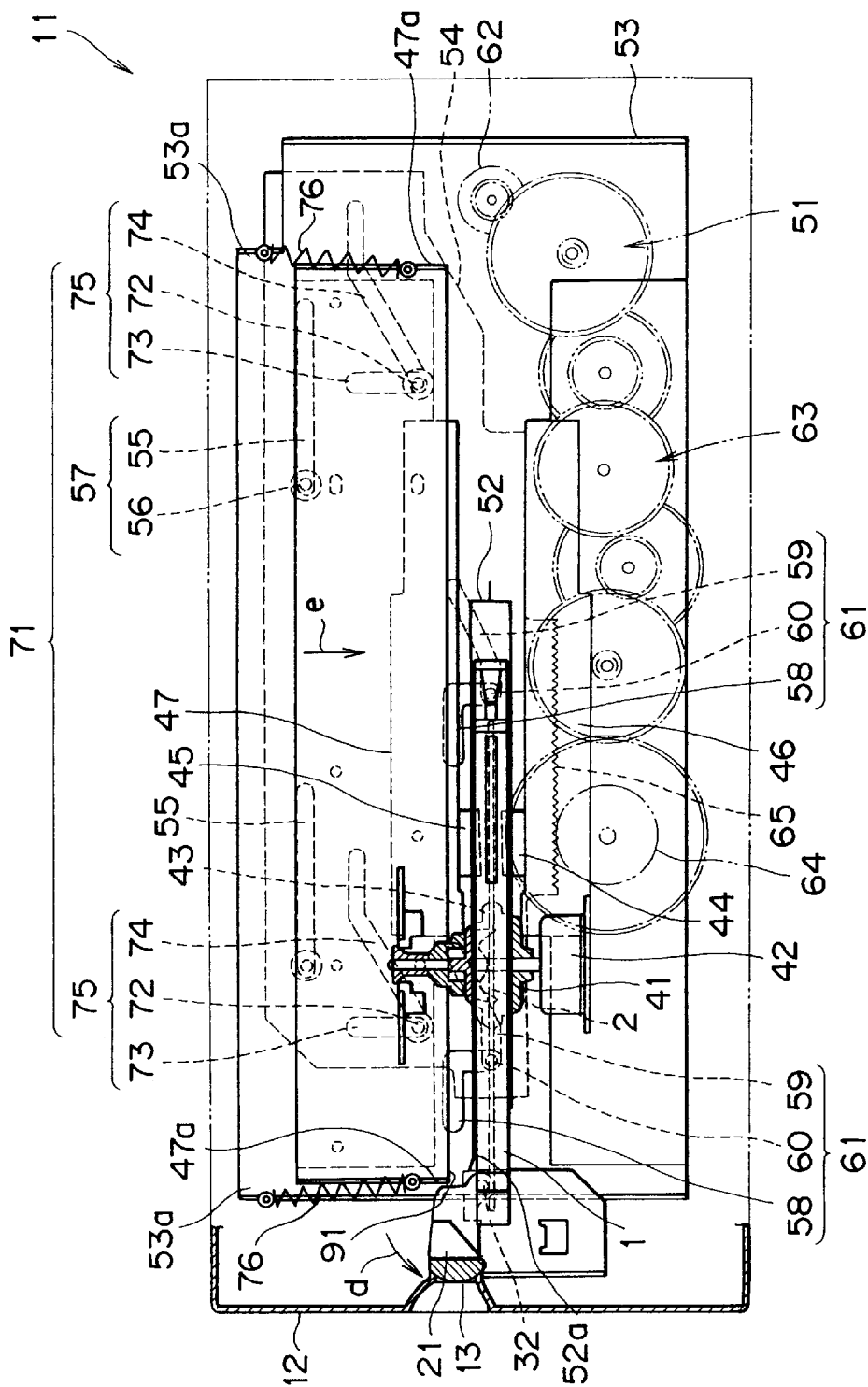
FIG. 33 is a view similar to FIG. 31, showing a cartridge loading end condition.
Figure 34:
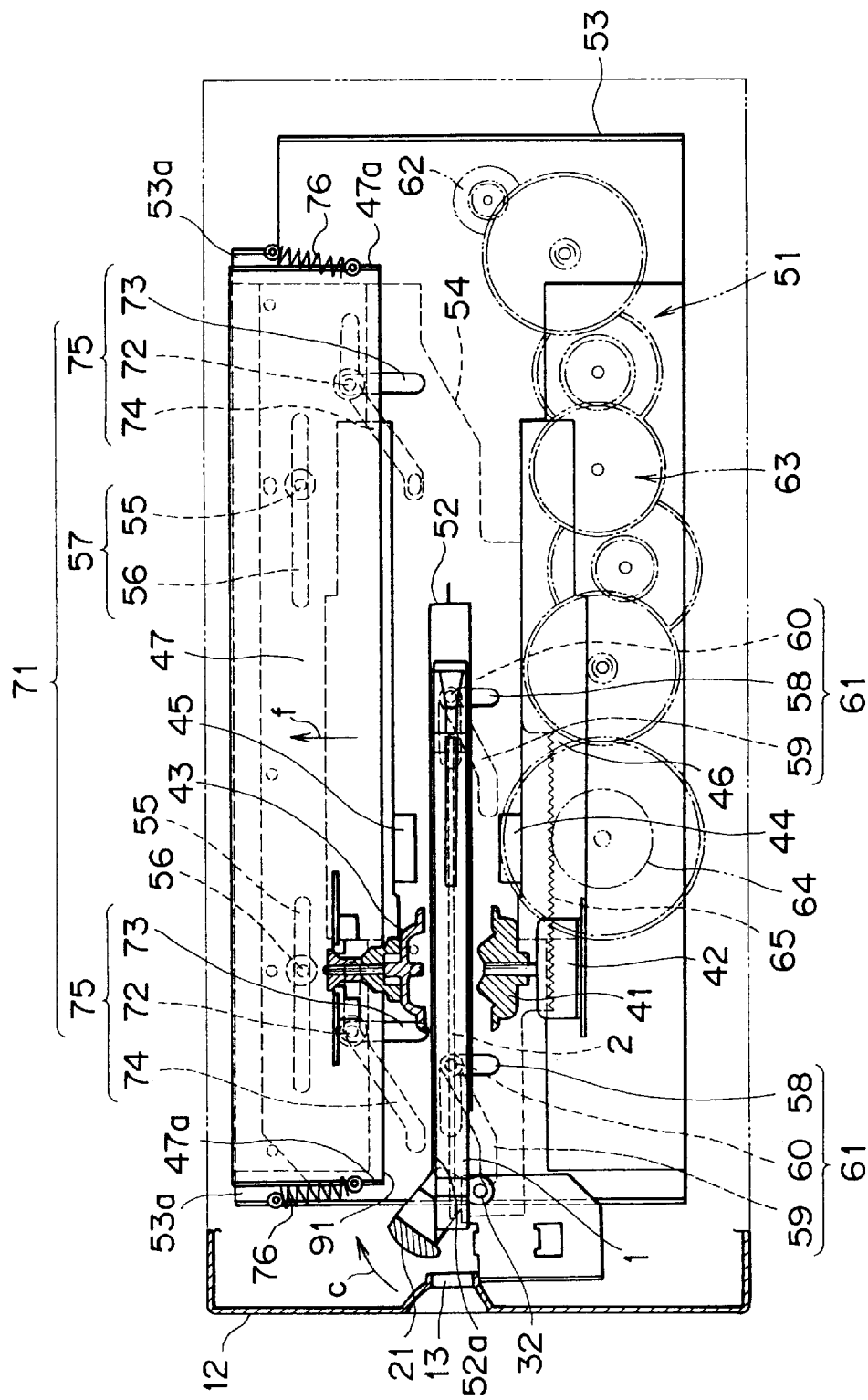
FIG. 34 is a view similar to FIG. 31, showing a cartridge ejecting start condition.
Figure 35:
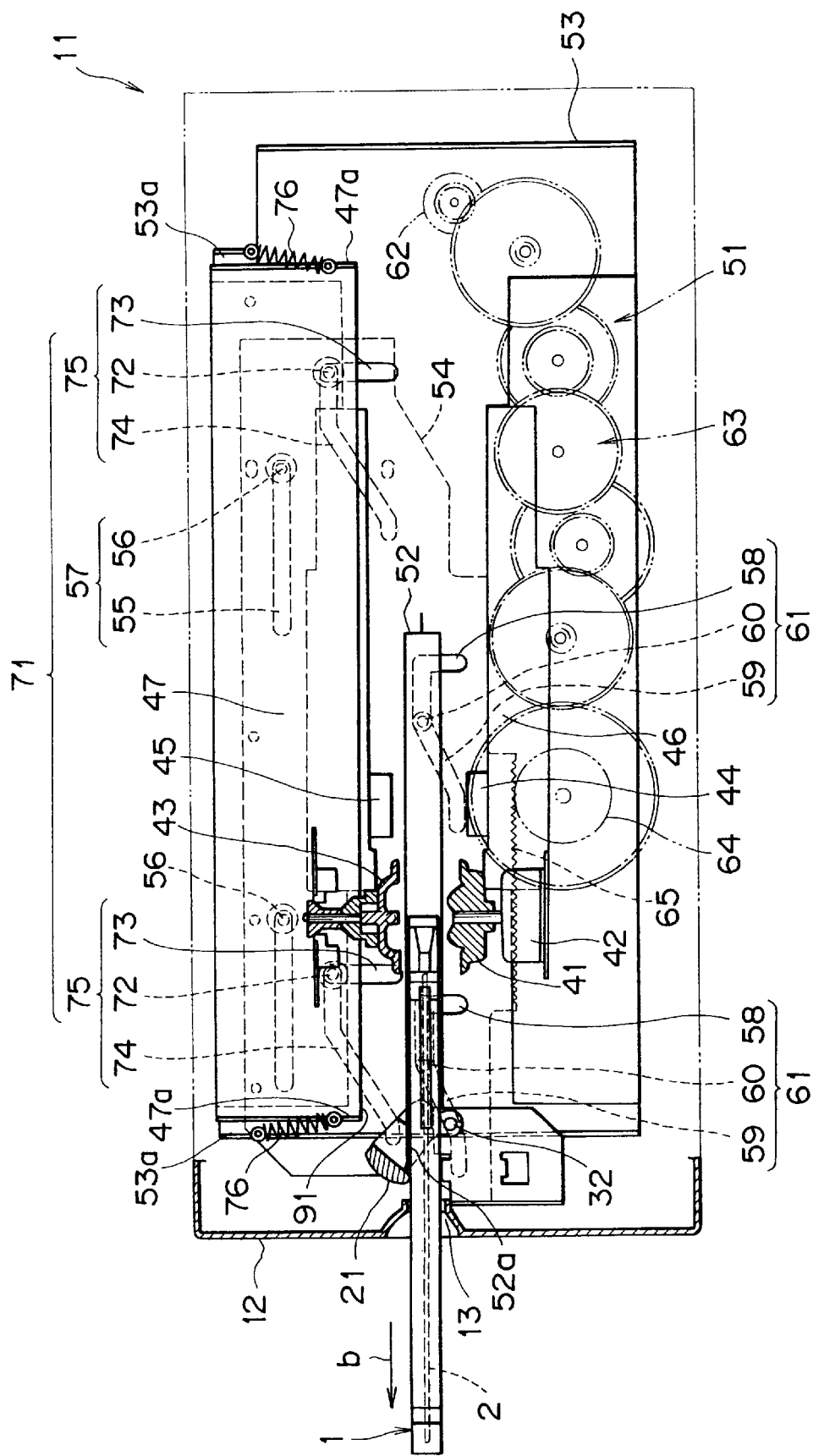
FIG. 35 is a view similar to FIG. 31, showing a cartridge ejecting end condition.

In synchronism with this cartridge loading operation, the raising/lowering mechanism 71 is driven by the cartridge loading mechanism 51 to vertically lower the upper base plate 47 from an upper position shown in FIGS. 31 and 32 to a lower position shown in FIG. 33 in the direction of the arrow e. Then, the chucking mechanism 43 and the upper optical pickup 45 are inserted into the upper window 4 of the disk cartridge 1 to accurately fix the double-sided disk 2 to the turntable 41, by means of the chucking mechanism 43 and to position the upper optical pickup 45 close to the upper surface of the double-sided disk 2, thus ending the cartridge loading operation. At this time, the upper base plate 47 is positioned to the lower base plate 46 by means of positioning means (not shown), and presses the disk cartridge 1 from the upper side to fix the same.

After ending the cartridge loading operation, the spindle motor 42 is operated to rotationally drive the turntable 41 and the double-sided disk 2 fixed thereto at a high speed, and the lower and upper optical pickups 44 and 45 are operated to record or reproduce data such as video data and audio data simultaneously on or from the lower and upper surfaces of the double-sided disk 2.

After recording or reproducing data, the eject button 20 on the front panel 12 is depressed by an operator to eject the disk cartridge 1. When the eject button 20 is depressed, an eject command signal is output from a microcomputer in a control system for the disk drive, so that the cartridge loading mechanism 51 and the raising/lowering mechanism 71 are driven to perform the above loading operation in reverse order. More specifically, the upper base plate 47 is vertically raised from the lower position shown in FIG. 33 to the upper position shown in FIG. 34 in the direction of the arrow f to upward move the chucking mechanism 43 and the upper optical pickup 45 away from the disk cartridge 1, and the cartridge holder 52 holding the disk cartridge 1 is vertically raised from the loading end position shown in FIG. 33 to the loading start position shown in FIG. 34 in the direction of the arrow f. Thereafter, the cartridge holder 52 is horizontally advanced to the cartridge receiving position shown in FIG. 35 in the direction of the arrow b. At the moment the cartridge holder 52 reaches the cartridge receiving position, the right and left latch means mechanically holding the disk cartridge 1 in the cartridge holder 52 are released from the right and left notches 7 of the disk cartridge 1, and the disk cartridge 1 is ejected from the cartridge insertion opening 13 in the direction of the arrow b with the shutter 5 being slidingly returned from the shutter open position shown in FIG. 43 to the shutter closed position shown in FIG. 42 by the shutter opening/closing mechanism.

The disk drive 11 is provided with a door opening/closing mechanism 81 to be hereinafter described. In the loading operation of the disk cartridge 1, the front door 21 is pushed to be opened in the direction of the arrow c by the disk cartridge 1 inserted through the cartridge insertion opening 13 in the direction of the arrow a until the disk cartridge 1 reaches the loading start position shown in FIG. 32, and the disk cartridge 1 is subsequently lowered to the loading end position shown in FIG. 33 in the direction of the arrow e. In concert with this lowering operation of the disk cartridge 1, the front door 21 is automatically closed in the direction of the arrow d by the door opening/closing mechanism 81 to close the cartridge insertion opening 13 from its inside, thereby ensuring a dustproof effect during recording or reproducing data on or from the double-sided disk 2. Further, also in the ejecting operation of the disk cartridge 1, the front door 21 is automatically opened in the direction of the arrow c by the door opening/closing mechanism 81 during the raising operation of the disk cartridge 1 from the loading end position shown in FIG. 33 to the loading start position shown in FIG. 34 in the direction of the arrow f, thereby allowing ejection of the disk cartridge 1 from the cartridge insertion opening 13 in the direction of the arrow b.

Further, the disk drive 11 is provided with door locking means 91 to be hereinafter described. The door locking means 91 functions to mechanically lock the front door 21 closed in the direction of the arrow d when the disk cartridge 1 reaches the loading end position shown in FIG. 33, thereby realizing prevention of double insertion such that while data is being recorded or reproduced on or from the double-sided disk 2 in the disk cartridge 1, another disk cartridge 1 may be inserted from the cartridge insertion opening 13 by mistake.

(3) Description of Cartridge Loading Mechanism

The cartridge loading mechanism 51 will now be described with reference to FIGS. 27 to 41. The cartridge loading mechanism 51 includes a pair of vertically rising, right and left side plates 53 fixed in parallel to the right and left side surfaces of the lower base plate 46, and a pair of vertically rising, right and left slide plates 54 slidably mounted in parallel to the outer side surfaces of the right and left side plates 53. Each of the right and left side plates 53 is formed with a pair of front and rear horizontal guide slots 55, and each of the right and left slide plates 54 is provided with a pair of front and rear guide pins 56 fixedly projecting inward to slidably engage the front and rear horizontal guide slots 55. Each horizontal guide slot 55 and the corresponding horizontal guide pin 56 slidably engaging therewith constitute a horizontal guide mechanism 57. Accordingly, the right and left slide plates 54 are guided by the totally four horizontal guide mechanisms 57 to slidably move along the right and left side plates 53 in the directions of the arrows a and b.

Figure 40:
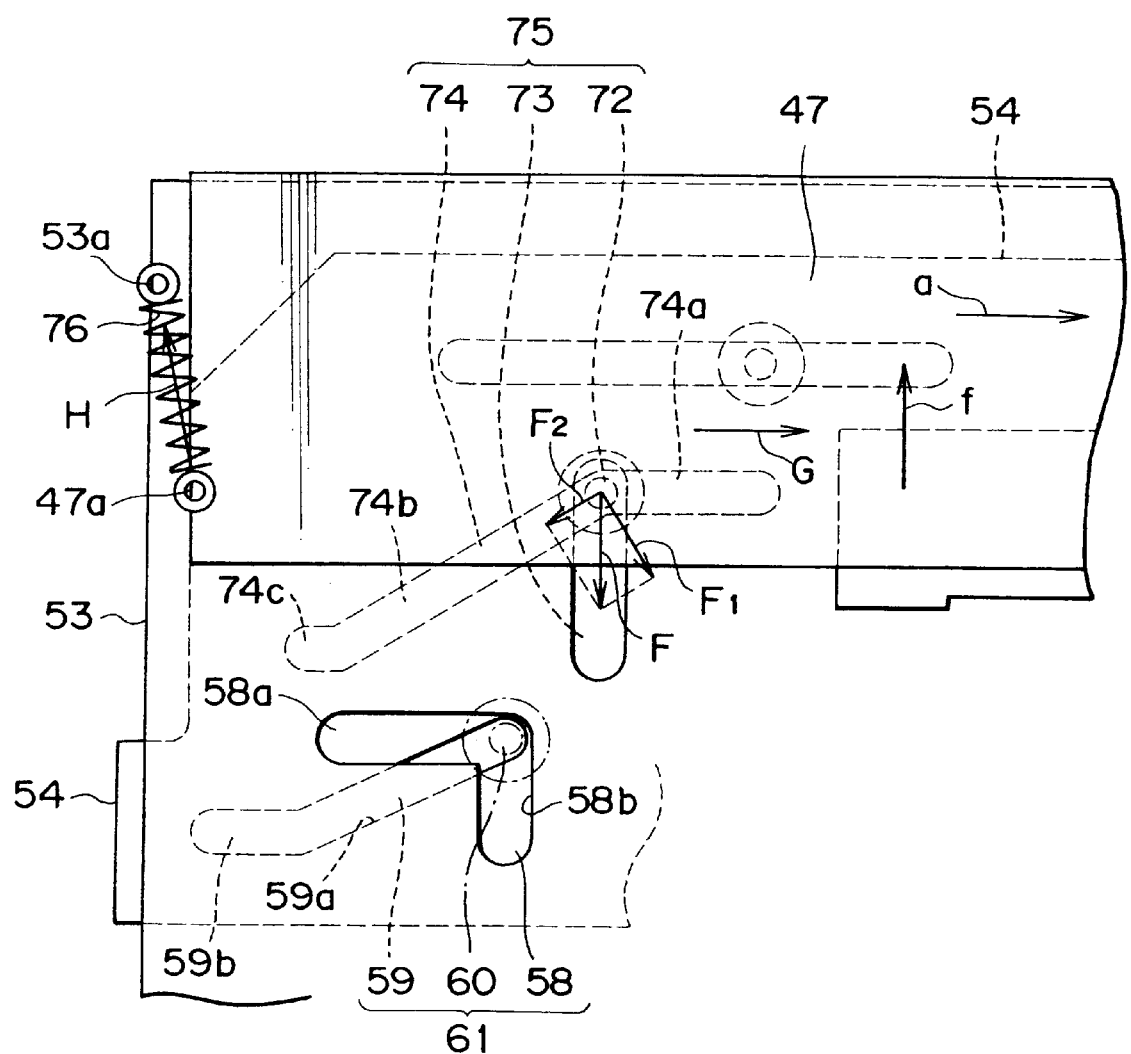
FIG. 40 is a side view for illustrating the function of each extension coil spring in lowering the upper base plate through the raising/lowering mechanism.

The cartridge holder 52 is a rectangular flat case having an opening 52a for receiving the disk cartridge 1 on the flat panel 12 side. The cartridge holder 52 is horizontally located between the right and left side plates 53 at a position offset to the front panel 12. Each of the right and left side plates 53 is further formed with a pair of front and left L-shaped guide slots 58, and each of the right and left slide plates 54 is formed with a pair of front and rear cam slots 59. Further, a pair of front and rear guide pins 60 are fixed to each of the right and left side surfaces of the cartridge holder 52. The front guide pin 60 on each side is slidably inserted through the intersection of the front L-shaped guide slot 58 and the front cam slot 59, and the rear guide pin 60 on each side is slidably inserted through the intersection of the rear L-shaped guide slot 58 and the rear cam slot 59. Each guide slot 58, the corresponding cam slot 59, and the corresponding guide pin 60 constitute a slide cam mechanism 61. Accordingly, the cartridge holder 52 is guided by the totally four slide cam mechanisms 61 in the condition where it is interposed between the right and left side plates 53 to horizontally move in the directions of the arrows a and b and to vertically move in the directions of the arrows e and f. As shown in FIG. 40, each L-shaped guide slot 58 is composed of a horizontal portion 58a and a vertical portion 58b extending downward from the rear end of the horizontal portion 58a, and each cam slot 59 is composed of a slant portion 59a and a horizontal portion 59b extending frontward from the front end of the slant portion 59a.

A pair of right and left gear trains 63 synchronously driven by a single compact drive motor 62 are mounted on the outer sides of the right and left side plates 53 at their lower positions. A pair of right and left pinions 64 located at the output ends of the right and left gear trains 63 are in mesh with a pair of right and left racks 65 horizontally formed along the lower ends of the right and left slide plates 54.

Accordingly, by simultaneously driving the right and left pinions 64 through the right and left gear trains 63 by means of the single drive motor 62 in normal and reverse directions, the right and left racks 65 can be driven by the right and left pinions 64 in normal and reverse directions to thereby simultaneously slide the right and left slide plates 54 along the horizontal guide slots 55 of the right and left side plates 53 in the directions of the arrows a and b. When the right and left slide plates 54 are simultaneously slid in the directions of the arrows a and b, the guide pins 60 fixed to the cartridge holder 52 are slid along the L-shaped guide slots 58 both in the horizontal directions of the arrows a and b and in the vertical directions of the arrows e and f by the cam operation of the cam slots 59 of the slide cam mechanisms 61 provided between the right slide plate 54 and the right side surface of the cartridge holder 52 and between the left slide plate 54 and the left side surface of the cartridge holder 52. As a result, the cartridge holder 52 can be slid along the L-shaped guide slots 58 from the cartridge receiving position through the loading start position to the loading end position and from the loading end position through the loading start position to the cartridge receiving position.

(4) Description of Front Door

The front door 21 will now be described with reference to FIGS. 1 to 4C and FIGS. 6 to 12. As shown in FIGS. 1 to 4C, the front door 21 is a laterally elongated member formed by aluminum die casting or molding. The front door 21 has a front surface 21a formed at its central portion with a recess 22 as an escape portion for accepting the projected front end surface 5a of the shutter 5 of the disk cartridge 1. A pair of round projections 23 each having a segmental cross section are formed on the right and left sides of the recess 22 to function as contact portions adapted to come into contact with the corner portions 1c of the disk cartridge 1. The round projections 23 of the front door 21 constitute a cartridge contact portion according to the present invention. The front door 21 has a rear surface 21b formed at its laterally opposite ends with a pair of right and left arms 24 projecting at right angles to the rear surface 21b. A pair of right and left guide protections 25 serving also as a pair of right and left reinforcing ribs are formed on the rear surface 21b at laterally spaced positions between the right and left arms 24 so as to project at right angles to the rear surface 21b. Each of the right and left guide projections 25 is formed at its lower portion with a slant surface 25a. Further, each of the right and left round projections 23 has a front round surface 26 curved in the vertical direction of the front door 21. As will be hereinafter described, the front round surface 26 has a radius of curvature approximated to the radius of turn of the front door 21 about a fulcrum O. The bottom surface of the recess 22 formed on the front surface 21a is formed as a flat display surface 21c, on which a display 27 such as OPTICAL DISC or any other characters/symbols is provided. Further, the whole surface of the recess 22 and the right and left round projections 23 of the front door 21 is coated with an anodized aluminum film or a transparent resin film to prevent surface flawing and improve slidability.

The cartridge insertion opening 13 of the front panel 12 is defined by a flat, rectangular cylindrical opening wall 28 projecting from the inside of the front panel 12 so as to be tapered rearward (in the direction of the arrow a). The opening wall 28 has a pair of right and left vertical side portions 28c whose rear ends are normally inserted in a pair of right and left vertical slits 29 formed on the right and left round projections 23 of the front door 21. Each of the slits 29 is formed at a laterally intermediate position on the corresponding round projection 23.

As shown in FIGS. 6 to 12, a pair of right and left front door mounting plates 31 each formed from a sheet metal or the like are mounted on the inside of the front panel 12 at positions on the right and left sides of the cartridge insertion opening 13 by means of screws or the like so as to vertically extend in parallel to each other. The right and left arms 24 of the front door 21 are inserted between the right and left mounting plates 31, and the rear end portions of the right and left arms 24 are pivotably mounted through a pair of right and left aligned horizontal pivot shafts 32 to the upper end portions of the right and left mounting plates 31 so as to be rotated in the directions of the arrows c and d.

Figure 10:
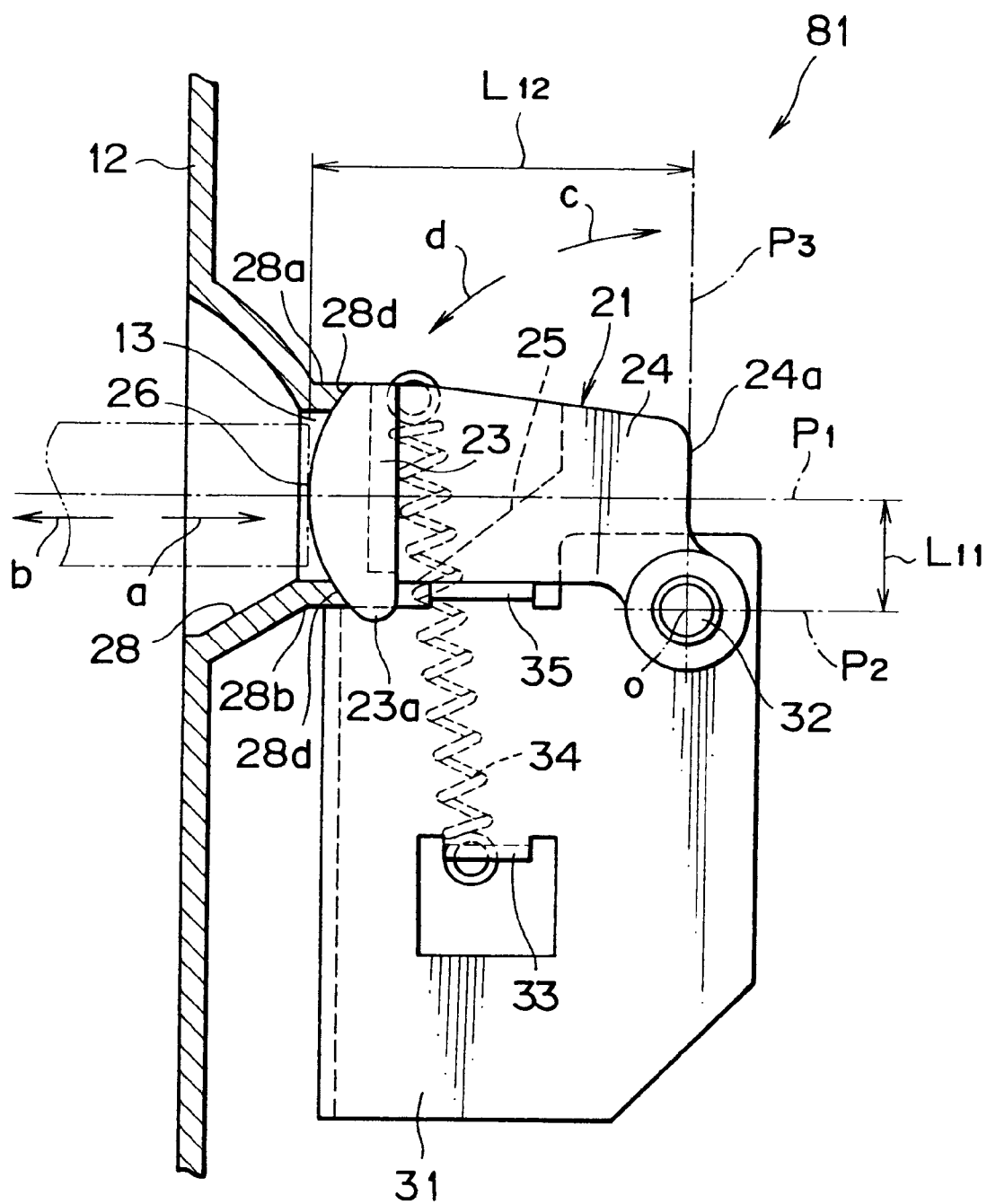
FIG. 10 is an enlarged sectional side view taken along the line C—C in FIG. 8.

As shown in FIG 10, the coordinates of the fulcrum O as the axis of each pivot shaft 32 are set at a vertical position P2 lowered by a given distance L11 from vertically central position P1 of the cartridge insertion opening 13 and at a horizontal position P3 retracted by a given distance L12 from the cartridge insertion opening 13 to the rear side (in the direction of the arrow a). Accordingly, the front door 21 is pivotable about the fulcrum O in the rearward and upward direction shown by the arrow c and in the frontward and downward direction shown by the arrow d. A pair of right and left spring retainers 30 are formed at the right and left end portions of the front door 21 at its upper position, and a pair of right and left spring retainers 33 are formed on the right and left front door mounting plates 31. A pair of right and left extension coil springs 34 as biasing means (return spring) according to the present invention extend between the right spring retainer 30 of the front door 21 and the right spring retainer 33 of the right front door mounting plate 31 and between the left spring retainer 30 of the front door 21 and the left spring retainer 33 of the left front door mounting plate 31. Accordingly, the front door 21 is normally biased by the right and left extension coil springs 34 in the door closing direction shown by the arrow d. A pair of right and left stoppers 35 are formed on the right and left mounting plates 31 at their upper end portions so that the right and left arms 24 of the front door 21 biased by the extension coil springs 34 in the door closing direction abut against the right and left stoppers 35, thereby defining a door closed position of the front door 21. In this door closed position of the front door 21, the rear ends of the right and left side portions 28c of the opening wall 28 are relatively inserted in the right and left slits 29 of the front door 21.

Figure 3A:
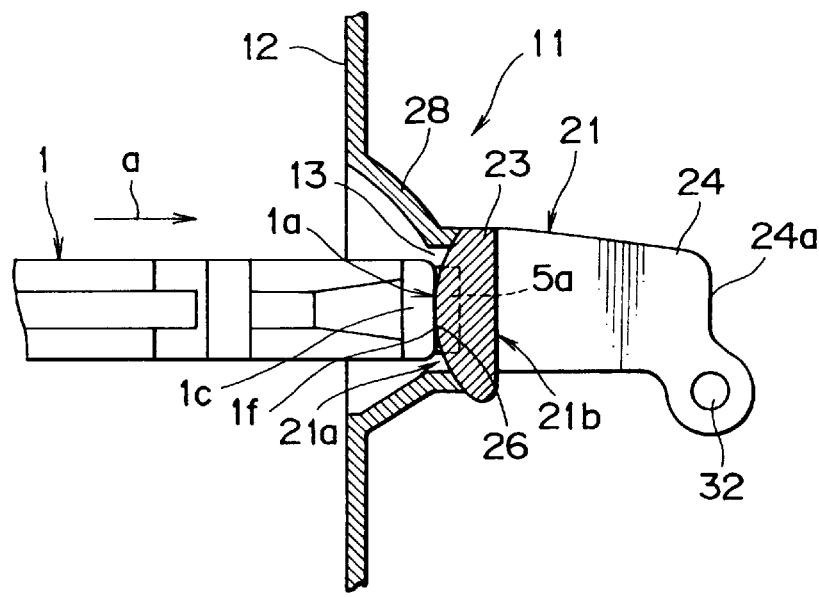
FIG. 3A is an enlarged sectional side view taken along the line A—A in FIG. 2.
Figure 3B:
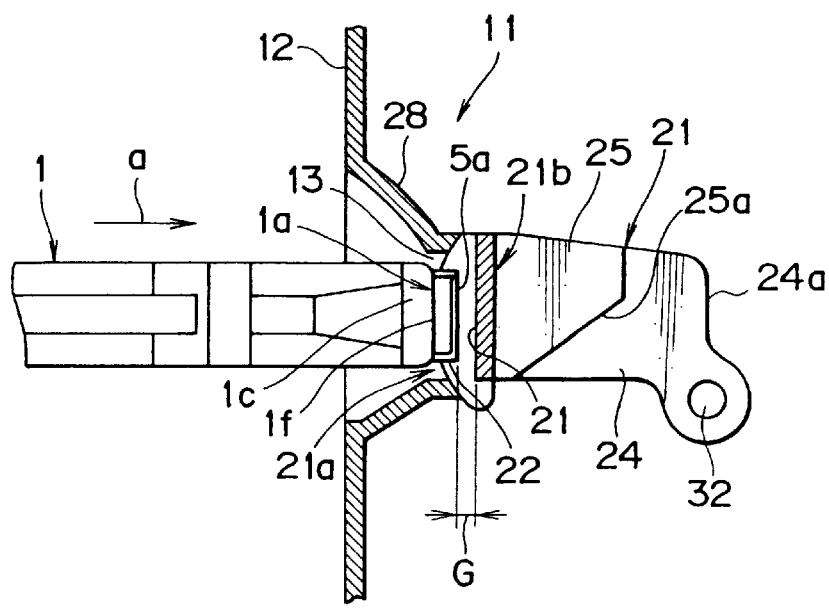
FIG. 3B is an enlarged sectional side view taken along the line B—B in FIG. 2.
Figure 4A:
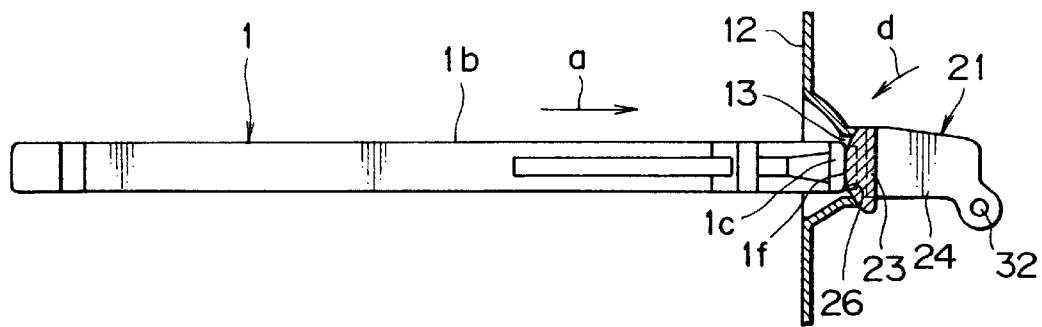
FIGS. 4A, 4B, and 4C are partially cutaway, side views for illustrating a door opening operation wherein the front door is pushed to be opened inside a cartridge insertion opening by the disk cartridge.
Figure 4B:
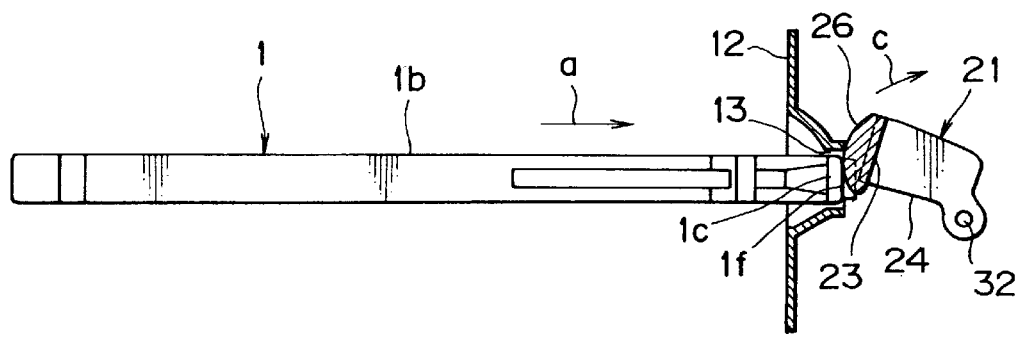
Figure 4C:
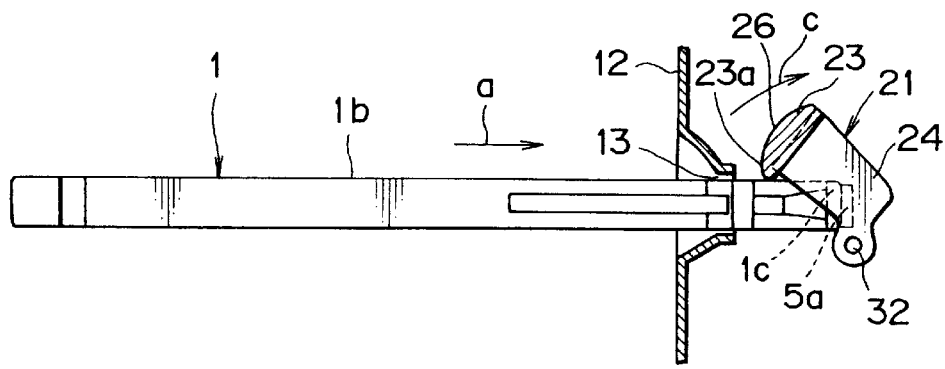

In operation, when the disk cartridge 1 is horizontally inserted from its front end surface 1a into the cartridge insertion opening 13 of the disk drive 11 in the direction of the arrow a as shown in FIGS. 1 to 3B, the front door 21 is pushed to be pivotally moved by the disk cartridge 1 about the fulcrum O to a door open position in the direction of the arrow c against the extension coil springs 34 as shown in FIGS. 4A, 4B, and 4C. In this door opening operation, the front door 21 can be opened safely and smoothly without any collision of the front end surface 5a of the shutter 5 of the disk cartridge 1 against the front surface 21a of the front door 21.

More specifically, in inserting the disk cartridge 1 into the cartridge insertion opening 13, the shutter 5 of the disk cartridge 1 is held in the shutter closed position set at the laterally central portion of the disk cartridge 1 by the return spring mounted therein. Accordingly, when the disk cartridge 1 is horizontally inserted into the cartridge insertion opening 13 in the direction of the arrow a, the front end surface 5a of the shutter 5 is inserted into the recess 22 of the front door 21 at its central position, and the right and left corner portions 1c of the front end surface 1a of the disk cartridge 1 come into contact with the right and left round projections 23 of the front door 21. At this time, there is defined a gap G between the front end surface 5a of the shutter 5 and the display surface 21c as the bottom surface of the recess 22 of the front door 21 as shown in FIG. 3B, thus avoiding the contact of the front end surface 5a and the display surface 21c.

Accordingly, there is no possibility that a large load may be applied to the central portion of the front end surface 1a of the disk cartridge 1 inclusive of the front end surface 5a of the shutter 5 which portion is the weakest in strength. Furthermore, the front door 21 can be strongly opened in the direction of the arrow c against the extension coil springs 34 by the right and left corner portions 1c strongest in strength of the front end surface 1a of the disk cartridge 1. As a result, it can be prevented that the weakest central portion of the front end surface 1a of the disk cartridge 1 inclusive of the front end surface 5a of the shutter 5 may be damaged by a large load in inserting the disk cartridge 1 into the cartridge insertion opening 13, and that the front end surface 5a of the shutter 5 may come into direct contact with the display surface 21c of the front door 21 to cause flawing of these surfaces 5a and 21c. That is, there is no possibility that the display 27 on the display surface 21c may be flawed, and the front door 21 can be opened safely and strongly in the direction of the arrow c by the strongest corner portions 1c of the front end surface 1a of the disk cartridge 1.

Moreover, the front surfaces of the right and left round projections 23 of the front door 21 are formed as the round surfaces 26, and the right and left corner portions 1c of the front end surface 1a of the disk cartridge 1 are formed with the laterally symmetrical round surfaces 1f adapted to come into contact with the round surfaces 26 of the right and left round projections 23 of the front door 21. Accordingly, when the round surfaces 1f of the right and left corner portions 1c come into contact with the round surfaces 26 of the right and left round projections 23 in the direction of the arrow a, the contact between the round surfaces 1f and the round surfaces 26 becomes point contact minimized in contact resistance (frictional resistance). Accordingly, a sliding load of the front door 21 pivotally moving in the direction of the arrow c with respect to the disk cartridge 1 being inserted in the direction of the arrow a can be minimized, so that a horizontal force of the disk cartridge 1 pushing the front door 21 in the direction of the arrow a can be smoothly converted into a turning force of the front door 21 in the direction of the arrow c. Thus, the front door 21 can be opened in the direction of the arrow c smoothly (i.e., can be turned lightly by a weak force). Moreover, since each round surface 26 of the front door 21 has a radius of curvature approximated to the radius of turn of the front door 21 about the fulcrum O, the front door 21 can easily escape in the direction of the arrow c upon contact with the right and left corner portions 1c of the disk cartridge 1, thereby facilitating smooth opening of the front door 21 in the direction of the arrow c. FIG. 4C shows a condition where the front door 21 is fully opened in the direction of the arrow c by the disk cartridge 1 inserted in the direction of the arrow a. In this condition, the disk cartridge 1 has passed below the opened front door 21 in the direction of the arrow a between the right and left arms 24 of the front door 21, and the lower ends of the round projections 23 of the front door 21 abut against the upper surface 1b of the disk cartridge 1. Accordingly, during the whole course of insertion of the disk cartridge 1, there is no possibility that the front end surface 5a of the shutter 5 may come into contact with the front door 21. Further, at the time the disk cartridge 1 is inserted into the disk holder 52, the shutter 5 is opened as described above. At this time, however, the front door 21 has already been rested on the upper surface 1b of the disk cartridge 1, so that there is no possibility that when the shutter 5 is opened, the front door 21 may come into contact with the shutter 5.

Accordingly, the width of the recess 22 of the front door 21 need not be set to a sliding width between the shutter closed position and the shutter open position of the shutter 5, but it is sufficient to set the width of the recess 22 to a small value corresponding to the width of the front end surface 5a of the shutter 5 positioned at the laterally central portion of the disk cartridge 1 in inserting the disk cartridge 1 into the cartridge insertion opening 13 in the direction of the arrow a. In the case that the round surfaces 1f are not formed at the right and left corner portions 1c of the front end surface 1a of the disk cartridge 1, but flat surfaces parallel to the front end surface 1a are formed at the right and left corner portions 1c, the flat surfaces of the right and left corner portions 1c come into line contact with the round surfaces 26 of the right and left round projections 23 of the front door 21 in inserting the disk cartridge 1 into the cartridge insertion opening 13 in the direction of the arrow a. In this line-contact condition, a contact resistance (frictional resistance) between the corner portions 1c and the round projections 23 is somewhat larger than that in the point-contact condition mentioned above. However, the contact resistance in the line-contact condition is much smaller than that in a plane-contact condition, so that the front door 21 can be smoothly opened in the direction of the arrow a also in the line-contact condition as similarly to the point-contact condition.

Figure 5A:
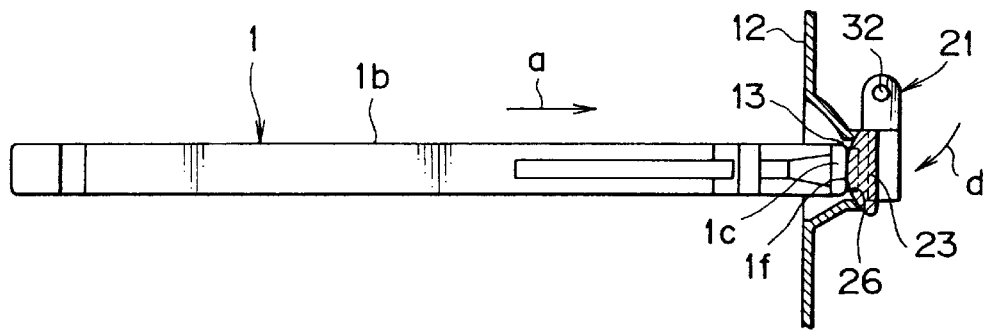
FIGS. 5A, 5B, and 5C are views similar to FIGS. 4A, 4B, and 4C, illustrating a modification.
Figure 5B:
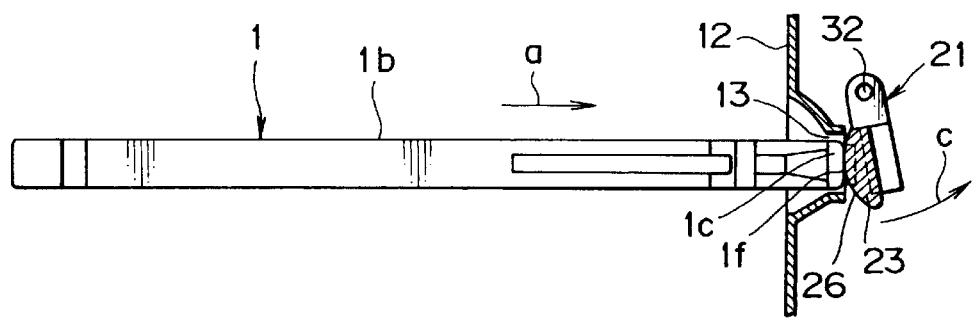
Figure 5C:
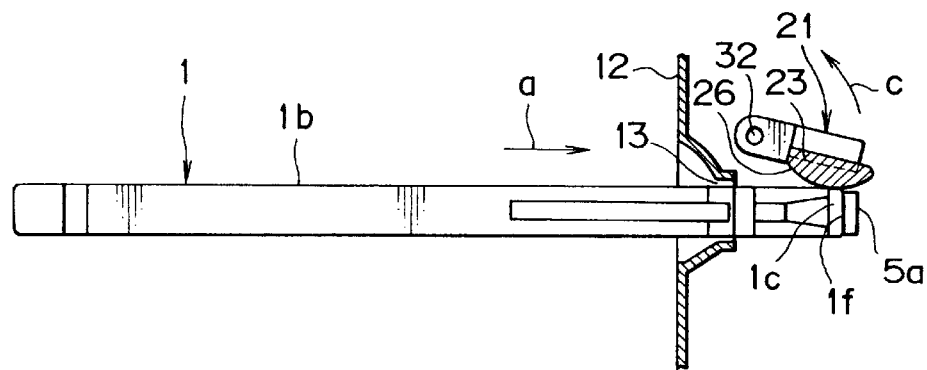
Figure 6:
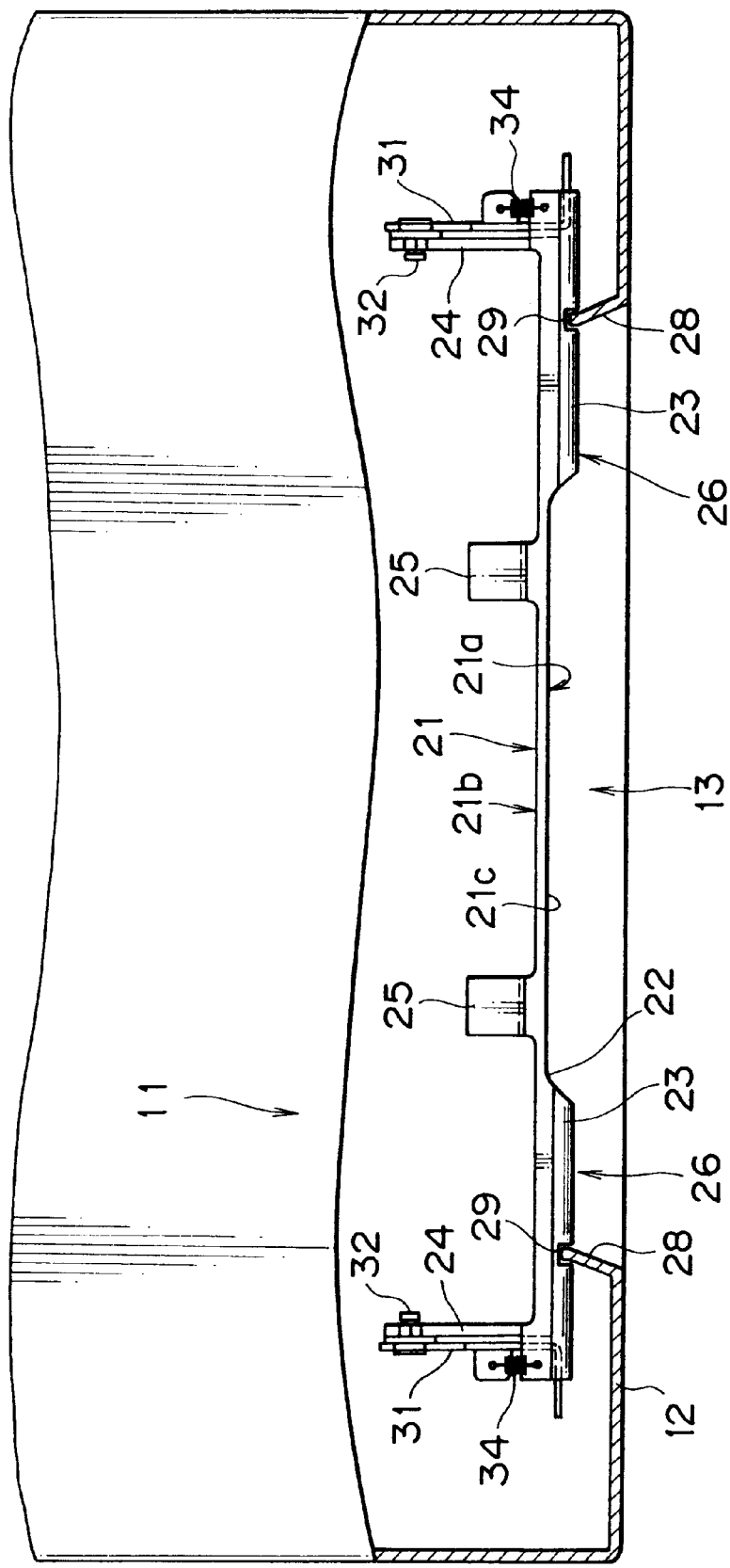
FIG. 6 is a partially cutaway, plan view of the cartridge insertion opening and the front door closing it.
Figure 7:
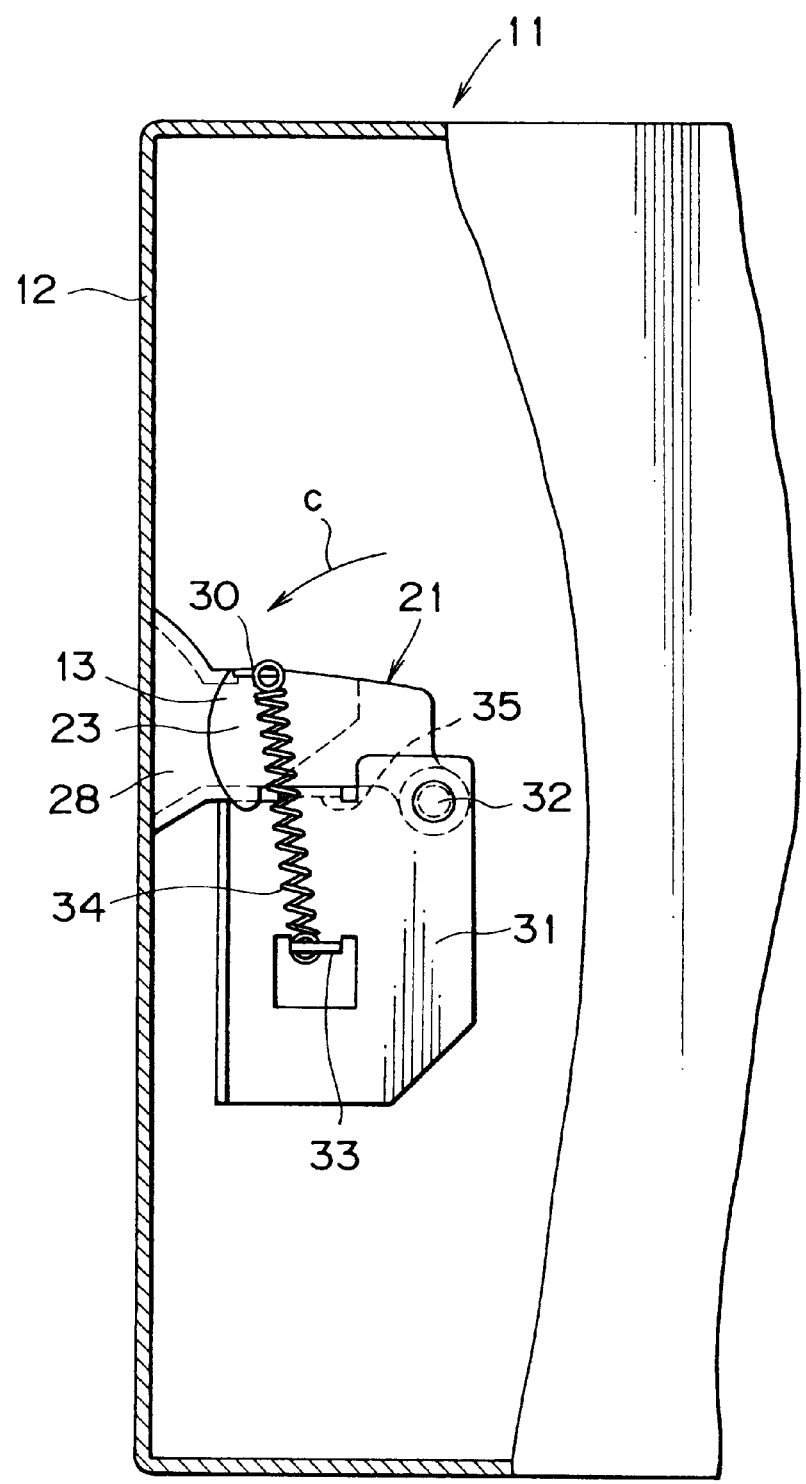
FIG. 7 is a partially cutaway, side view of FIG. 6.
Figure 8:
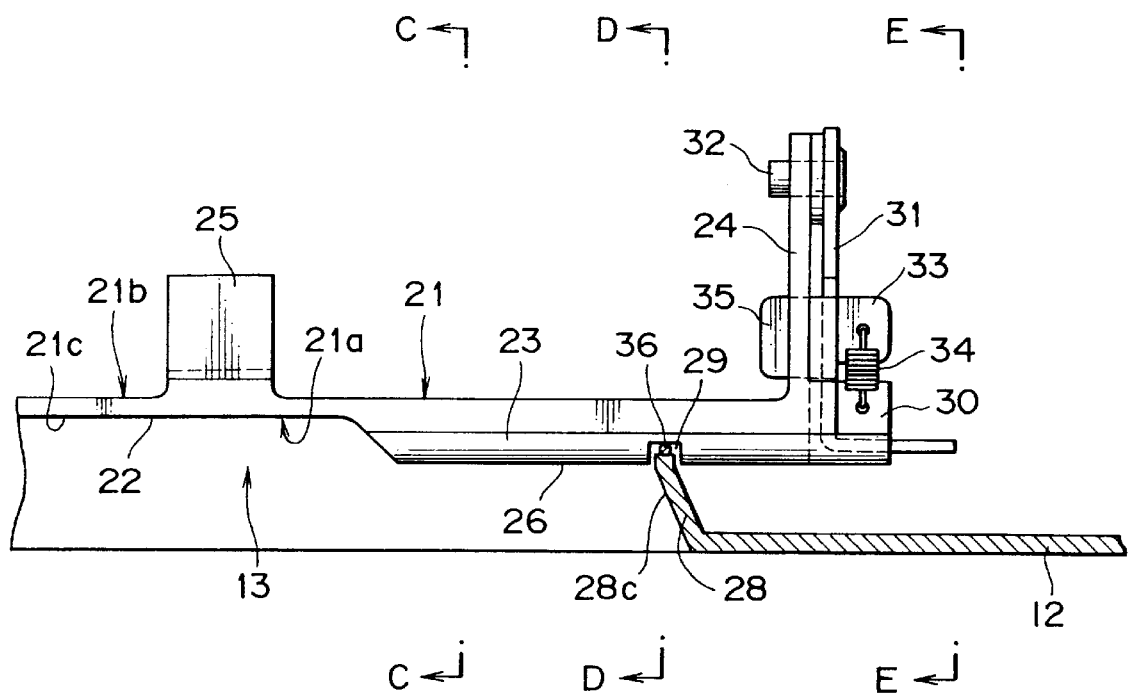
FIG. 8 is a partially cutaway, enlarged plan view of a right end portion of the front door.
Figure 9:
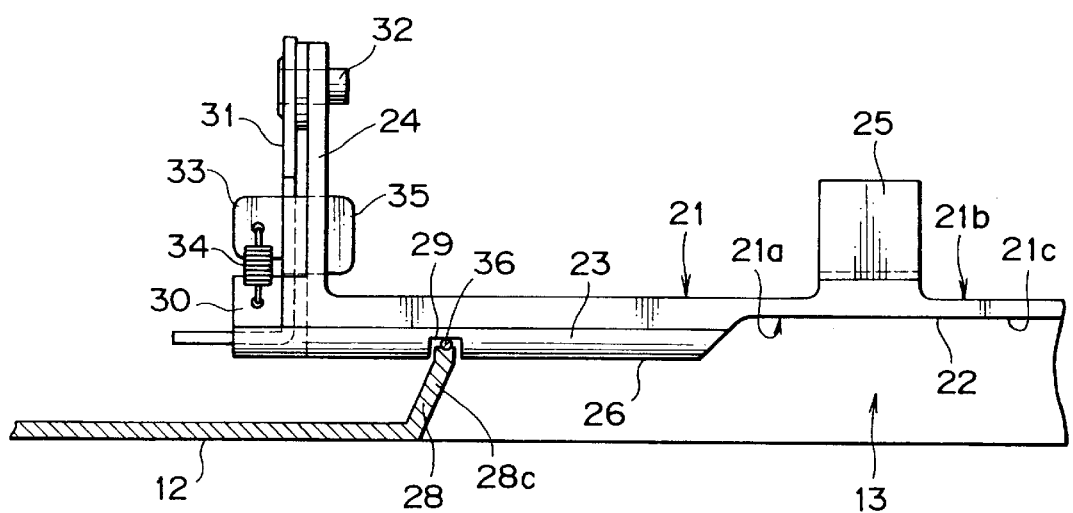
FIG. 9 is a partially cutaway, enlarged plan view of a left end portion of the front door.
Figure 45A:
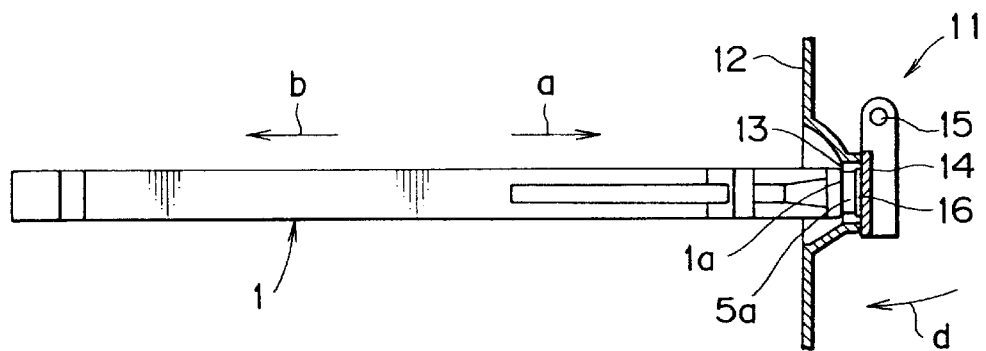
FIGS. 45A, 45B, and 45C are partially cutaway, side views for illustrating an opening operation of the conventional front door pushed by the disk cartridge.
Figure 45B:
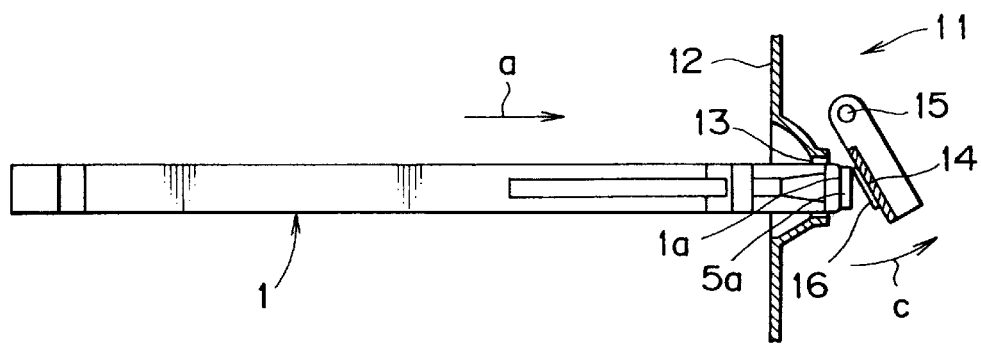
Figure 45C:
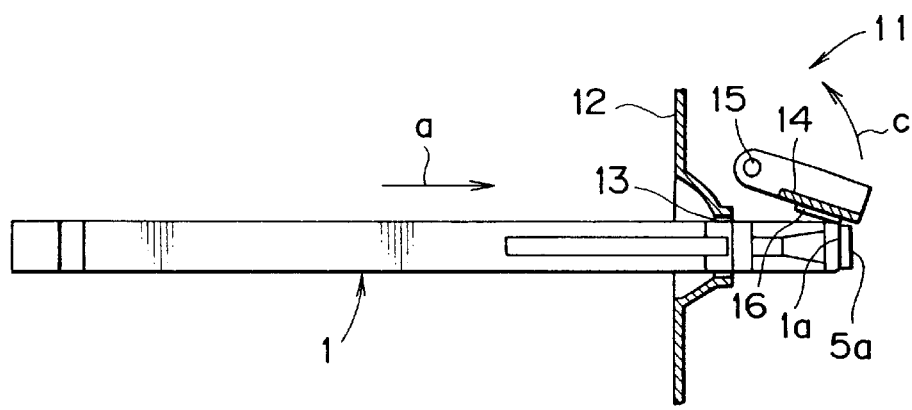

FIGS. 5A to 5C show a modification of the front door 21, in which the right and left pivot shafts 32 for the front door 21 are located near the upper ends of the right and left arms of the front door 21 as in the prior art shown in FIGS. 45 and 46 and the front door 21 is pushed to be pivotally opened in the direction of an arrow c in FIGS. 5A to 5C. Also in this modification, the front door 21 can be opened safely and smoothly by the disk cartridge 1 by forming the recess 22 and the right and left round projections 23 having the round surfaces 26 on the front surface 21a of the front door 21 as in the above-mentioned preferred embodiment.

(5) Description of Opening/Closing Mechanism for Front Door

The door opening/closing mechanism 81 as a mechanism for opening and closing the front door 21 in loading and ejecting the disk cartridge 1 will now be described with reference to FIGS. 6 to 18. The door opening/closing mechanism 81 is composed of the disk cartridge 1, the right and left guide projections 25 of the front door 21, and the right and left extension coil springs 34 as the biasing means.

Figure 13:
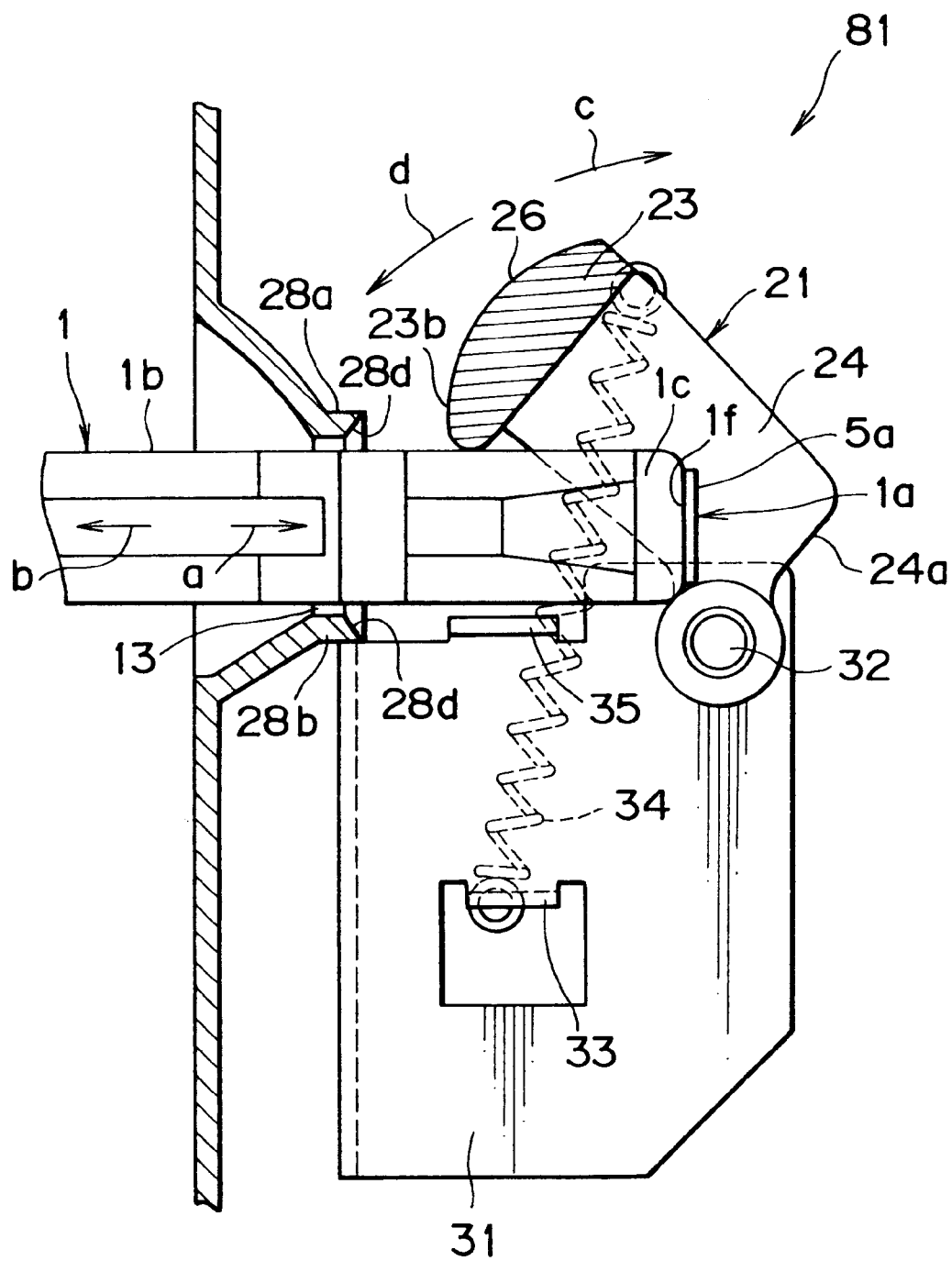
FIG. 13 is a partially cutaway, sectional side view similar to FIG. 10, illustrating the insertion of the disk cartridge into the cartridge insertion opening wherein the front door is opened to rest on the upper surface of the disk cartridge.
Figure 15A:
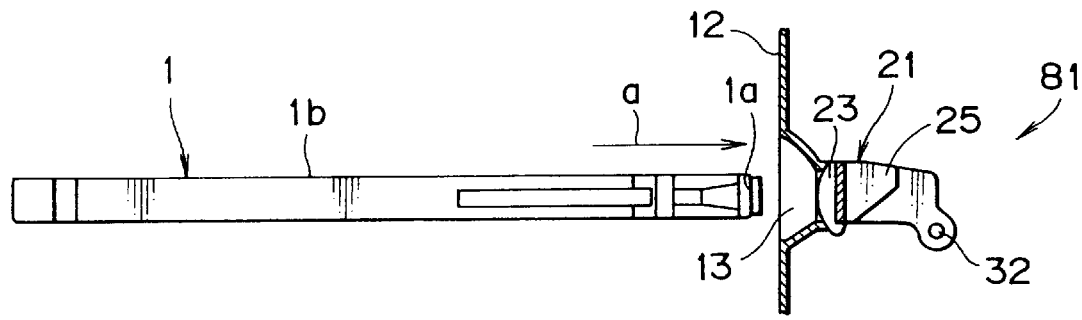
FIGS. 15A, 15B, and 15C are partially cutaway, side views for illustrating the loading operation of the disk cartridge and its associated operation of the front door.
Figure 15B:
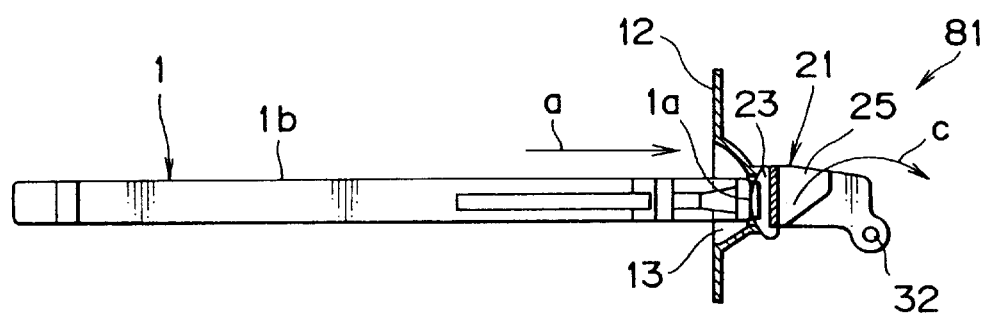
Figure 15C:
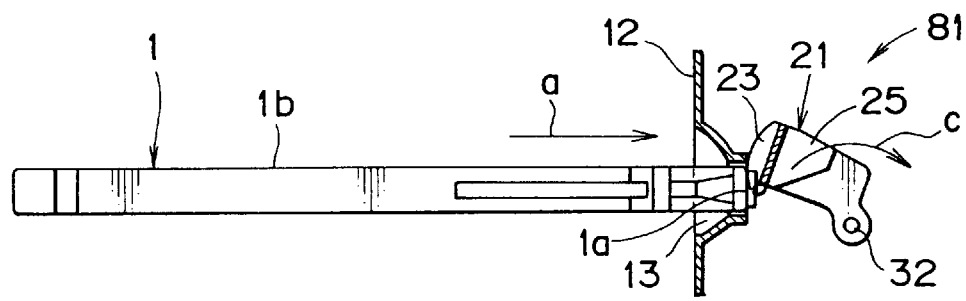

When the disk cartridge 1 is horizontally inserted from its front end surface 1a into the cartridge insertion opening 13 in the direction of the arrow a in loading the disk cartridge 1 as shown in FIGS. 10 and 15A, the front door 21 is pushed to be pivotally opened by the disk cartridge 1 in the direction of the arrow c against the extension coil springs 34 as shown in FIGS. 15B and 15C. When the disk cartridge 1 is further inserted in the direction of the arrow a, the disk cartridge 1 has passed below the front door 21 between the right and left arms 24 of the front door 21 as shown in FIG. 13, and when the front door 21 is fully opened in the direction of the arrow c, the lower ends 23a of the right and left round projections 23 of the front door 21 come into abutment against the upper surface 1b of the disk cartridge 1 as shown in FIG. 13.

Figure 16A:
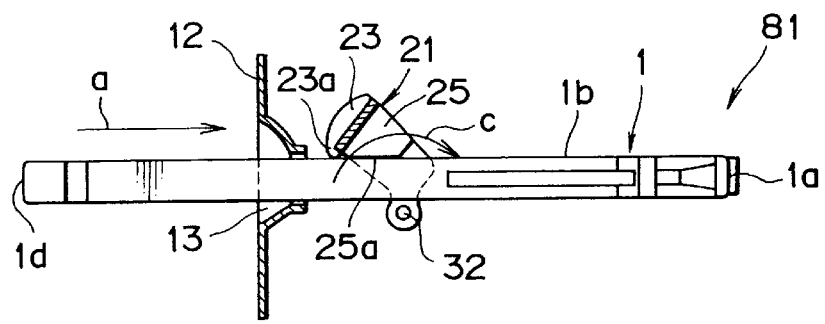
FIGS. 16A, 16B, and 16C are partially cutaway, side views for illustrating the operations subsequent to the operations shown in FIGS. 15A to 15C.
Figure 16B:
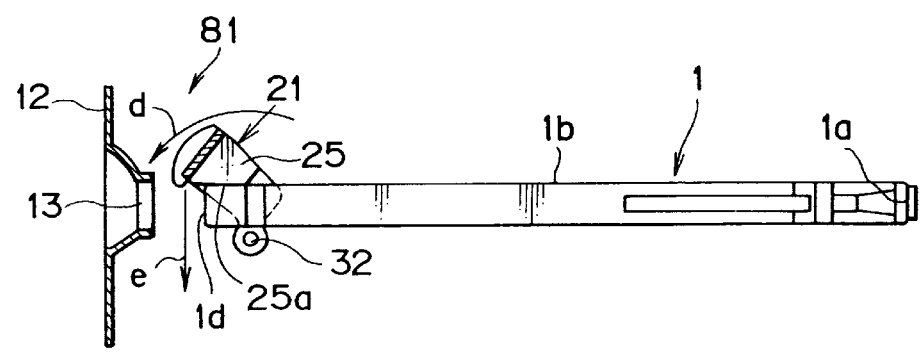

When the disk cartridge 1 is further inserted in the direction of the arrow a as shown in FIG. 16A, the disk cartridge 1 is horizontally inserted into the cartridge holder 52 mentioned above with reference to FIG. 31, and is then mechanically held in the cartridge holder 52 by the latch means in the fully inserted condition. Thereafter, the disk cartridge 1 held in the cartridge holder 52 is retracted in the direction of the arrow a from the cartridge receiving position to the loading start position as mentioned above with reference to FIG. 32. In the loading start position shown in FIGS. 14 and 16B, the rear end surface 1d of the disk cartridge 1 has been fully retracted from the cartridge insertion opening 13 in the direction of the arrow a and already passed through the lower ends 23a of the right and left round projections 23 of the front door 21 in the direction of the arrow a to stop below the right and left guide projections 25 of the front door 21. That is, the slant surfaces 25a of the right and left guide projections 25 of the front door 21 abut against the upper surface 1b of the disk cartridge 1 near the rear end surface 1d.

Figure 11:
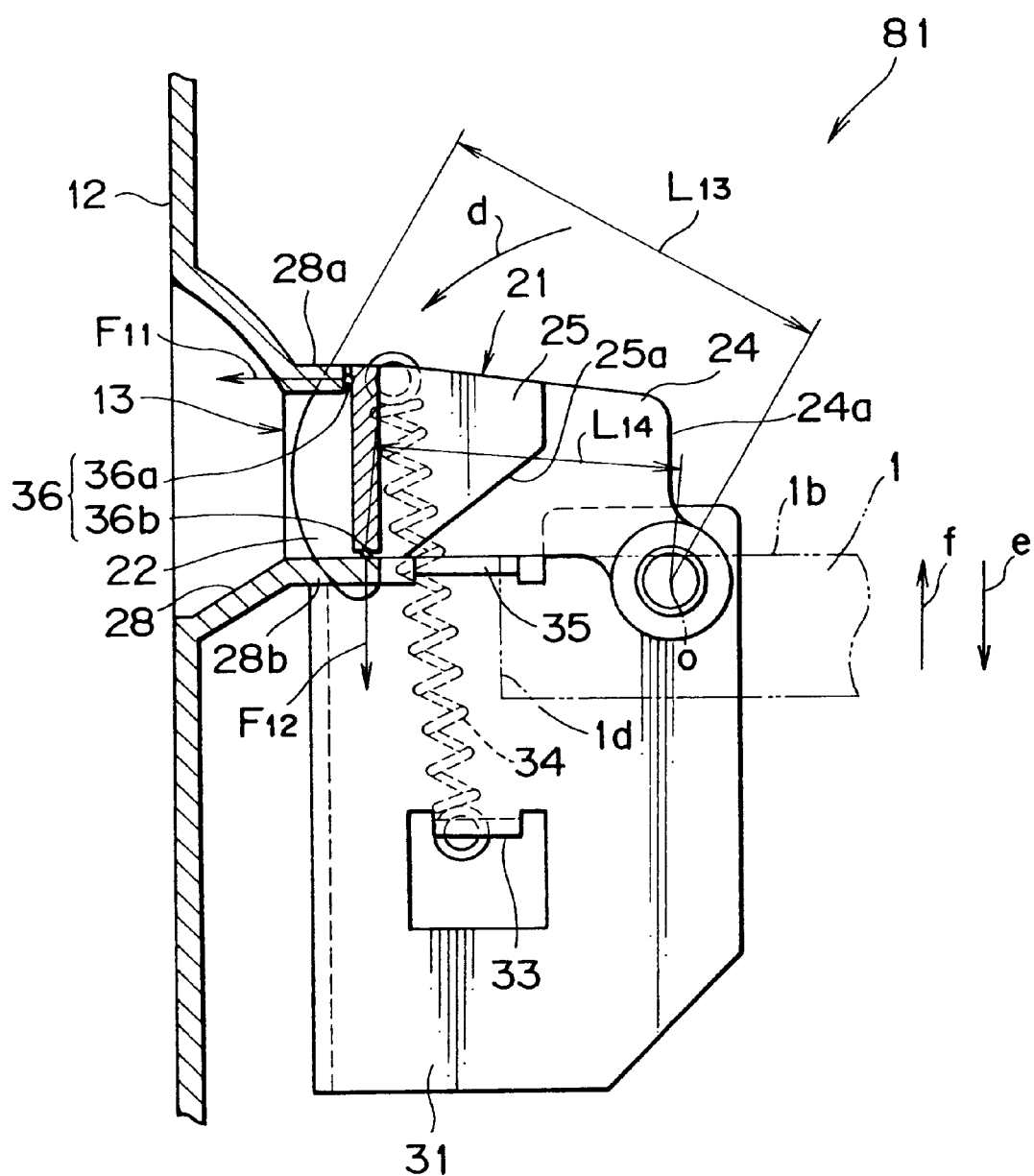
FIG. 11 is an enlarged sectional side view taken along the line D—D in FIG. 8.
Figure 12:
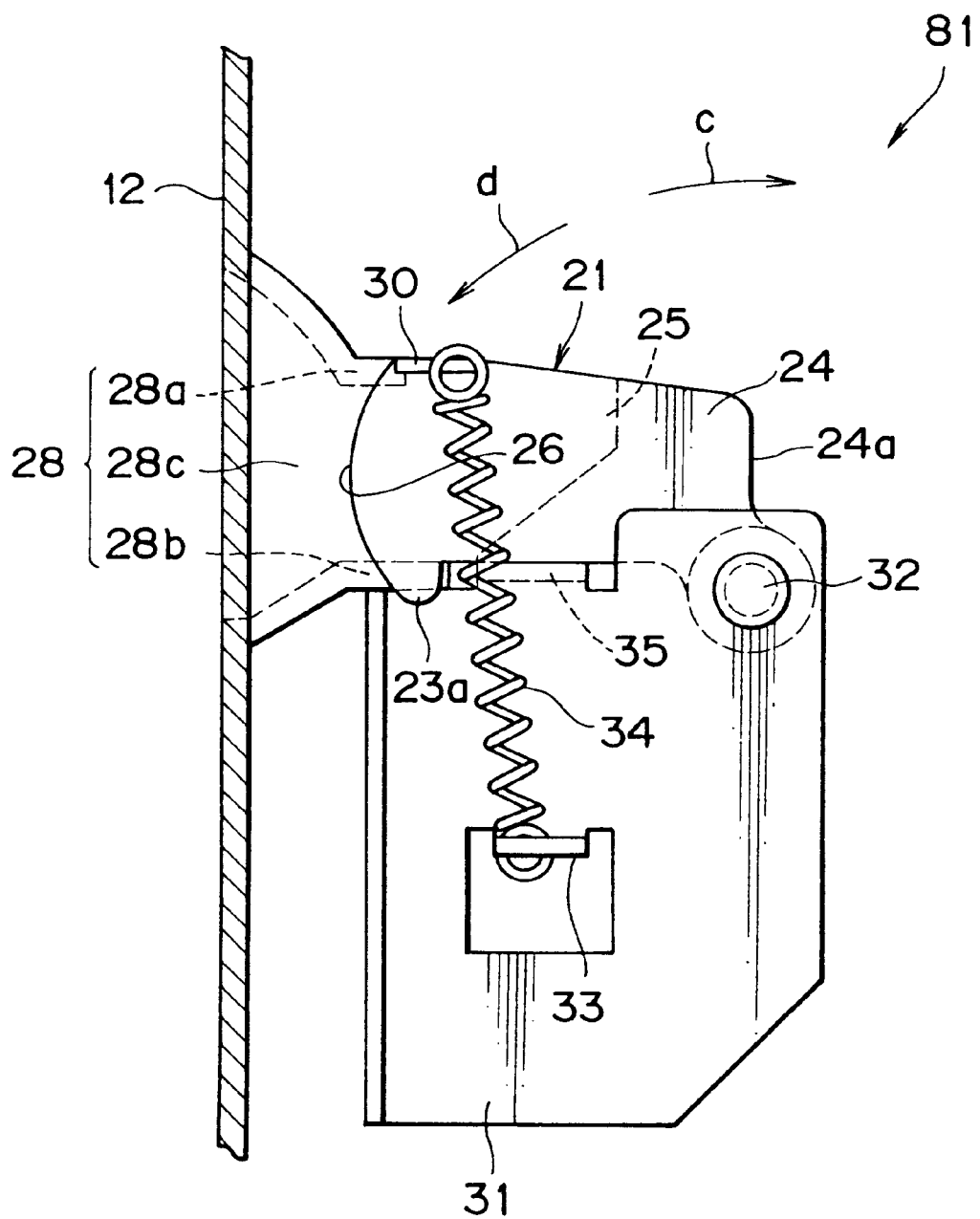
FIG. 12 is an enlarged sectional side view taken along the line E—E in FIG. 8.
Figure 16C:
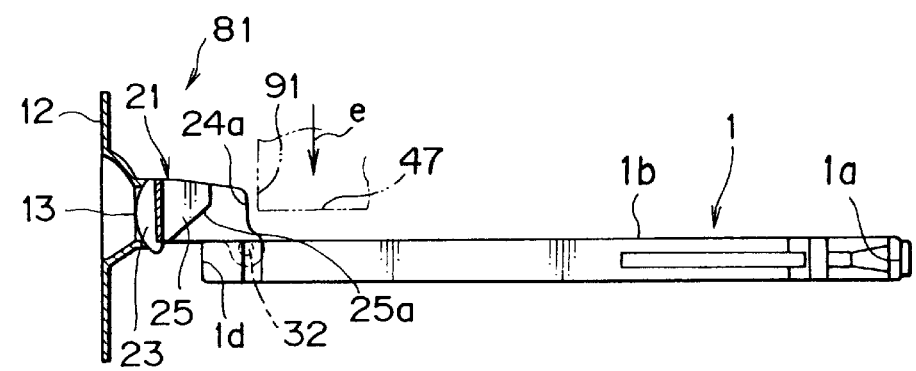

Thereafter, the disk cartridge 1 held in the cartridge holder 52 is vertically lowered from the loading start position to the loading end position in the direction of the arrow e as mentioned above with reference to FIG. 33. Accordingly, the upper surface 1b of the disk cartridge 1 comes away from the slant surfaces 25a of the right and left guide projections 25 of the front door 21 in the direction of the arrow e (i.e., the upper surface 1b is separated from the slant surfaces 25a) as shown in FIGS. 11 and 16C. At the same time, the front door 21 is pulled to be pivotally moved to the door closed position in the direction of the arrow d by the extension coil springs 34, thus automatically closing the cartridge insertion opening 13 as shown in FIGS. 10 to 12 and 16C.

After ending the loading operation of the disk cartridge 1, the upper base plate 47 is lowered in the direction of the arrow e as mentioned above with reference to FIG. 33 until the door locking means 91 formed at the front lower end portion of the upper base plate 47 comes near vertical portions 24a formed at the rear ends of the right and left arms 24 of the front door 21. Accordingly, even if opening the front door 21 in the direction of the arrow c after ending the loading operation of the disk cartridge 1, the vertical portions 24a of the right and left arms 24 of the front door 21 come into abutment against the door locking means 91, thus inhibiting the front door 21 from being opened in the direction of the arrow c to mechanically lock the front door 21 from the inside thereof by the door locking means 91.

Accordingly, it is possible to prevent the double insertion such that while data is being recorded or reproduced on or from the double-sided disk 2 in the disk cartridge 1, another disk cartridge may be inserted into the cartridge insertion opening 13 by mistake. Further, such a double-insertion prevention mechanism is very simple in structure because it is composed of the door locking means 91 formed at the front lower end portion of the upper base plate 47 and the vertical portions 24a formed at the rear ends of the right and left arms 24a of the front door 21.

Figure 14:
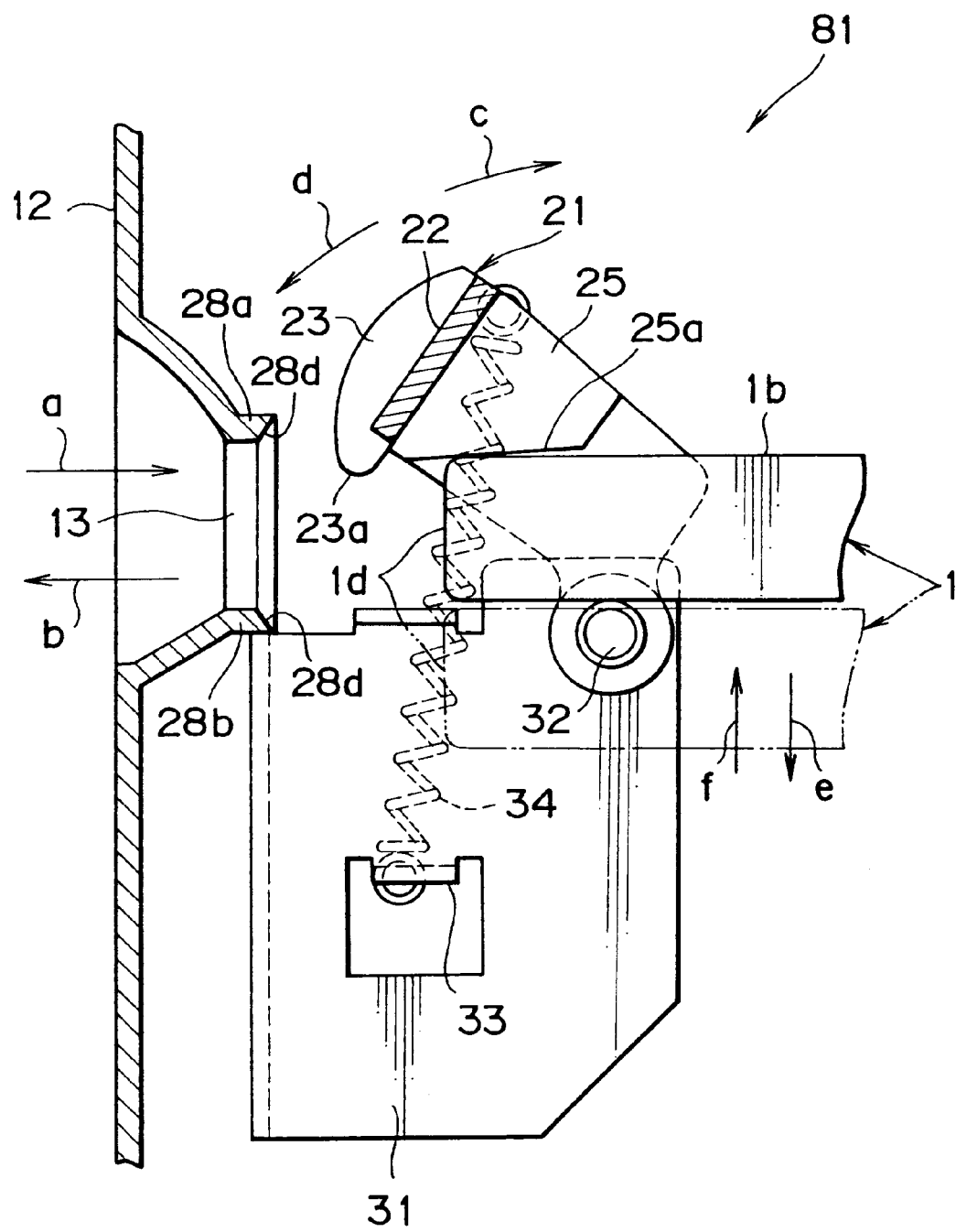
FIG. 14 is a partially cutaway, sectional side view similar to FIG. 11, illustrating the opening/closing operation of the front door by the disk cartridge.
Figure 17A:
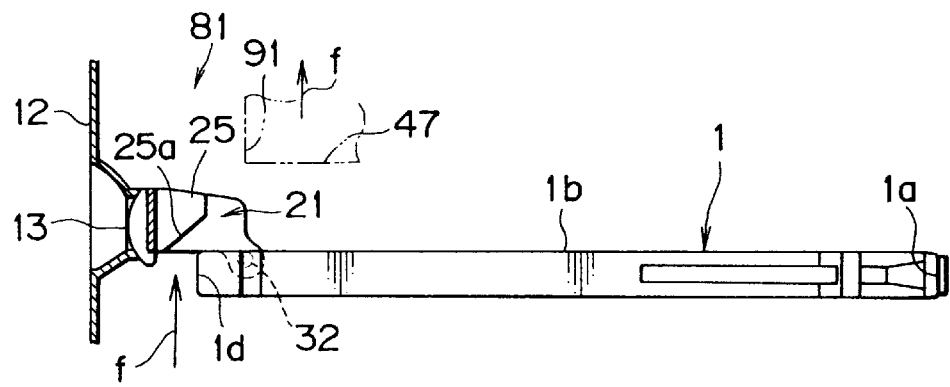
FIGS. 17A, 17B, and 17C are partially cutaway, side views for illustrating the ejecting operation of the disk cartridge and its associated operation of the front door.
Figure 17B:
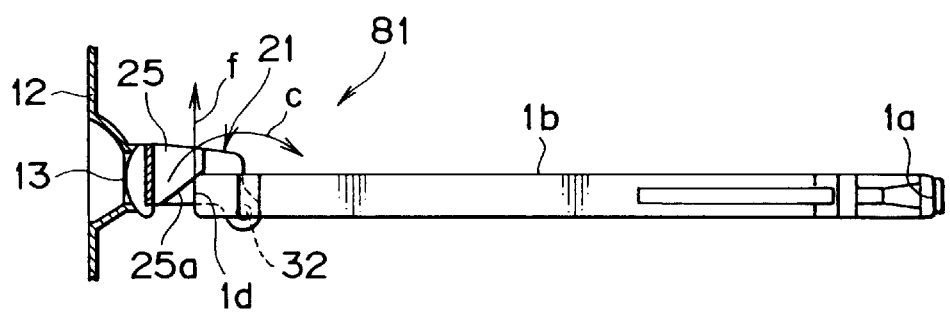
Figure 17C:
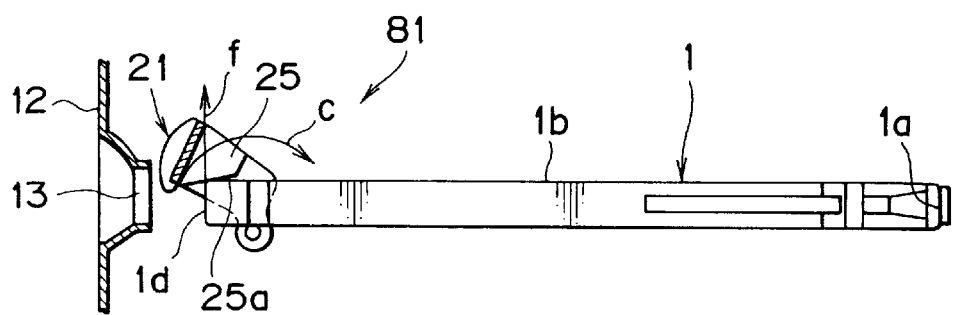

In ejecting the disk cartridge 1, the upper base plate 47 is vertically raised from the lower position to the upper position in the direction of the arrow f as mentioned above with reference to FIG. 34. Accordingly, the door locking means 91 of the upper base plate 47 comes away from the vertical portions 24a of the right and left arms 24 of the front door 21 in the direction of the arrow f as shown by a phantom line in FIGS. 11 and 17A. In synchronism with this rising motion of the upper base plate 47, the disk cartridge 1 held in the cartridge holder 52 is vertically raised from the loading end position to the loading start position in the direction of the arrow f, so that the upper surface 1b of the disk cartridge 1 near the rear end surface 1d comes into abutment against the slant surfaces 25a of the right and left guide projections 25 of the front door 21 to raise the slant surfaces 25a as shown in FIGS. 14 and 17B. Accordingly, the front door 21 is automatically rotated to the door open position in the direction of the arrow c against the extension coil springs 34, thus automatically opening the cartridge insertion opening 13. Thereafter, the disk cartridge 1 held in the cartridge holder 52 is horizontally moved in the direction of the arrow b from the loading start position to the cartridge receiving position as mentioned above with reference to FIG. 35, so that the rear end surface 1d of the disk cartridge 1 released from the cartridge holder 52 is ejected from the cartridge insertion opening 13 in the direction of the arrow b as shown in FIG. 18A. Thereafter, the disk cartridge 1 is pulled to be fully removed from the cartridge holder 52 in the direction of the arrow b as shown in FIGS. 10 and 18B, so that the front door 21 is rotated to the door closed position in the direction of the arrow d by the extension coil springs 34, thereby closing the cartridge insertion opening 13 again.

As described above, although the front door 21 is not mechanically linked to the cartridge loading mechanism 51, the front door 21 can be opened and closed smoothly and automatically in synchronism with the loading and ejecting operations of the disk cartridge 1 by the door opening/closing mechanism 81 having a very simple structure, thereby reducing the number of parts and the number of man-hours for assembly to realize a cost reduction. Furthermore, as mentioned especially with reference to FIG. 34, the cartridge insertion opening 13 can be reliably kept closed from its inside by the front door 21 during recording or reproduction of data on or from the double-sided disk 2 as shown in FIG. 16C. Accordingly, it is possible to prevent that foreign matter, dust, etc. may unexpectedly enter the disk drive 11 from the cartridge insertion opening 13 during data recording or reproduction and may stick to the double-sided disk 2 to cause an output reduction due to spacing loss or the like.

Figure 19:
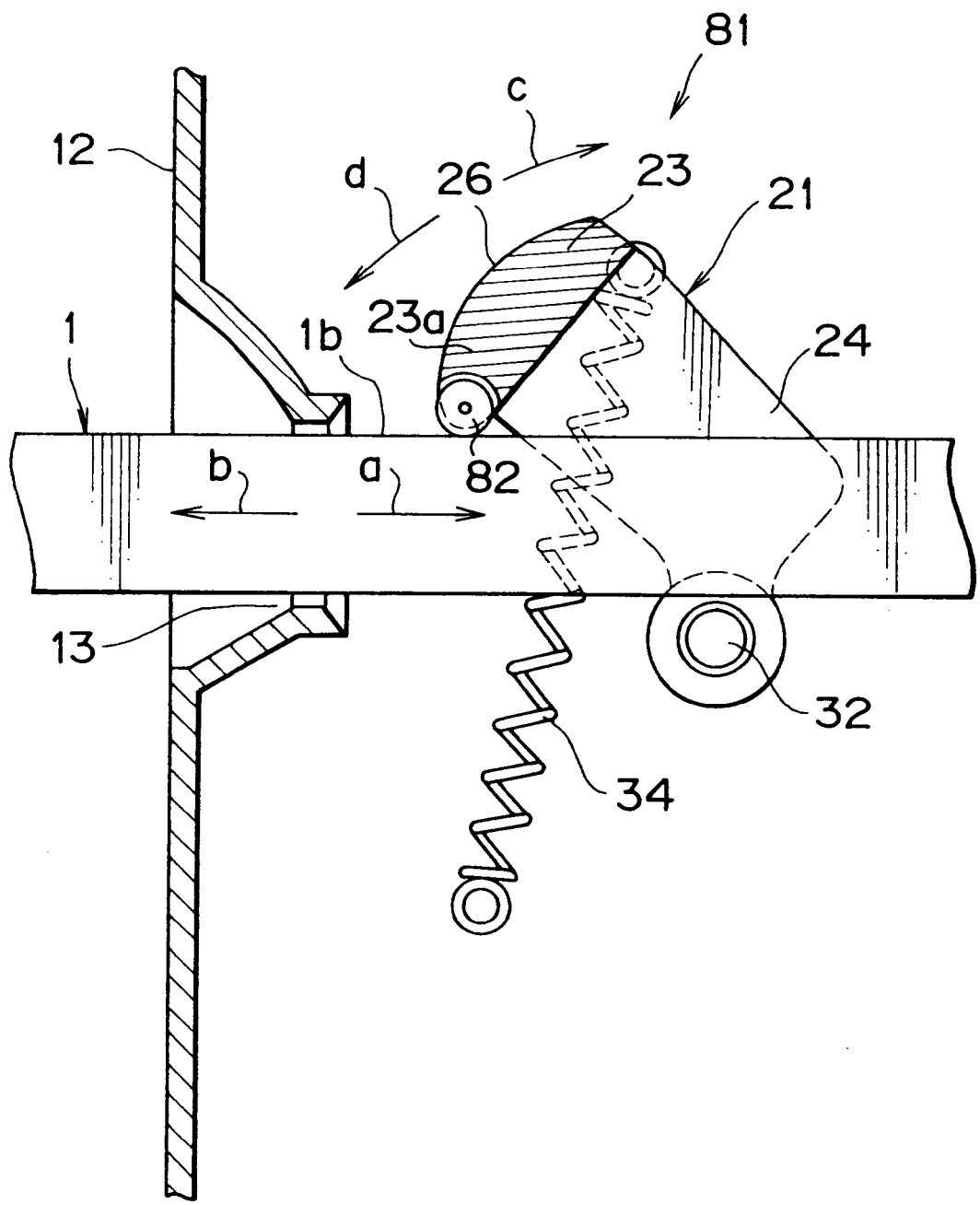
FIG. 19 is a partially cutaway, side view showing a modification having rollers mounted on the front door at a lower portion coming into contact with the disk cartridge.
Figure 20:
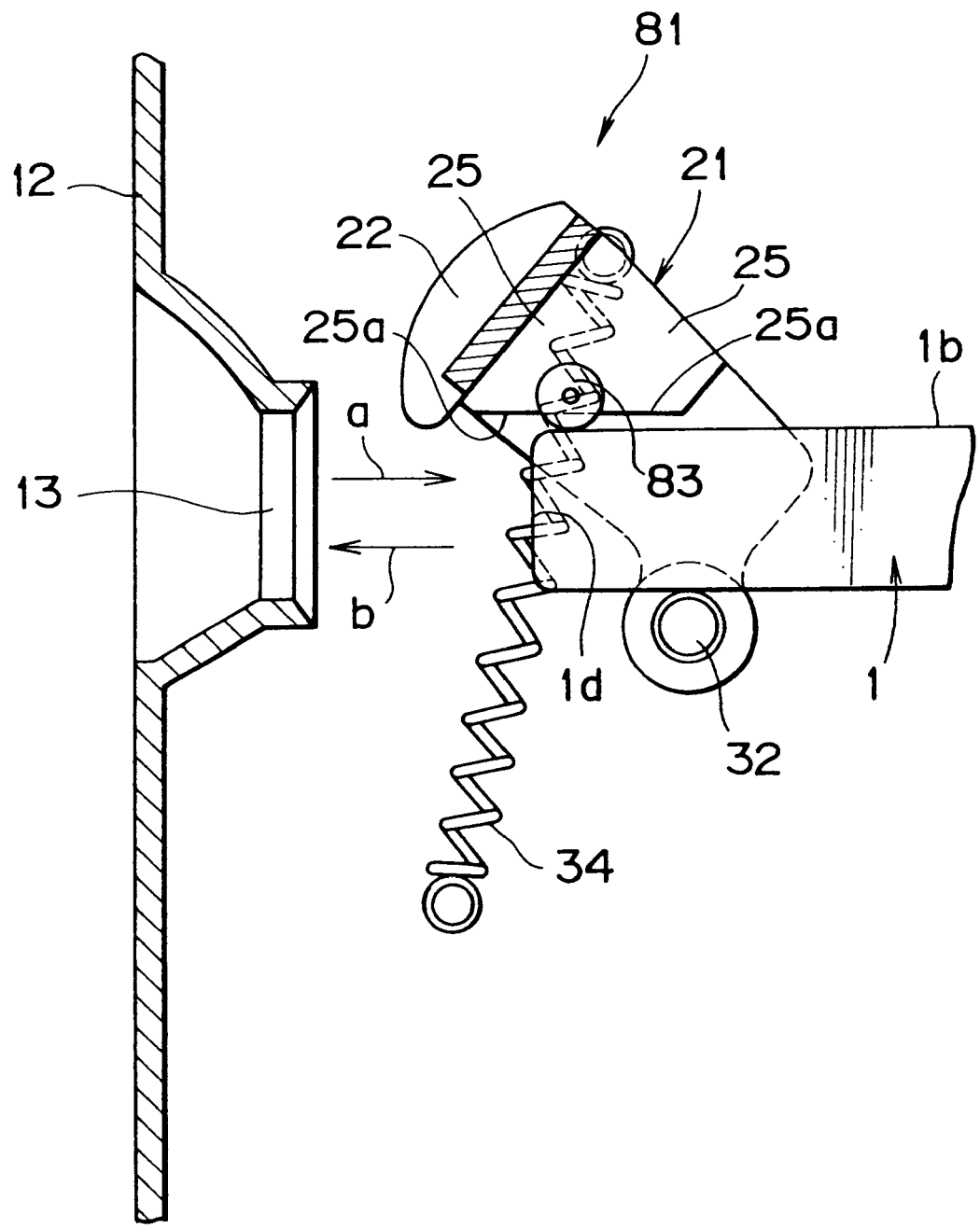
FIG. 20 is a partially cutaway, side view showing another modification having rollers mounted on the front door at another lower portion coming into contact with the disk cartridge.
Figure 21:
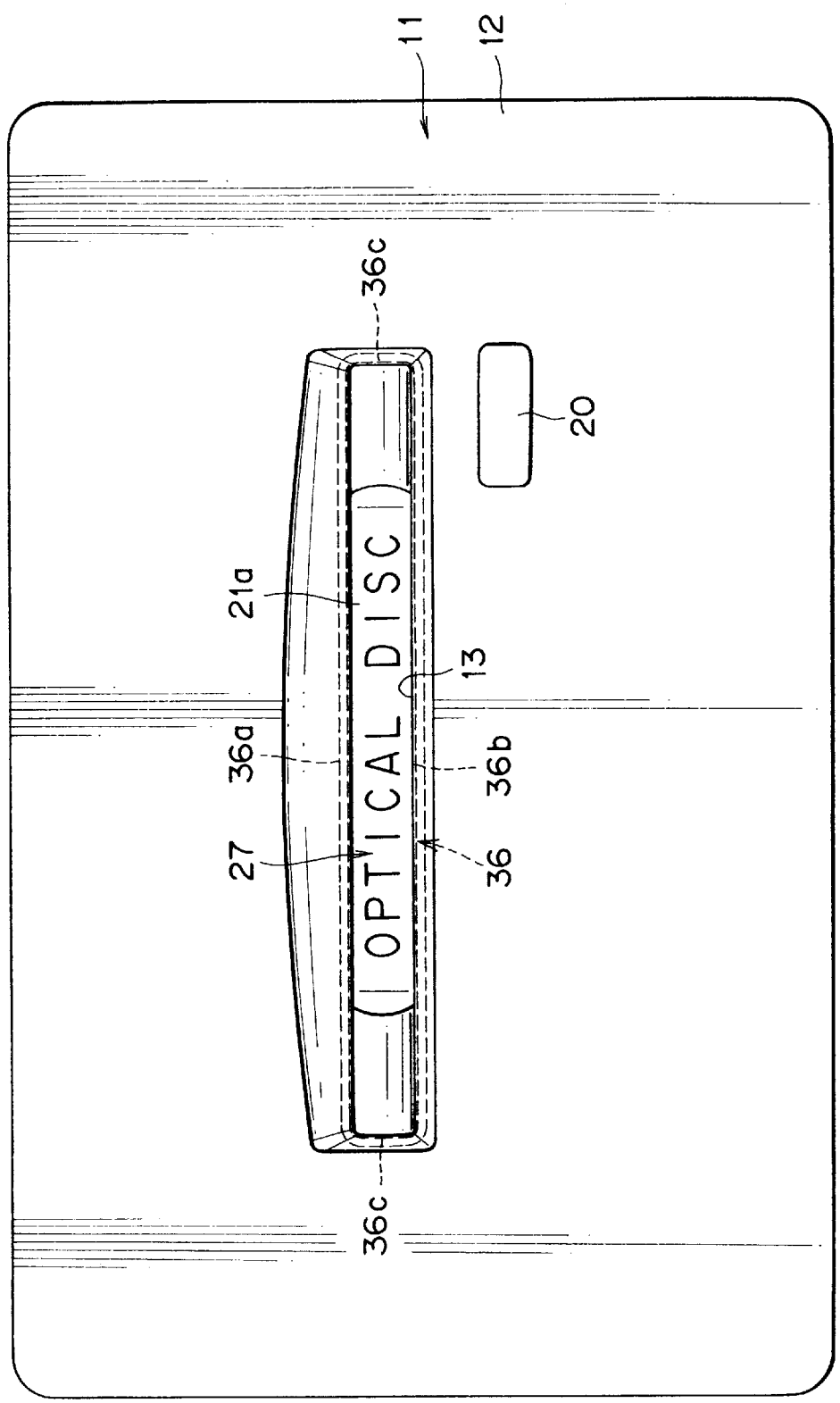
FIG. 21 is a front elevation of a front panel, for illustrating a dustproof structure of the cartridge insertion opening.
Figure 22:
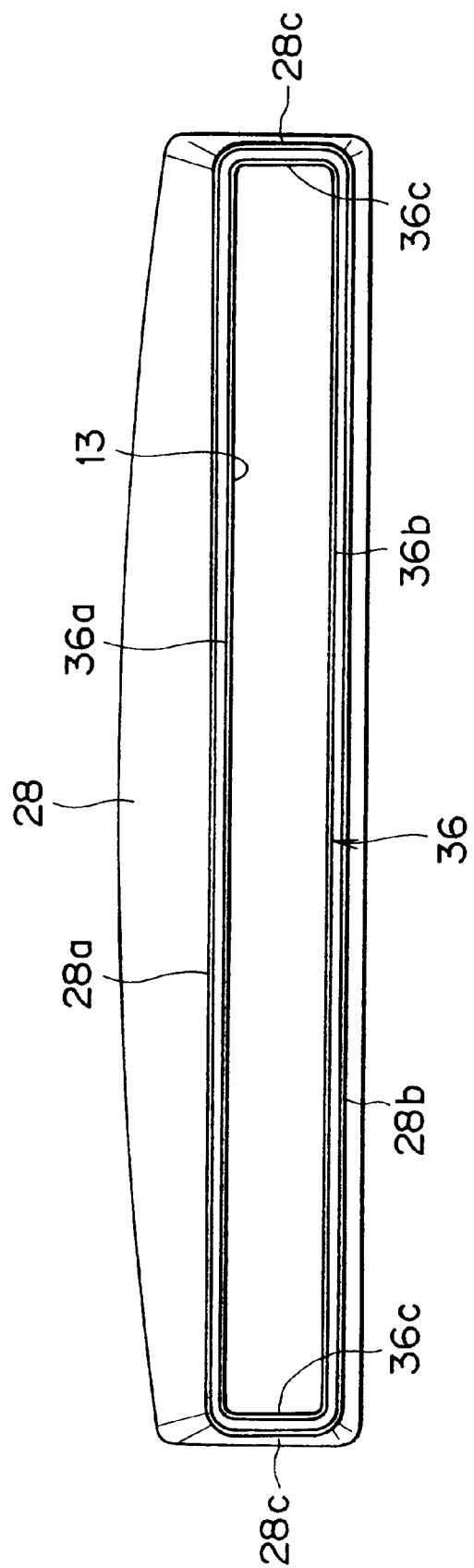
FIG. 22 is a rear elevation of the cartridge insertion opening, for illustrating the dustproof structure.
Figure 23:
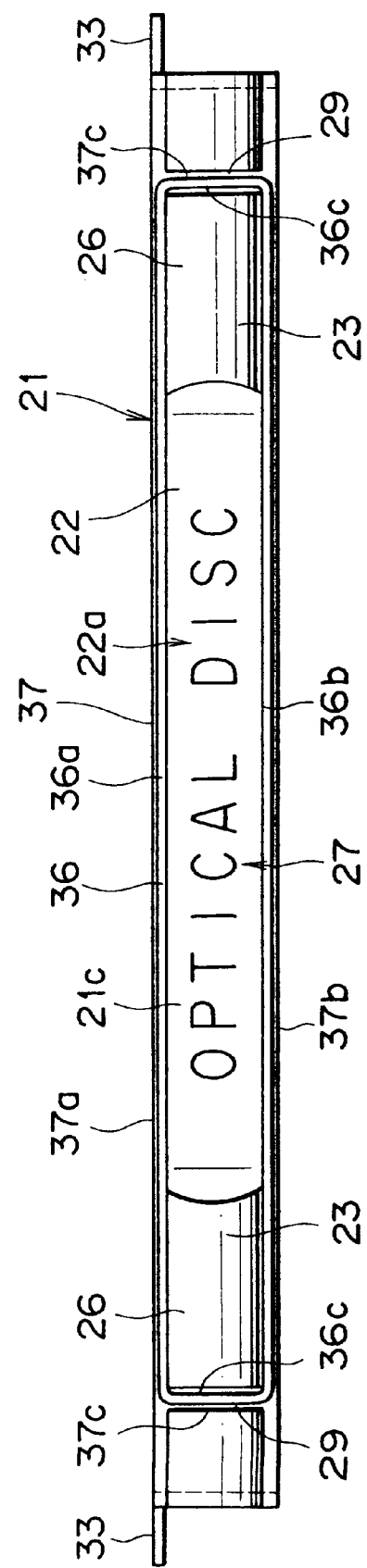
FIG. 23 is a front elevation of a packing and the front door, for illustrating the dustproof structure.

FIGS. 19 and 20 show modifications of the door opening/closing mechanism 81. In the modification shown in FIG. 19, a roller 82 is rotatably mounted on the lower end 23a of each round projection 23 of the front door 21. In the modification shown in FIG. 20, a roller 83 is rotatably mounted on the slat surface 25a of each guide projection 25 of the front door 21. According to these modifications using the rollers 82 and 83, the contact resistance (frictional resistance) between the disk cartridge 1 and the front door 21 can be remarkably reduced in horizontally moving the disk cartridge 1 below the front door 21 in the directions of the arrows a and b after opening the front door 21 with the disk cartridge 1 in the direction of the arrow c and in raising the front door 21 with the disk cartridge 1 to open the front door 21 in the direction of the arrow c in the ejecting operation. Accordingly, the insertion and ejection of the disk cartridge 1 in the directions of the arrows a and b and the opening of the front door 21 in the direction of the arrow c can be carried out more smoothly.

(6) Description of Dustproof Structure of Cartridge Insertion Opening

A dustproof structure of the cartridge insertion opening 13 will now be described with reference to FIGS. 21 to 24B. As mentioned above with reference to FIG. 10, the coordinates of the fulcrum O of the front door 21 are set at the vertical position P2 lowered by the given distance, L11 from the vertically central position P1 of the cartridge insertion opening 13 and at the horizontal position P3 retracted by the given distance L12 from the cartridge insertion opening 13 to the rear side (in the direction of the arrow a). The opening wall 28 of the front panel 12 is composed of upper and lower horizontal portions 28a and 28b and right and left vertical portions 28c. A flat rectangular closed-loop packing 36 is fixed to the rear end of the opening wall 28 by adhesion or the like. The packing 36 is formed of an elastic material such as rubber and soft plastic, and is composed of upper and lower horizontal portions 36a and 36b and right and left vertical portions 36c. The front surface of the front door 21 is formed with a flat rectangular closed-loop sealing portion 37 to be brought into pressure contact with the entire periphery of the packing 36. The sealing portion 37 is composed of upper and lower horizontal portions 37a and 37b formed along the upper and lower edges of the recess 22 and right and left vertical portions 37c formed in the right and left vertical slits 29.

Figure 24A:
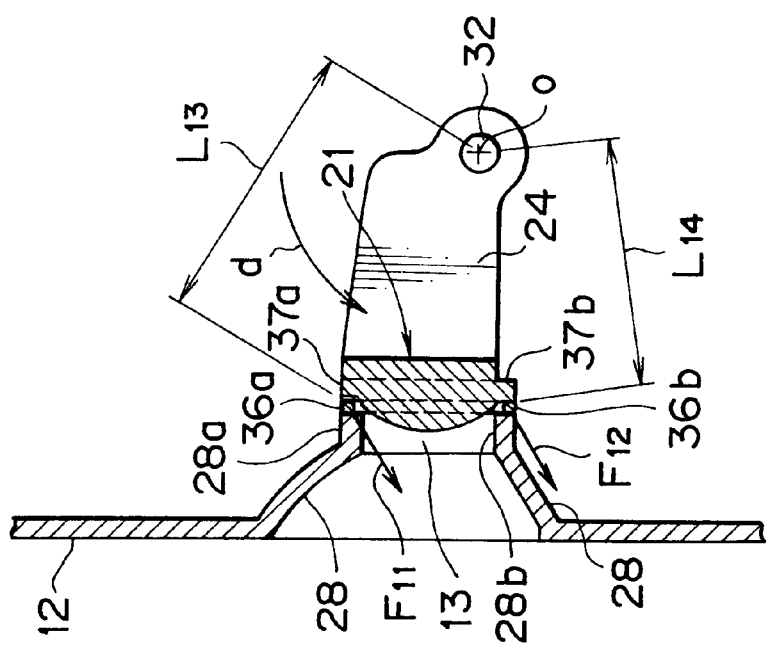
FIGS. 24A and 24B are sectional side views for illustrating the dustproof structure.
Figure 24B:
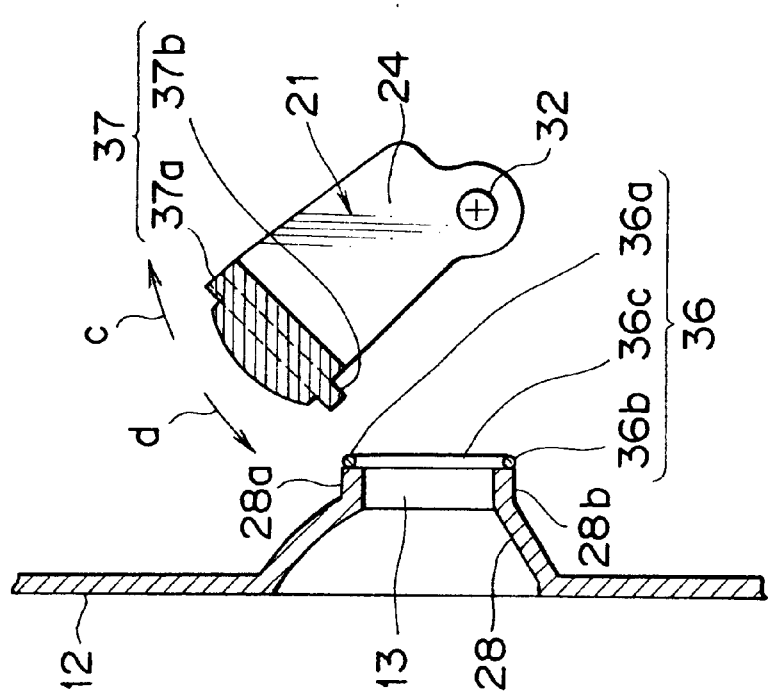

As shown in FIG. 24B, the arm length L13 from the fulcrum O to the upper horizontal portion 37a of the sealing portion 37 of the front door 21 is almost equal to the arm length L14 from the fulcrum O to the lower horizontal portion 37b of the sealing portion 37. Accordingly, when the front door 21 is rotated about the fulcrum O to the door closed position in the direction of the arrow d by the extension coil springs 34 mentioned above and the entire periphery of the sealing portion 37 of the front door 21 comes into pressure contact with the entire periphery of the packing 36 in the direction of the arrow d, the contact force F11 of the upper horizontal portion 37a of the sealing portion 37 with respect to the upper horizontal portion 36a of the packing 36 becomes almost equal to the contact force F12 of the lower horizontal portion 37b of the sealing portion 37 with respect to the lower horizontal portion 36b of the packing 36.

As a result, no gap is generated between the entire periphery of the packing 36 and the entire periphery of the sealing portion 37 in the door closed position of the front door 21, so that the sealability of the cartridge insertion opening 13 by the front door 21 can be greatly improved, to thereby greatly improve the dustproof performance of the disk drive 11. Since the sealability of the cartridge insertion opening 13 can be greatly improved, the biasing force of the extension coil springs 34 for returning the front door 21 in the direction of the arrow d can be reduced. Accordingly, the front door 21 can be easily opened in the direction of the arrow c by a weak force horizontally applied to the disk cartridge 1 against the biasing force of the extension coil springs 34.

Figure 46A:
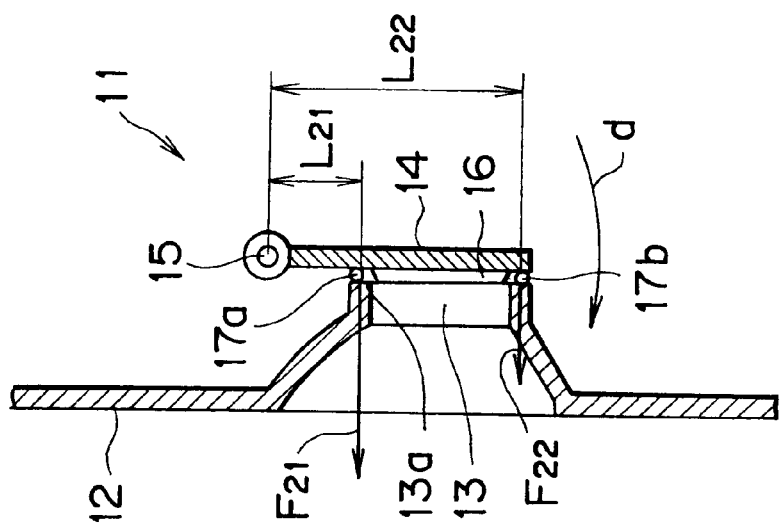
FIGS. 46A and 46B are sectional side views for illustrating a conventional dustproof structure of a cartridge insertion opening.
Figure 46B:
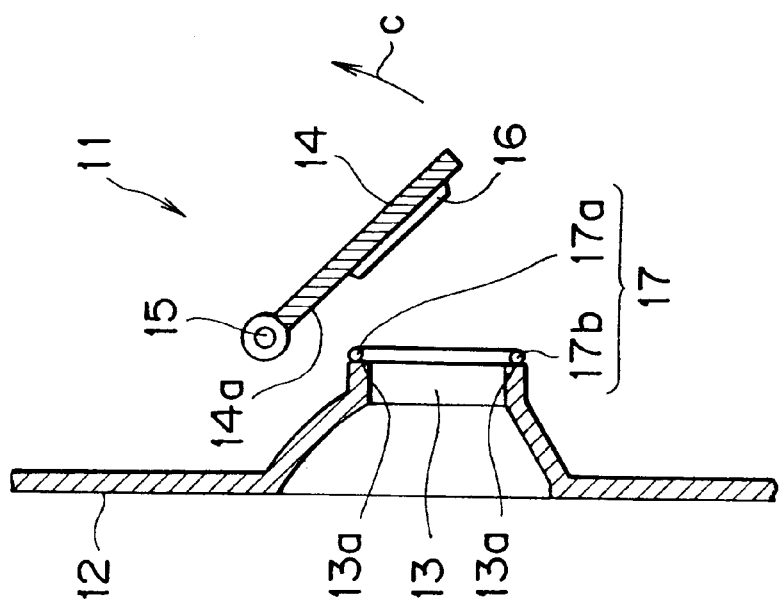

FIGS. 46A and 46B show a dustproof structure of the cartridge insertion opening 13 in the prior art. In this prior art dustproof structure, a flat rectangular packing 17 formed of rubber of the like is bonded to the rear end of the opening wall 13a of the cartridge insertion opening 13, and a flat front surface 14a of the front door 14 at its outer peripheral portion is adapted to come into pressure contact with the packing 17 by the biasing force of the return springs.

However, the pivot shafts 15 for the front door 14 are located near the upper end of the front door 14, so that a large difference is generated between arm lengths L21 and L22 (L21<L22) where the arm length L21 is defined as the distance between the axis of each pivot shaft 15 and an upper horizontal portion 17a of the packing 17, and the arm length L22 is defined as the distance between the axis of each pivot shaft 15 and a lower horizontal portion 17b of the packing 17. Accordingly, when the flat front surface 14a of the front door 14 is brought into pressure contact with the packing 17 in the direction of the arrow d shown in FIG. 46B, there is generated a large difference between contact forces F21 and F22 (F21>F22) where the contact force F21 is a force applied from the front surface 14a of the front door 14 onto the upper horizontal portion 17a of the packing 17, and the contact force F22 is a force applied from the front surface 14a of the front door 14 onto the lower horizontal portion 17b of the packing 17. The contact forces F21 and F22 are in reverse proportion to the aim lengths L21 and L22. In other words, the contact force F21 is sufficiently large at the upper horizontal portion 17a of the packing 17 because the arm length L21 from the pivot shafts 15 is smaller, wherein the contact force F22 is remarkably small at the lower horizontal portion 17b of the packing 17 because the arm length L22 from the pivot shafts 15 is larger. As a result, the front door 14 may come away from the lower horizontal portion 17b of the packing 17 in the direction of the arrow c shown in FIG. 46A, causing easy generation of a gap between the front door 14 and the lower horizontal portion 17b to result in low dustproof performance (low sealability). Particularly in the case that the front surface 14a of the front door 14 is adapted to directly come into contact with the rear end of the opening wall 13a of the cartridge insertion opening 13 without using the packing 17, the contact area between the front door 14 and the front panel 12 is limited, so that the above-mentioned gap is easily generated, even by slight unevenness or warpage of each contact surface. In addition, if the biasing force of the return spring is set large to increase the contact force F22 of the front door 14 on the lower horizontal portion 17b of the packing 17, the load on the disk cartridge 1 in opening the front door 14 in the direction of the arrow c is increased to cause a problem that the disk cartridge 1 cannot be easily inserted into the disk drive To the contrary, the dustproof structure according to the present invention can completely eliminate the above-mentioned defects of the prior art dustproof structure by making the arm lengths L13 and L14 almost equal to each other to thereby make the contact forces F1 and F12 almost equal to each other.

By making the arm lengths L13 and L14 almost equal to each other to thereby make the contact forces F11 and F12 almost equal to each other as mentioned above, the packing 36 may be removed as shown in FIG. 10. In this case, the round surfaces 26 of the right and left round projections 23 of the front door 21 are adapted to directly come into pressure contact with round surfaces 28d formed as the rear ends of the upper and lower horizontal portions 28a and 28b of the opening wall 28, thereby preventing the generation of a gap between the round surfaces 26 of the front door 21 and the round surfaces 28d of the opening wall 28 over the entire periphery thereof. Accordingly, the sealability and dustproof performance for the cartridge insertion opening 13 can be greatly improved.

Figure 25A:
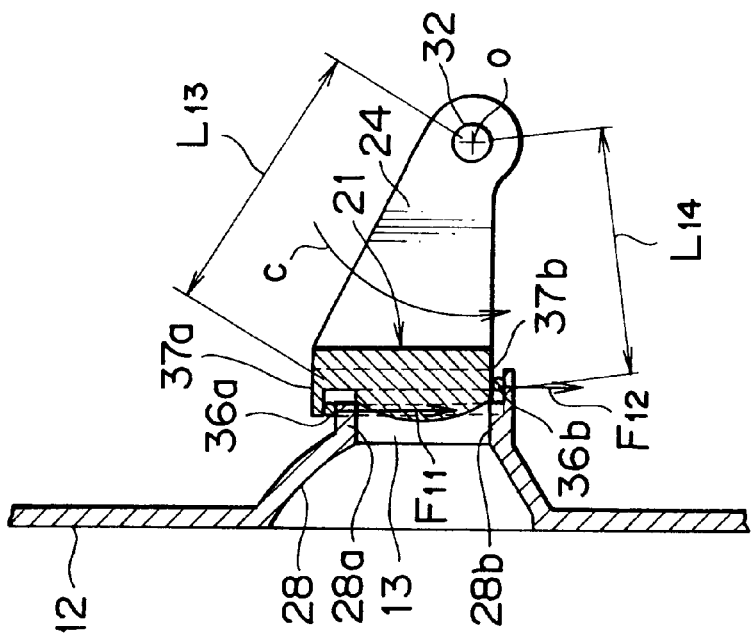
FIGS. 25A and 25B are sectional side views for illustrating a modification of the dustproof structure.
Figure 25B:
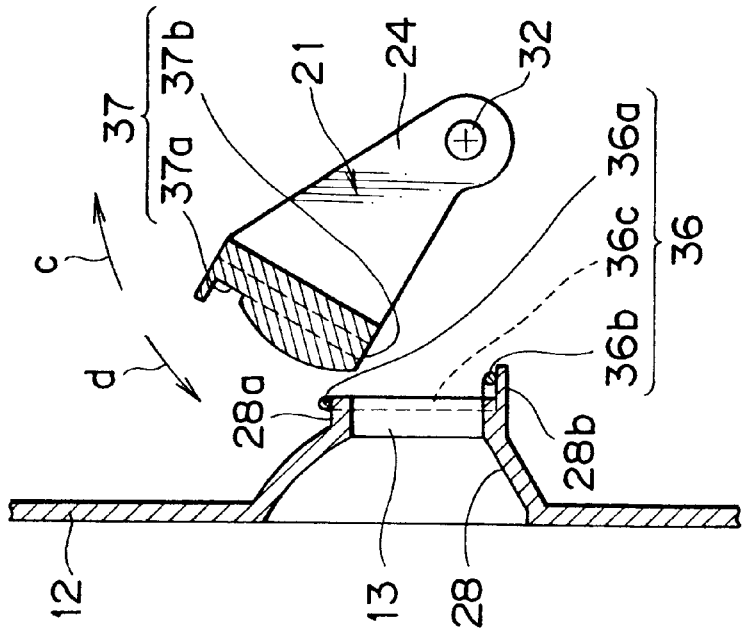
Figure 26:
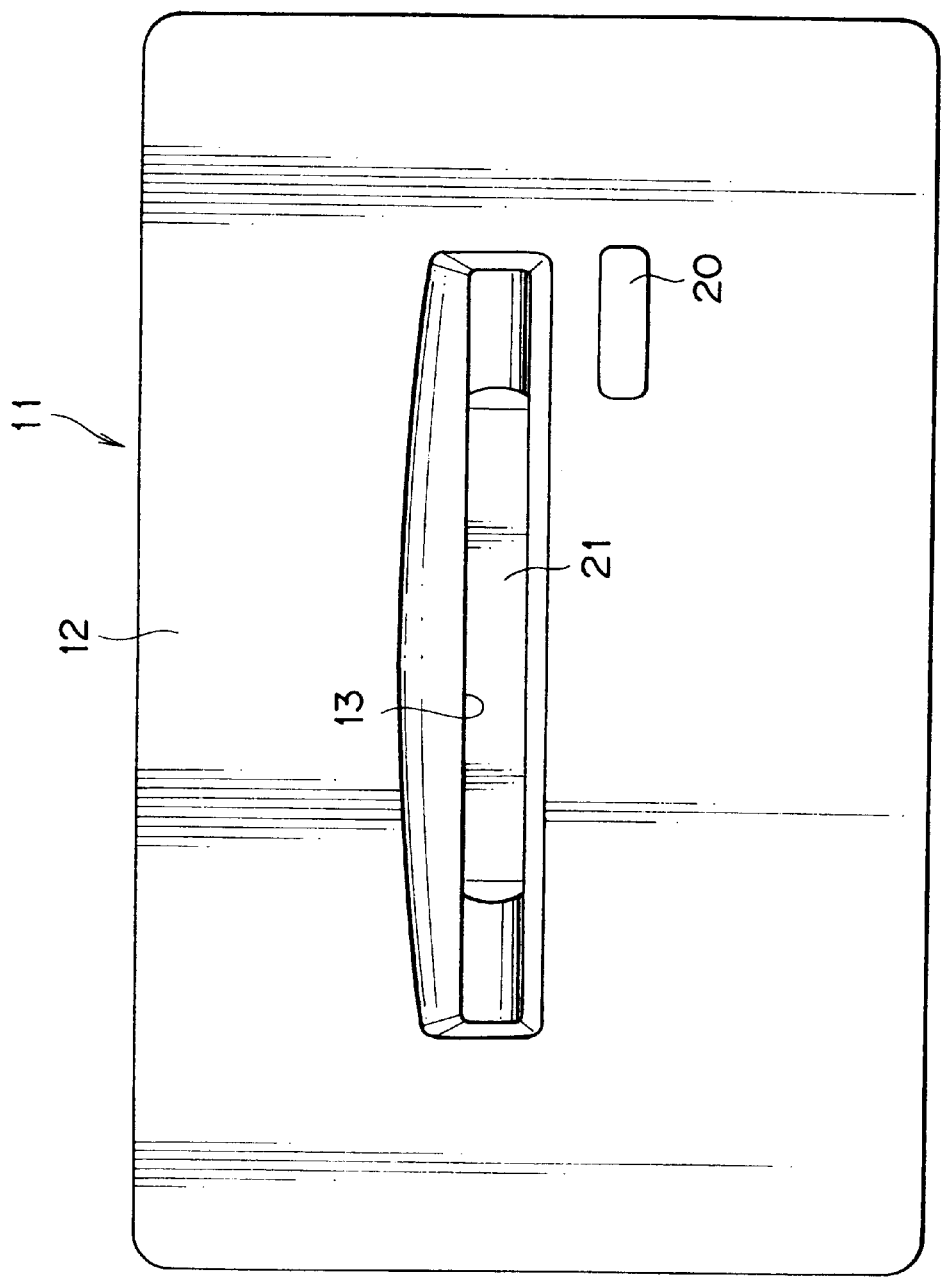
FIG. 26 is a front elevation of a disk drive according to the preferred embodiment.
Figure 27:
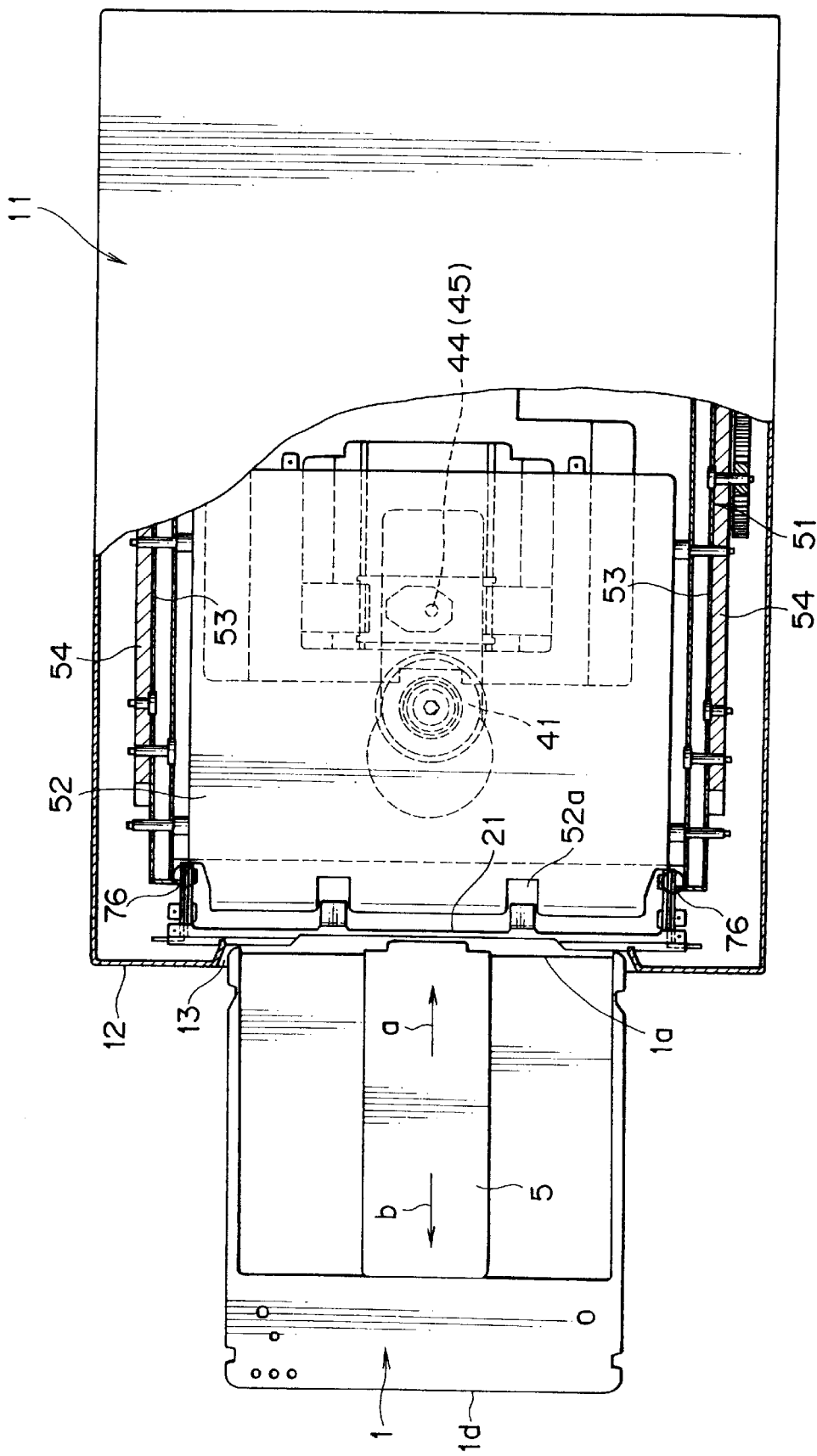
FIG. 27 is a partially cutaway, plan view of the disk drive, showing a condition where the disk cartridge starts to be inserted into the cartridge insertion opening.
Figure 29:
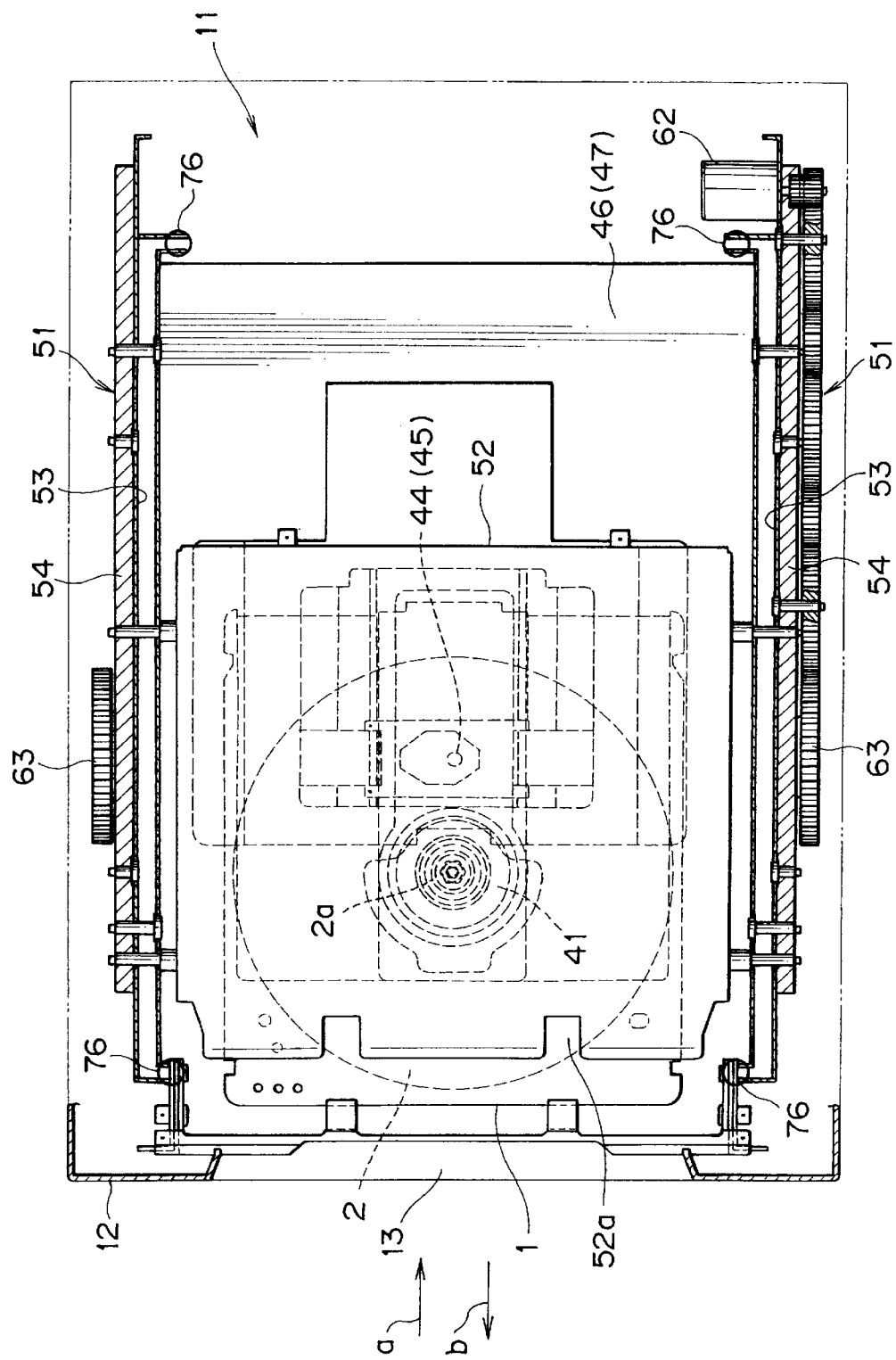
FIG. 29 is a transparent plan view of the disk drive, showing the loading end condition.
Figure 30:
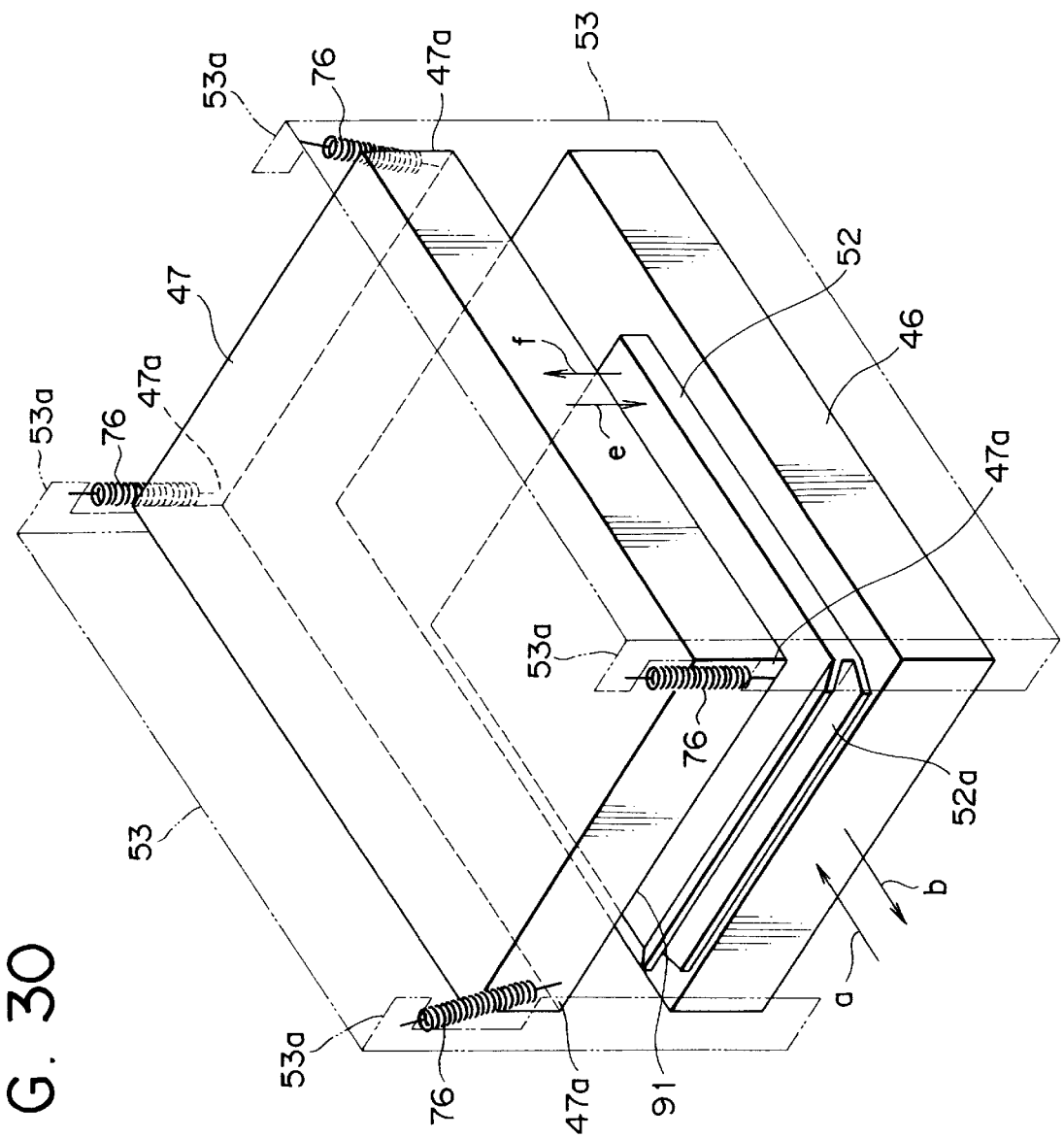
FIG. 30 is a schematic perspective view showing a condition where an upper base plate in the disk drive is suspended by four extension coil springs.

FIGS. 25A and 25B show a modification of the dustproof structure of the cartridge insertion opening 13. In this modification, the arm length L13 between the fulcrum O and the upper horizontal portion 37a of the sealing portion 37 of the front door 21 is set almost equal to the arm length L14 between the fulcrum O and the lower horizontal portion 37b of the sealing portion 37, and the upper and lower horizontal portions 37a and 37b are adapted to come into pressure contact with the upper and lower horizontal portions 36a and 36b of the packing 36 in a tangential direction with respect to a phantom circle about the fulcrum O. With this configuration, the biasing force of the extension coil springs 34 for turning the front door 21 in the direction of the arrow d can be converted about 100% into the contact forces F11 and F12 of the upper and lower horizontal portions 37a and 37b of the sealing portion 37 to the upper and lower horizontal portions 36a and 36b of the packing 36, thereby further improving the sealability and dustproof performance for the cartridge insertion opening 13. In particular, by making the arm lengths L13 and L14 completely equal to each other, the contact forces F11 and F12 become completely equal to each other, thereby further improving the sealability and dustproof performance for the cartridge insertion opening 13.

FIG. 11 shows another modification of the dustproof structure of the cartridge insertion opening 13. In this modification, the direction of the contact force F11 of the upper horizontal portion 37a of the sealing portion 37 to the upper horizontal portion 36a of the packing 36 is different from the direction of the contact force F12 of the lower horizontal portion 37b of the sealing portion 37 to the lower horizontal portion 36b of the packing 36. Also in this case, however, the arm length L13 between the fulcrum O and the upper horizontal portion 37a is set almost equal to the arm length L14 between the fulcrum O and the lower horizontal portion 37b, thereby greatly improving the sealability and dustproof performance for the cartridge insertion opening 13.

(7) Description of Raising/Lowering Mechanism for Optical Pickup

The raising/lowering mechanism 71 for raising and lowering the upper optical pickup 45 as an upper head mounted on the lower surface of the upper base plate 47 in the vertical opposite directions of the arrows e and f will now be described with reference to FIGS. 27 to 41. The upper base plate 47 is horizontally arranged between the right and left side plates 53. A pair of front and rear guide pins 72 are horizontally mounted on each side surface of the upper base plate 47. On the other hand, a pair of front and rear vertical guide slots 73 are formed through each side plate 53, and a pair of front and rear slide cam slots 74 each having a substantially Z-shaped configuration are formed through each slide plate 54. Each guide pin 72 is slidably inserted through the corresponding guide slot 73 and the corresponding slide cam slot 74 at their intersection, thereby forming a pair of front and rear cam mechanisms 75 on each side of the upper base plate 47, or totally four cam mechanisms 75 on both sides of the upper base plate 47. As shown in FIG. 40, each cam slot 74 is composed of an upper horizontal portion 74a, a slant portion 74b extending frontward from the front end of the upper horizontal portion 74a so as to be inclined downward, and a lower horizontal portion 74c extending frontward from the front end of the slant portion 74b.

In loading the disk cartridge 1, the compact single drive motor 62 of the cartridge loading mechanism 51 is operated to simultaneously slidingly drive the right and left slide plates 54 in the direction of the arrow a from the advanced position shown in FIG. 31 to the retracted position shown in FIG. 33 through the right and left gear trains 63, pinions 64, and racks 65 as mentioned previously. By the sliding motion of the slide plates 54, the cartridge holder 52 is horizontally retracted from the cartridge receiving position shown in FIG. 31 to the loading start position shown in FIG. 32 in the direction of the arrow a, and is thereafter vertically lowered from the loading start position to the loading end position shown in, FIG. 33 in the direction of the arrow e. At the same time, the upper base plate 47 can be vertically lowered from the upper position shown in FIGS. 31 and 32 to the lower position shown in FIG. 33 in the direction of the arrow e.

More specifically, in the condition before starting the loading operation, the guide pins 72 of the slide cam mechanisms 75 are positioned at the rear ends of the upper horizontal portion 74a of the cam slots 74 (at the downstream ends in the direction of the arrow a) as shown in FIG. 31. When the right and left slide plates 54 are slidingly driven simultaneously in the direction of the arrow a to horizontally retract the cartridge holder 52 from the cartridge receiving position shown in FIG. 31 to the loading start position shown in FIG. 32 in the direction of the arrow a, the guide pins 72 of the slide cam mechanisms 75 relatively slide in the direction of the arrow b from the rear ends of the upper horizontal portions 74a of the cam slots 74 to the front ends thereof (the downstream ends in the direction of the arrow b), and the upper base plate 47 is kept in its upper position as shown in FIG. 32.

When the right and left slide plates 54 are further slidingly driven simultaneously in the direction of the arrow a to vertically lower the cartridge holder 52 in the direction of the arrow e from the loading start position shown in FIG. 32 to the loading end position shown in FIG. 33, the guide pins 72 of the slide cam mechanisms 75 are vertically lowered in the direction of the arrow e from the upper ends of the vertical guide slots 73 to the lower ends thereof by the cam operation of the slant portions 74b of the cam slots 74 as shown in FIG. 33. As a result, the upper base plate 47 is vertically lowered in the direction of the arrow e from the upper position shown in FIG. 32 to the lower position shown in FIG. 33, and the guide pins 72 reach the lower horizontal portions 74c of the cam slots 74.

In ejecting the disk cartridge 1, the above loading operation is reversed. That is, the right and left slide plates 54 are slidingly driven in the direction of the arrow b from the retracted position shown in FIG. 33 to the advanced position shown in FIG. 31. During this sliding motion, the guide pins 72 are vertically raised in the direction of the arrow f from the lower ends of the vertical guide slots 73 to the upper ends thereof by the cam slots 74 of the slide cam mechanisms 75 to thereby vertically raise the upper base plate 47 in the direction of the arrow f from the lower position shown in FIG. 33 to the upper position shown in FIG. 34. Slightly after starting of the rising motion of the upper base plate 47, the cartridge holder 52 is vertically raised in the direction of the arrow f from the loading end position shown in FIG. 33 to the loading start position shown in FIG. 34. Thereafter, only the cartridge holder 52 is horizontally moved in the direction of the arrow b from the loading start position shown in FIG. 34 to the cartridge receiving position shown in FIG. 35 in the condition where the upper base plate 47 is kept in its upper position shown in FIG. 34.

The upper optical pickup 45 and the linear motor (seek mechanism) are mounted on the upper base plate 47, so that the load of the upper base plate 47 with its associated parts is considerably large. To support such a large load, four extension coil springs 76 as elastic suspension means are provided between four corner portions 47a of the upper base plate 47 and front and rear ends of the right and left side plates 53 at their upper portions, thereby elastically suspending the upper base plate 47 from the right and left side plates 53. Accordingly, the drive motor 62 can be made compact and no damper is required.

Figure 36:
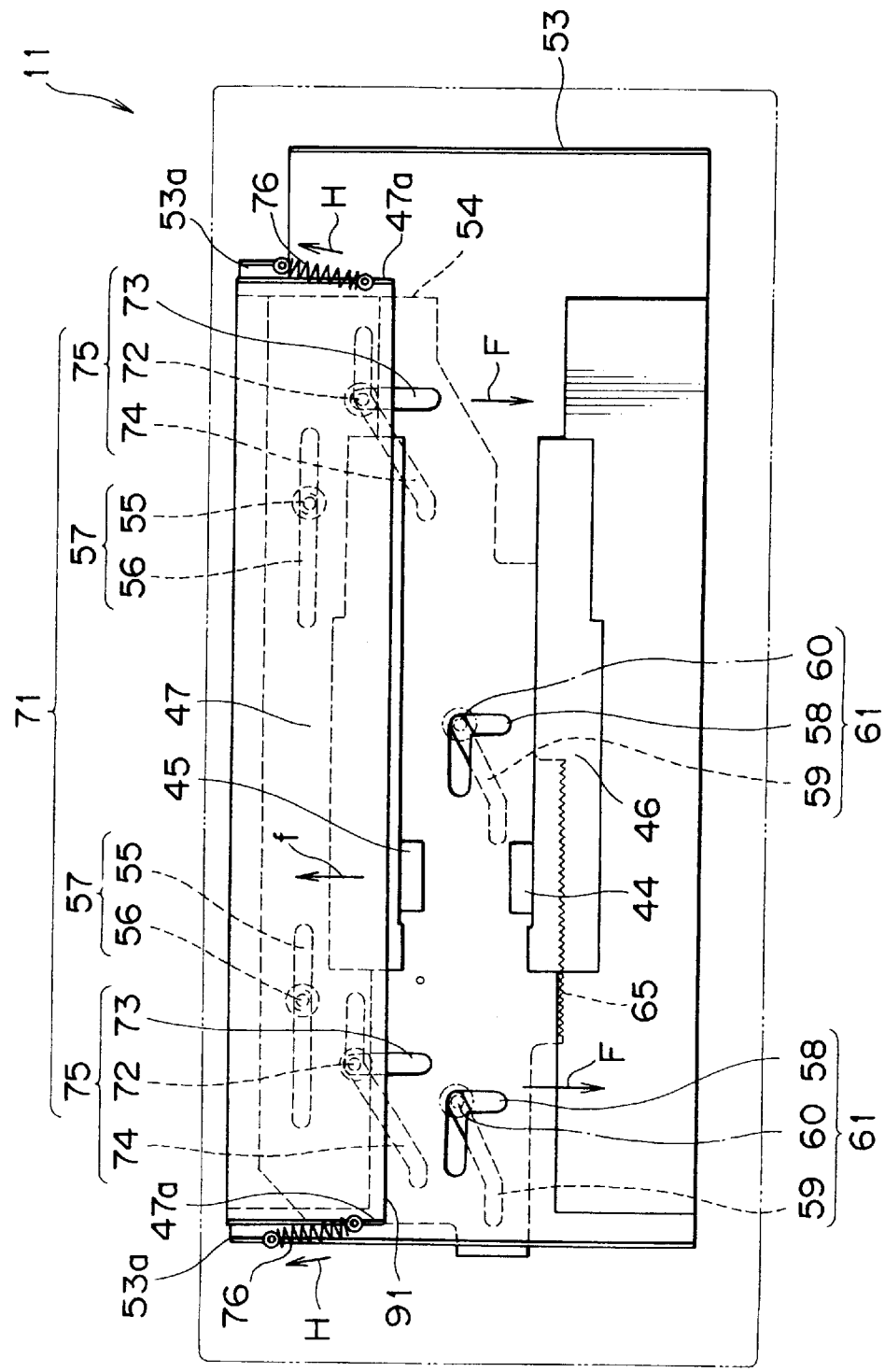
FIG. 36 is a transparent side view corresponding to FIG. 32, showing the raising/lowering mechanism for the upper base plate in the disk drive.
Figure 37:
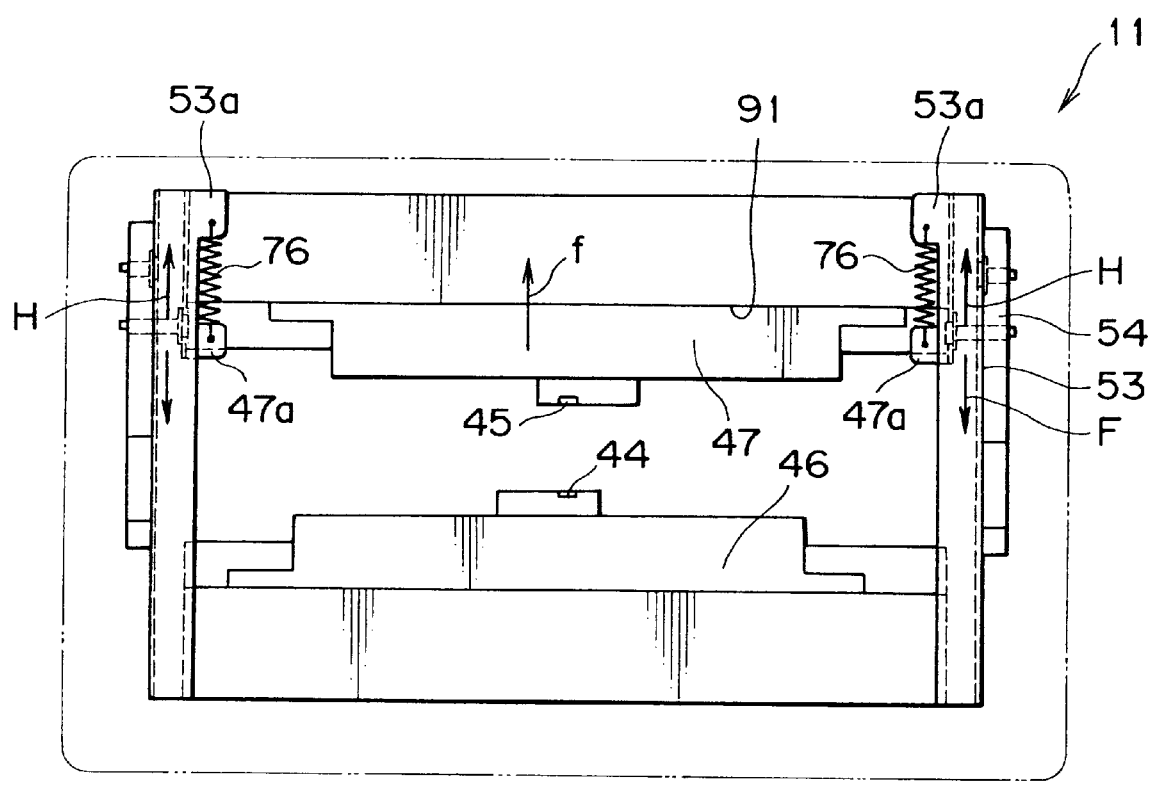
FIG. 37 is a transparent front elevation corresponding to FIG. 32, showing the raising/lowering mechanism.

Adverse effects due to the load of the upper base plate 47 acting on the cam slot 74 of each slide cam mechanism 75 will now be considered with reference to FIGS. 36 to 41. FIGS. 36, 37, and 40 illustrate an adverse effect in the case of lowering the upper base plate 47 from the upper position to the lower position. In this case, the load F of the upper base plate 47 acting on the guide pin 72 of each slide cam mechanism 75 is resolved into components F1 and F2. The component F1 loaded on the cam slot 74 from the guide pin 72 causes sliding of each slide plate 54 in the direction of an arrow G shown in FIG. 40. Accordingly, in lowering the upper base plate 47 to the lower position in the direction of the arrow e by driving the cartridge loading mechanism 51, the velocity of movement of each slide plate 54, in the direction of the arrow a is accelerated by a force having the direction of the arrow G caused by the component F1 due to the self weight of the upper base plate 47. Accordingly, in the case that the load of the upper base plate 47 is large and the force G is therefore large, large shock is generated upon positioning the upper base plate 47 lowered to the lower position in the direction of the arrow e above the lower base plate 46, causing a possibility that not only the cartridge loading mechanism 51, but also the upper and lower optical pickups 44 and 45, the chucking mechanism 43, and the double-sided disk 2 may be damaged.

According to this preferred embodiment, however, the upper base plate 47 is elastically suspended by a force H of each extension coil spring 76. Accordingly, the load F of the upper base plate 47 is apparently reduced or canceled by the force H of each extension coil spring 76 to become (F−H), thereby greatly reducing the force G. Accordingly, the upper base plate 47 having a large load can be lowered at a safe speed to the lower position in the direction of the arrow e. Further, in horizontally moving the cartridge holder 52 between the cartridge receiving position and the loading start position in the directions of the arrows a and b by driving the slide plates 54, the four extension coil springs 76 have no effect on the driving force of the slide plates 54, thereby achieving smooth sliding of the cartridge holder 52 in the directions of the arrows a and b.

Figure 38:
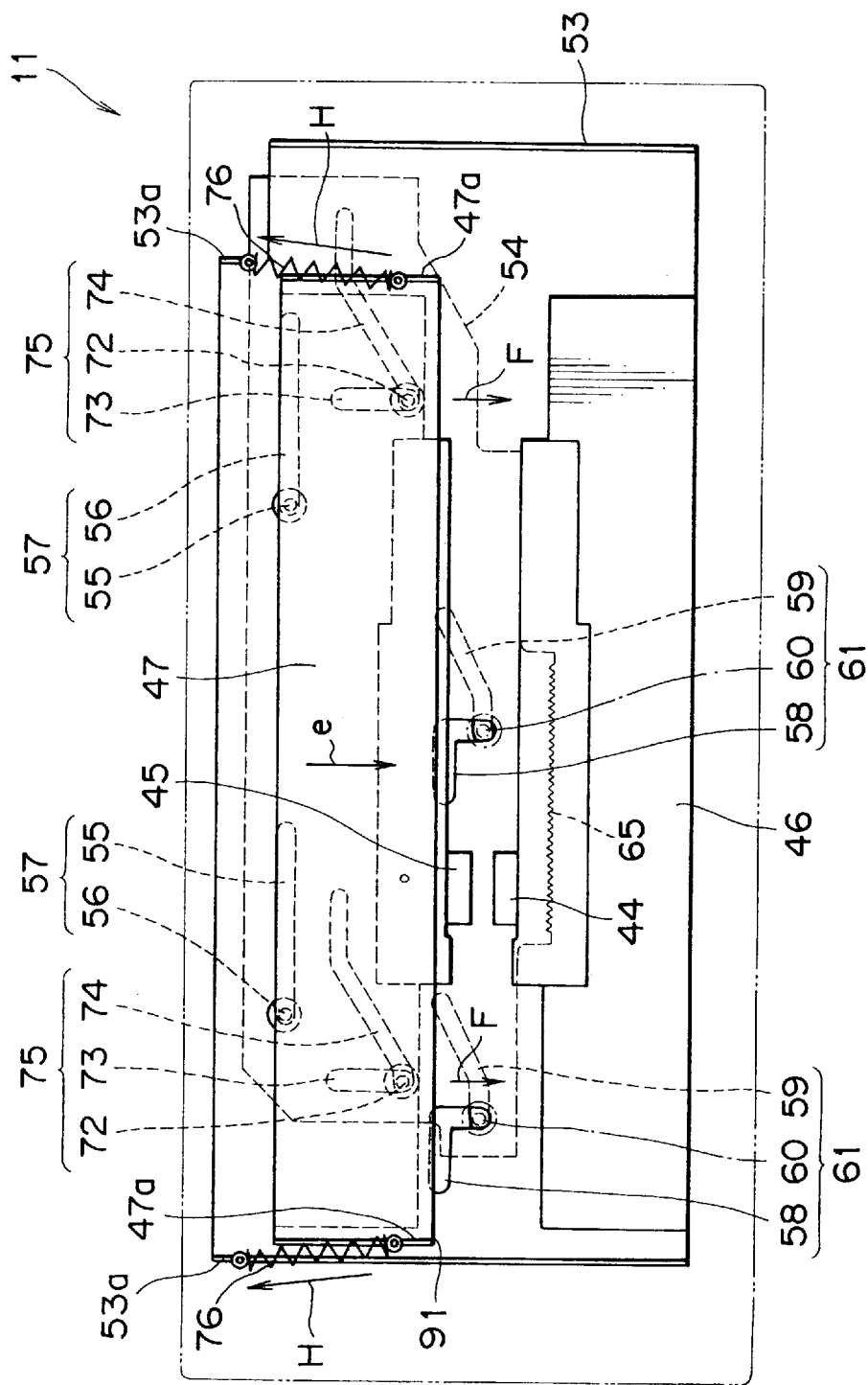
FIG. 38 is a transparent side view corresponding to FIG. 33, showing the raising/lowering mechanism.
Figure 39:
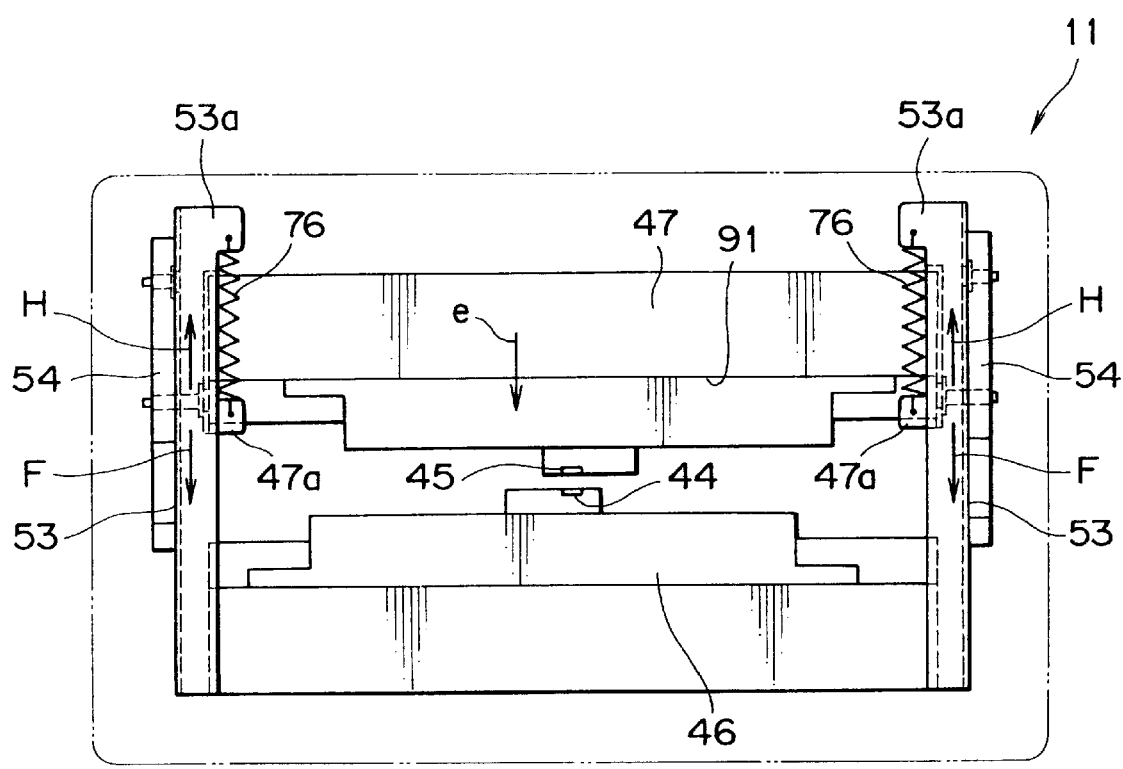
FIG. 39 is a transparent front elevation corresponding to FIG. 33, showing the raising/lowering mechanism.
Figure 41:
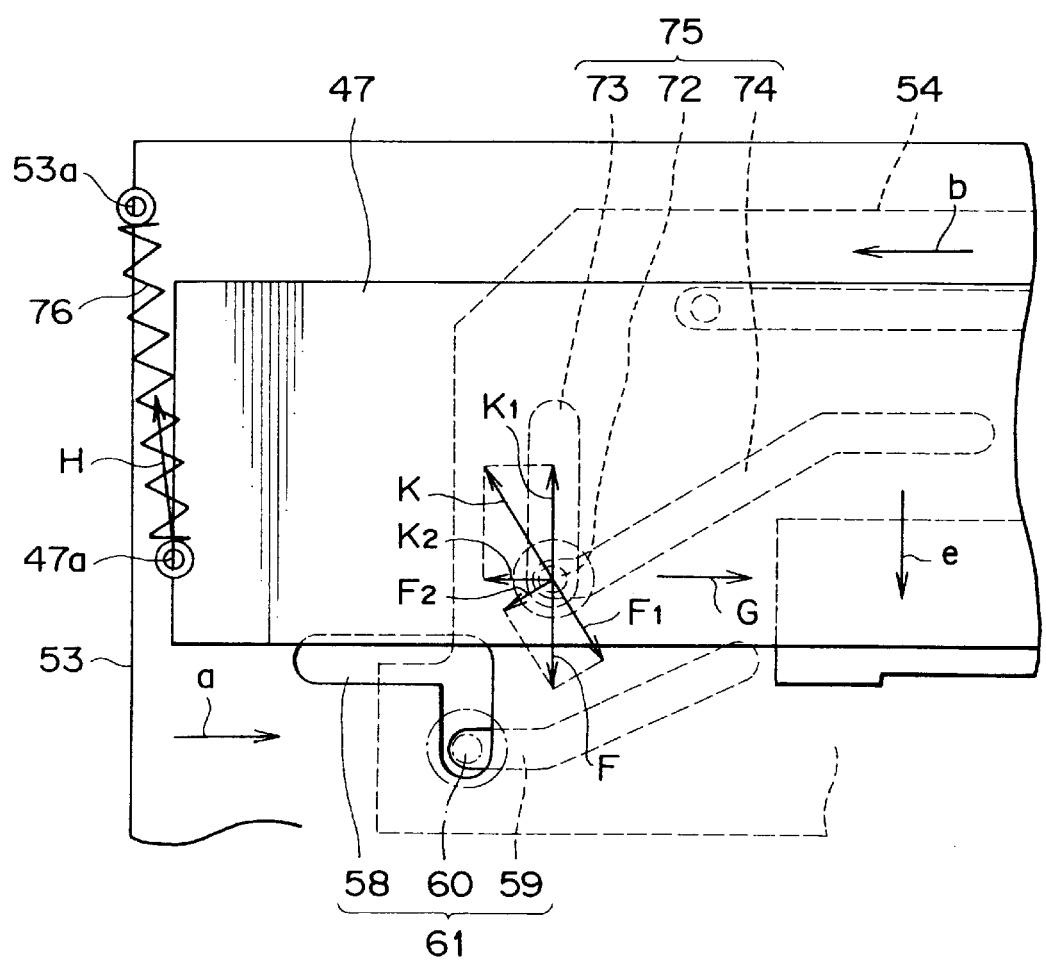
FIG. 41 is a side view for illustrating the function of each extension coil spring in raising the upper base plate through the raising/lowering mechanism.

FIGS. 38, 39, and 41 illustrate an adverse effect in the case of raising the upper base plate 47 from the lower position to the upper position. Also in this case, the load F of the upper base plate 47 acting on the guide pin 72 of each slide cam mechanism 75 is resolved into components F1 and F2, and the component F1 loaded on the cam slot from the guide pin 72 causes sliding of each slide plate 54 in the direction of the arrow G shown in FIG. 41. Accordingly, it is necessary to generate a force K greater than the component F1 and drive each slide plate 54 in the direction of the arrow b by a horizontal component K2 of the force K. In this case, the upper base plate 47 can be raised in the direction of the arrow f by a vertical component K1 of the force K. Accordingly, if the load F of the upper base plate 47 is large, the force F1 becomes large, and it is accordingly necessary to generate a large driving force for raising the upper base plate 47 in the direction of the arrow f. As a result, a large-sized strong drive motor becomes necessary as the drive motor 62.

According to this preferred embodiment, however, the upper base plate 47 is elastically suspended by the force H of each extension coil spring 76, and the force H is opposite in direction of the load F. Accordingly, the load F of the upper base plate 47 is apparently reduced or canceled by the force H of each extension coil spring 76 to become (F−H), thereby greatly reducing the force G. Accordingly, although a compact motor is used as the drive motor 62, the upper base plate 47 having a large load upper can be smoothly raised to the upper position in the direction of the arrow f.

In a conventional cartridge loading mechanism, a so-called one-way viscous damper acting only in lowering the upper base plate 47 is incorporated in the gear train 63, so as to reduce an adverse effect of the load of the upper base plate 47 on the driving system in lowering the upper base plate 47. If such a damper is applied to the cartridge loading mechanism 51 of the disk drive 11 according to the present invention, the damper undesirably operates in horizontally driving the cartridge holder 52 in the directions of the arrows a and b, because the cartridge loading mechanism 51 requires so-called bidirectional driving such that the cartridge holder 52 is horizontally driven in the opposite directions of the arrows a and b and vertically driven in the opposite directions of the arrows e and f and the upper base plate 47 is also vertically driven in the opposite directions of the arrows e and f. Accordingly, the load to the driving force may change between in the two opposite directions. Further, the viscous damper has problems such that it is higher in parts cost than each extension coil spring 76 and that parts trouble such as oil leakage and mechanical damage occurs easily. In addition, the damping force of each extension coil spring 76 can be simply selected according to its kind and size, whereas the range of selection of the damping force of a viscous damper is very narrow. Further, to cope with the large load of the upper base plate 47, the angle of inclination of each cam slot 74 may be reduced. In this case, however, the moving stroke of the slide plates 54 is increased or the loading and ejecting time is increased. The increase in the moving stroke causes an increase in size of the disk drive 11. Further, to obtain a large driving force, a large-sized drive motor may be used as the drive motor 62. In this case, however, the cost for the motor 62 is increased or a large load tends to be applied to each slide plate 54 and each cam mechanism 75 to cause damage thereto, thus reducing the reliability.

Having thus described a specific preferred embodiment of the present invention, it should be noted that the present invention is not limited to the above preferred embodiment, but various modifications may be made without departing from the scope of the present invention.

The disk drive as described above can exhibit the following effects.

The disk cartridge inserted into the disk drive is lowered from the loading start position to the loading end position by the cartridge loading mechanism, and the disk cartridge in the loading end position is separated from the front door, thereby allowing the front door to be closed by the biasing means. Accordingly, it is unnecessary to provide any mechanism for mechanically linking the front door and the cartridge loading mechanism, so that high dustproof performance can be ensured both in the case of not using the disk cartridge and in the case of using the disk cartridge, and the structure of the disk drive can be made simple to reduce the number of parts and the number of man-hours for assembly, thereby realizing cost reduction and improvement in reliability.

The fulcrum of the front door is located at a position lower than the substantially vertically central position of the cartridge insertion opening. With this arrangement, the front door can be opened and closed by the disk cartridge raised and lowered between the loading start position and the loading end position, thereby effecting smooth opening/closing operation of the front door without undue stress.

When the disk cartridge is loaded to the loading end position and the front door is closed, the door locking means is lowered in synchronism with the loading mechanism to inhibit the front door from opening, thereby preventing double insertion of the disk cartridge with a simple structure.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. Apparatus for recording and/or reproducing data from a disk housed in a disk cartridge, said apparatus comprising:
    a front panel having a cartridge insertion opening for allowing insertion of said disk cartridge;
    a door positioned near said front panel for closing said cartridge insertion opening to take a first position;
    a loading mechanism for loading said disk cartridge from a loading start position to a loading end position; and
    means for biasing said door in its closing direction to close said cartridge insertion opening;
    said disk cartridge pushing said door from said first position to a second position to open said cartridge insertion opening and being inserted into said loading mechanism to perform recording and/or reproduction of data;
    said disk cartridge pushing said door from said second position to said first position after recording and/or reproduction of said data so that said disk cartridge is moved from said loading mechanism to said cartridge insertion opening; and
    whereby said door makes contact with said disk cartridge raised from said loading end position to said loading start position by said cartridge loading mechanism after recording and/or reproduction of data so that said door is opened from a door closed position to a door opened position against said biasing means by raising said disk cartridge.

2. In a disk drive having a front panel formed with a cartridge insertion opening and a front door for inward opening and closing said cartridge insertion opening, said front door being pushed to be opened inward by a disk cartridge inserted into said cartridge insertion opening; the improvement comprising:
    a cartridge loading mechanism located inside of said front panel for at least lowering said disk cartridge from a loading start position where said disk cartridge is fully inserted through said cartridge insertion opening into said disk drive to open said front door to a loading end position lower than said loading start position where said disk cartridge is separated from said front door;
    biasing means for pivotally biasing said front door to a door closed position to thereby inward close said cartridge insertion opening after said disk cartridge reaches said loading end position; and
    a cartridge contact portion formed on said front door for making contact with said disk cartridge raised from said loading end position to said loading start position by said cartridge loading mechanism after recording and/or reproduction of data so that said front door is opened from said door closed position to a door open position against said biasing means by raising said disk cartridge.

3. In a disk drive having a front panel formed with a cartridge insertion opening and a front door for inward opening and closing said cartridge insertion opening, said front door being pushed to be opened inward by a disk cartridge inserted into said cartridge insertion opening; the improvement comprising:
    a cartridge loading mechanism located inside of said front panel for at least lowering said disk cartridge from a loading start position where said disk cartridge is fully inserted through said cartridge insertion opening into said disk drive to open said front door to a loading end position lower than said loading start position where said disk cartridge is separated from said front door; and
    biasing means for pivotally biasing said front door to a door closed position to thereby inward close said cartridge insertion opening after said disk cartridge reaches said loading end position;
    wherein a fulcrum at which said front door is pivotably supported is located at a position lower than a substantially vertically central position of said cartridge insertion opening so that said disk cartridge raised from said loading end position to said loading start position by said cartridge loading mechanism after recording and/or reproduction of data comes into contact with said front door to open said front door from said door closed position to a door open position against said biasing means.

4. In a disk drive having a front panel formed with a cartridge insertion opening and a front door for inward opening and closing said cartridge insertion opening, said front door being pushed to be opened inward by a disk cartridge inserted into said cartridge insertion opening; the improvement comprising:

a cartridge loading mechanism located inside of said front panel for at least lowering said disk cartridge from a loading start position where said disk cartridge is fully inserted through said cartridge insertion opening into said disk drive to open said front door to a loading end position lower than said loading start position where said disk cartridge is separated from said front door;

biasing means for pivotally biasing said front door to a door closed position to thereby inward close said cartridge insertion opening after said disk cartridge reaches said loading end position;

door locking means adapted to be lowered from an upper position to a lower position in synchronism with said cartridge loading mechanism to inhibit said front door from opening; and a cartridge contact portion formed on said front door for making contact with said disk cartridge raised from said loading end position to said loading start position by said cartridge loading mechanism after recording and/or reproduction of data so that said front door is opened from said door closed position to a door open position against said biasing means by raising said disk cartridge.

5. Apparatus for recording and/or reproducing data from an information storage medium comprising:

a front panel having an insertion opening for allowing insertion of said information recording medium;

a door positioned near said front panel for closing said insertion opening to take a first position;

a loading mechanism for loading said information recording medium from a loading start position to a loading end position; and means for biasing said door in its closing direction to close said insertion opening;

said information recording medium pushing said door from said first position to a second position to open said insertion opening and being inserted into said loading mechanism to perform recording and/or reproducing of data;

said information recording medium pushing said door from said second position to said first position after recording and/or reproduction of said data so that said information storage medium is moved from said loading mechanism to said insertion opening; and whereby said door makes contact with said information storage medium raised from said loading end position to said loading start position by said loading mechanism after recording and/or reproduction of data so that said door is opened from a door closed position to a door opened position against said biasing means by raising said information storage medium.

* * * * *